US010961328B2

(12) United States Patent
Hoshino et al.

(10) Patent No.: US 10,961,328 B2
(45) Date of Patent: Mar. 30, 2021

(54) OPTICAL FILM, BRIGHTNESS ENHANCEMENT FILM, BACKLIGHT UNIT WITH BRIGHTNESS ENHANCEMENT FILM, AND LIQUID CRYSTAL DISPLAY DEVICE

(71) Applicant: FUJIFILM Corporation, Tokyo (JP)

(72) Inventors: Wataru Hoshino, Minami-ashigara (JP); Yukito Saitoh, Minami-ashigara (JP); Kunihiro Atsumi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 38 days.

(21) Appl. No.: 15/939,848

(22) Filed: Mar. 29, 2018

(65) Prior Publication Data

US 2018/0215843 A1 Aug. 2, 2018

Related U.S. Application Data

(63) Continuation of application No. PCT/JP2016/078367, filed on Sep. 27, 2016.

(30) Foreign Application Priority Data

Sep. 30, 2015 (JP) ............................ JP2015-195078

(51) Int. Cl.
*C08F 2/44* (2006.01)
*C09K 19/54* (2006.01)
(Continued)

(52) U.S. Cl.
CPC ................ *C08F 2/44* (2013.01); *C08F 20/30* (2013.01); *C08F 20/36* (2013.01); *C08L 101/00* (2013.01);
(Continued)

(58) Field of Classification Search
CPC .. C08F 2/44; G02F 1/133634; G02F 1/13363; G02F 2011/133633;
(Continued)

(56) References Cited

U.S. PATENT DOCUMENTS 5,506,704 A * 4/1996 Broer .................. G02B 5/3016 252/299.7
2002/0021392 A1 2/2002 Ohtake et al.
(Continued)

FOREIGN PATENT DOCUMENTS

JP 2001-305520 A 10/2001
JP 2004-233987 A 8/2004
(Continued)

OTHER PUBLICATIONS

Japanese Office Action, dated Sep. 11, 2018, for corresponding Japanese Application No. 2017-543407, with an English machine translation.

(Continued)

*Primary Examiner* — Ruiyun Zhang
(74) *Attorney, Agent, or Firm* — Birch, Stewart, Kolasch & Birch, LLP

(57) ABSTRACT

An optical film including: a cholesteric layer of a disk-like liquid crystal composition including a disk-like liquid crystal compound, in which the cholesteric layer exhibits a cholesteric liquid crystalline phase, and in which fluctuation of a helical pitch in a film thickness direction of the cholesteric layer is 2% or greater, and having a cholesteric liquid crystalline phase of a disk-like liquid crystal compound and a wide reflection bandwidth; a brightness enhancement film; a backlight unit with a brightness enhancement film; and a liquid crystal display device.

17 Claims, 5 Drawing Sheets

(51) Int. Cl.

| | |
|---|---|
| ***G02F 1/13363*** | (2006.01) |
| ***C08L 101/00*** | (2006.01) |
| ***C09D 4/00*** | (2006.01) |
| ***C09K 19/30*** | (2006.01) |
| ***G02B 5/30*** | (2006.01) |
| ***C08F 20/30*** | (2006.01) |
| ***C08F 20/36*** | (2006.01) |
| ***C08L 101/12*** | (2006.01) |
| *C09K 19/12* | (2006.01) |
| *C08F 220/54* | (2006.01) |
| *C09K 19/34* | (2006.01) |
| *C08F 228/02* | (2006.01) |
| *C09K 19/04* | (2006.01) |
| *C08F 220/36* | (2006.01) |
| *C08F 220/28* | (2006.01) |

(52) U.S. Cl.

CPC .............. *C08L 101/12* (2013.01); *C09D 4/00* (2013.01); *C09K 19/3098* (2013.01); *C09K 19/54* (2013.01); *G02B 5/3016* (2013.01); *G02B 5/3025* (2013.01); *G02F 1/13363* (2013.01); *G02F 1/133634* (2013.01); *C08F 220/283* (2020.02); *C08F 220/36* (2013.01); *C08F 220/54* (2013.01); *C08F 228/02* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/3021* (2013.01); *C09K 2019/3025* (2013.01); *C09K 2019/3027* (2013.01); *C09K 2019/3071* (2013.01); *C09K 2019/3422* (2013.01); *C09K 2019/3425* (2013.01); *C09K 2323/00* (2020.08); *C09K 2323/03* (2020.08); *C09K 2323/06* (2020.08); *G02F 2001/133633* (2013.01)

(58) Field of Classification Search

CPC ................ G02B 5/3016; C08L 101/12; C09K 2019/0448; C09K 2323/00; C09K 2323/03; C09K 2323/06; Y10T 428/10; Y10T 428/1036; Y10T 428/1086

USPC ............. 428/1.1, 1.3, 1.31, 1.6; 359/487.02; 349/115, 176, 194; 252/299.7, 582

See application file for complete search history.

(56) References Cited

U.S. PATENT DOCUMENTS

| | | | |
|---|---|---|---|
| 2006/0119783 | A1 | 6/2006 | Fukuoka et al. |
| 2009/0117292 | A1 | 5/2009 | Tamura |
| 2016/0170114 | A1 | 6/2016 | Watano et al. |
| 2017/0010398 | A1 | 1/2017 | Ishikawa et al. |

FOREIGN PATENT DOCUMENTS

| | | | |
|---|---|---|---|
| JP | 2004-264322 | A | 9/2004 |
| JP | 2005-258192 | A | 9/2005 |
| WO | WO 2007/142206 | A1 | 12/2007 |
| WO | WO 2013/189147 | A1 | 12/2013 |
| WO | WO 2015/029958 | A1 | 3/2015 |
| WO | WO 2015/141818 | A1 | 9/2015 |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2016/078367, dated Apr. 12, 2018, with an English translation of the Written Opinion.

International Search Report (Form PCT/ISA/210) for International Application No. PCT/JP2016/078367, dated Nov. 15, 2016, with an English translation.

* cited by examiner

OPTICAL FILM, BRIGHTNESS ENHANCEMENT FILM, BACKLIGHT UNIT WITH BRIGHTNESS ENHANCEMENT FILM, AND LIQUID CRYSTAL DISPLAY DEVICE

CROSS-REFERENCE TO RELATED APPLICATIONS

This application is a Continuation of PCT International Application No. PCT/JP2016/078367, filed on Sep. 27, 2016, which claims priority under 35 U.S.C. Section 119(a) to Japanese Patent Application No. 2015-195078 filed on Sep. 30, 2015. Each of the above applications is hereby expressly incorporated by reference, in its entirety, into the present application.

BACKGROUND OF THE INVENTION

1. Field of the Invention

The present invention relates to an optical film, a brightness enhancement film, a backlight unit with a brightness enhancement film, and a liquid crystal display device.

2. Description of the Related Art

A flat panel display such as a liquid crystal display device (hereinafter, also referred to as LCD) has been annually variously used as a space saving image display device having low electric power consumption. The liquid crystal display device, for example, is configured by disposing backlight (hereinafter, also referred to as BL), a backlight side polarizing plate, a liquid crystal cell, a visible side polarizing plate, and the like in this order.

Recently, in the flat panel display market, for LCD performance improvement, development for saving electric power consumption is in progress. These performance improvements are remarkable particularly in small size liquid crystal display devices such as tablet PCs (personal computers) and smart phones.

On the other hand, with respect to a large size for handling TV applications, the next generation high definition (4K2K, EBU ratio of 100% or greater) of the current TV standard (full high definition (FHD), National Television System Committee (NTSC) ratio 72% European Broadcasting Union (EBU) ratio 100%) has been developed, and development for power consumption saving has been advanced as performance improvement to the small size or the like. Therefore, electric power consumption saving of a liquid crystal display device is increasingly required.

It has been proposed that a reflection polarizer is disposed between the backlight and the backlight side polarizing plate according to electric power consumption saving of the backlight. The reflection polarizer is an optical element that transmits only light rays vibrating in a specific polarization direction among incident light rays vibrating in all directions and reflects light rays vibrating in the other polarization directions. Accordingly, it is possible to recycle the light rays which do not transmit the reflection polarizer but are reflected on the reflection polarizer such that the light utilization efficiency in the LCD can be improved.

As a reflection polarizer, a light reflecting layer formed by fixing a cholesteric liquid crystalline phase, which is a reflection polarizer that reflects only unidirectionally circularly polarized light, is known. As a cholesteric liquid crystalline phase, many cholesteric layers using a rod-like liquid crystal compound are known (For example, see JP2004-233987A and JP2004-264322A).

JP2004-233987A discloses a cholesteric liquid crystal film obtained by coating an oriented substrate with a liquid crystal mixture including a polymerizable mesogen compound (a), a polymerizable chiral agent (b), and a photopolymerization initiator (c) and performing ultraviolet polymerization under an inert gas atmosphere and having a reflection bandwidth of 200 nm or greater, but only discloses a cholesteric liquid crystalline phase having a broad band by using a rod-like liquid crystal compound. Similarly, JP2004-264322A discloses only a cholesteric liquid crystalline phase having a broad band using a rod-like liquid crystal compound.

SUMMARY OF THE INVENTION

The cholesteric liquid crystalline phase using the disk-like liquid crystal compound has large birefringence in the film thickness direction and exhibits optical properties different from the cholesteric liquid crystalline phase using the rod-like liquid crystal compound. In the case of the cholesteric liquid crystalline phase of the rod-like liquid crystal composition, the value of the retardation Rth in the film thickness direction and the value of the oblique retardation in the film thickness direction described below generally exhibit positive values, but in the case of the cholesteric liquid crystalline phase of the disk-like liquid crystal composition, the value of Rth and the value of oblique retardation in the film thickness direction generally exhibit negative values. In this manner, the disk-like liquid crystal composition is useful because the composition has properties (for example, optical compensation using refractive index adjustment in a film thickness direction) that cannot be realized with the rod-like liquid crystal composition.

The cholesteric liquid crystalline phase has a helical pitch and selectively reflects light having a wavelength corresponding to the pitch. Usually, this pitch is uniform within the layer, and thus only light in a wavelength range having a certain width depending on $\Delta n$ of the disk-like liquid crystal composition is reflected. In a case where a disk-like liquid crystal composition having high $\Delta n$ is used, a light reflecting layer having a wide bandwidth can be formed. However, a disk-like liquid crystal compound which exhibits a cholesteric phase is very limited, and forming of the cholesteric layer of the disk-like liquid crystal compound which exhibits a wide reflection bandwidth is not realized.

For example, JP1998-307208A (JP-H10-307208A) discloses a method of rapidly cooling a discotic liquid crystalline material having a chiral discotic nematic phase from a temperature region exhibiting a liquid crystalline phase at a cooling rate of 100° C./minute or greater, then manufacturing an optical film to be provided for photocrosslinking reaction. In the examples of JP1998-307208A (JP-H10-307208A), a red reflective cholesteric layer having a film thickness of 10 μm, a center wavelength of 640 nm, and a reflection bandwidth of 40 nm is disclosed. However, the reflection bandwidth is narrower than 40 nm.

The problem to be solved by the present invention is to provide an optical film having a cholesteric liquid crystalline phase of a disk-like liquid crystal compound and having a wide reflection bandwidth.

The problem to be solved by the present invention is to provide a brightness enhancement film using an optical film having a cholesteric liquid crystalline phase of a disk-like liquid crystal compound and having a wide reflection bandwidth, a backlight unit with a brightness enhancement film using this brightness enhancement film, and a liquid crystal display device using this brightness enhancement film.

As a result of diligent research by the present inventors, it has been found that an optical film having a cholesteric liquid crystalline phase of a disk-like liquid crystal compound and having a wide reflection bandwidth can be obtained by causing the fluctuation of the helical pitch in the film thickness direction of the cholesteric layer be in a specific range, so as to conceive the present invention.

That is, the above objects can be achieved by the present invention having the following configurations.

[1] An optical film comprising:

a cholesteric layer of a disk-like liquid crystal composition including a disk-like liquid crystal compound, in which the cholesteric layer exhibits a cholesteric liquid crystalline phase, and in which fluctuation of a helical pitch in a film thickness direction of the cholesteric layer is 2% or greater.

[2] The optical film according to [1], in which the cholesteric layer preferably has an interface only on a surface of the layer.

[3] The optical film according to [1] or [2], in which the disk-like liquid crystal compound is preferably a compound represented by Formula (1), Formula (1)

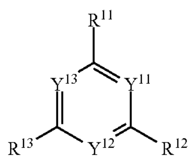

in Formula (1), $Y^{11}$, $Y^{12}$, and $Y^{13}$ each independently represent methine or a nitrogen atom, $R^{11}$, $R^{12}$, and $R^{13}$ each independently represent Formula (A), Formula (C), or a hydrogen atom, here, at least two of $R^{11}$, $R^{12}$, and $R^{13}$ are Formula (A) or (C);

Formula (A)

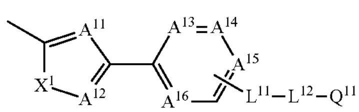

in Formula (A), $A^{11}$ and $A^{12}$ each independently represent a nitrogen atom or methine;

$A^{13}$, $A^{14}$, $A^{15}$, and $A^{16}$ each independently represent a nitrogen atom or methine (here, a hydrogen atom of methine may be substituted with a substituent $-L^{11}-L^{12}-Q^{11}$);

$X^1$ represents an oxygen atom, a sulfur atom, methylene, or imino;

$L^{11}$ represents a hetero 5-membered ring group;

$L^{12}$ represents an alkylene group or an alkenylene group, one $CH_2$ group or each of non-adjacent two or more $CH_2$ groups existing in a group of these alkylene groups or alkenylene groups may be substituted with —O—, —COO—, —OCO—, —OCOO—, —CO—, —S—, —$SO_2$—, —NR—, —$NRSO_2$—, or —$SO_2NR$— (R represents a hydrogen atom or an alkyl group having 1 to 4 carbon atoms), and one or more hydrogen atoms existing in these groups may be substituted with a halogen atom;

$Q^{11}$ each independently represent a polymerizable group, a hydrogen atom, —OH, —COOH, or a halogen atom;

Formula (C)

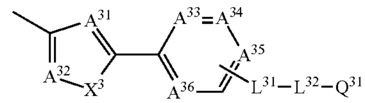

in Formula (C), $A^{31}$ and $A^{32}$ each independently represent a nitrogen atom or methine, $A^{33}$, $A^{34}$, $A^{35}$, and $A^{36}$ each independently represent a nitrogen atom or methine (here, a hydrogen atom of methine may be substituted with a substituent $-L^{31}-L^{32}-Q^{31}$);

$X^3$ represents an oxygen atom, a sulfur atom, methylene, or imino;

$L^{31}$ represents a hetero 5-membered ring group;

$L^{32}$ represents an alkylene group or an alkenylene group, one $CH_2$ group or each of non-adjacent two or more $CH_2$ groups existing in a group of these alkylene groups or alkenylene groups may be substituted with —O—, —COO—, —OCO—, —OCOO—, —CO—, —S—, —$SO_2$—, —NR—, —$NRSO_2$—, or —$SO_2NR$— (R represents a hydrogen atom or an alkyl group having 1 to 4 carbon atoms), and one or more hydrogen atoms existing in these groups may be substituted with a halogen atom; and $Q^{31}$ each independently represent a polymerizable group, a hydrogen atom, —OH, —COOH, or a halogen atom.

[4] The optical film according to any one of [1] to [3], in which the disk-like liquid crystal composition preferably further includes a chiral agent, a polymerizable compound, and a photopolymerization initiator, and in which the cholesteric layer is obtained by aligning the disk-like liquid crystal composition.

[5] A method of manufacturing the optical film according to any one of [1] to [4], comprising:

a step of coating an underlayer with the disk-like liquid crystal composition;

a step of aligning the disk-like liquid crystal composition in a cholesteric liquid crystalline phase; and a step of forming different helical pitches in a cholesteric layer such that fluctuation in a helical pitch in a film thickness direction of the cholesteric layer is 2% or greater.

[6] The method of manufacturing the optical film according to [5], in which the step of forming different helical pitches in a cholesteric layer preferably is a step of irradiation with ultraviolet rays under heating.

[7] The method of manufacturing the optical film according to [5] or [6], in which the step of forming different helical pitches in a cholesteric layer is preferably a step of performing heating after irradiation with ultraviolet rays.

[8] The method of manufacturing the optical film according to any one of [5] to [7], further comprising:

a step of fixing a cholesteric liquid crystalline phase of the cholesteric layer after the step of forming different helical pitches in a cholesteric layer.

[9] A brightness enhancement film comprising:

the optical film according to any one of [1] to [4] as a first light reflecting layer; and a second light reflecting layer obtained by fixing a cholesteric liquid crystalline phase of a liquid crystal compound.

[10] The brightness enhancement film according to [9], in which the optical film preferably includes a λ/4 plate, and in which the λ/4 plate, the first light reflecting layer, and the second light reflecting layer are provided in this order.

[11] The brightness enhancement film according to [9] or [10], preferably further comprising:

a third light reflecting layer obtained by fixing a cholesteric liquid crystalline phase of a liquid crystal compound.

[12] A backlight unit with a brightness enhancement film comprising:

the brightness enhancement film according to any one of [9] to [11]; and a backlight unit.

[13] A liquid crystal display device obtained by using the brightness enhancement film according to any one of [9] to [11].

According to the present invention, it is possible to provide an optical film having a cholesteric liquid crystalline phase of a disk-like liquid crystal compound and having a wide reflection bandwidth.

DESCRIPTION OF THE PREFERRED EMBODIMENTS

Figure 1:
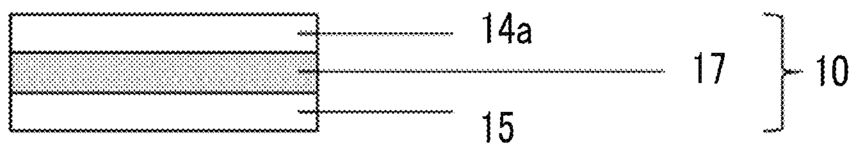
FIG. 1 is a schematic view illustrating a cross section in an example of an optical film of the present invention and illustrates an aspect of having a support, a λ/4 plate (abbreviation for quarter wavelength plate) and underlayer (alignment film) formed on the support, and a first light reflecting layer laminated on a surface of the underlayer in direct contact.

Hereinafter, the optical film, the brightness enhancement film, the backlight unit with a brightness enhancement film, and the liquid crystal display device according to the present invention are specifically described.

The description in the configurations described below is provided based on typical embodiments of the present invention, but the present invention is not limited to the embodiments. In this specification, a numerical range denoted by using "to" indicates a range including numerical values described before and after "to" as the lower limit value and the upper limit value.

In this specification, a "full width at half maximum" of a peak refers to the width of a peak at a height of ½ of a peak height.

[Optical Film]

The optical film of the present invention has a cholesteric layer of a disk-like liquid crystal composition including a disk-like liquid crystal compound, the cholesteric layer exhibits a cholesteric liquid crystalline phase, and fluctuation of a helical pitch in a film thickness direction of the cholesteric layer is 2% or greater.

According to this configuration, the optical film of the present invention has a cholesteric liquid crystalline phase of a disk-like liquid crystal compound and a wide reflection bandwidth.

Hereinafter, a preferable aspect of the present invention is described.

<Disk-Like Liquid Crystal Composition>

The disk-like liquid crystal composition includes a disk-like liquid crystal compound.

The disk-like liquid crystal composition preferably contains a disk-like liquid crystal compound, a chiral agent, a polymerizable compound, and a polymerization initiator. In a case where the disk-like liquid crystal composition is used, it is easy to form a cholesteric layer having a plurality of pitches in a film thickness direction.

In the optical film of the present invention, it is preferable that the disk-like liquid crystal composition further includes a chiral agent, a polymerizable compound, and a photopolymerization initiator.

The optical film of the present invention is preferably obtained by causing a cholesteric layer to align the disk-like liquid crystal composition. The fact that the cholesteric layer is a layer obtained by aligning the disk-like liquid crystal composition can be checked by measuring retardation Re or Rth in the in-plane direction or oblique retardation in the film thickness direction, for example, with AxoScan manufactured by Axometrics, Inc. In a case where a case where Rth or oblique retardation in the film thickness direction is a negative value, Rth or the oblique retardation means that the cholesteric layer is a layer obtained by aligning the disk-like liquid crystal composition.

It is preferable that the disk-like liquid crystal composition further contains a surfactant, in view of forming a light reflecting layer obtained by fixing a cholesteric liquid crystalline phase with good durability under moist and hot environment, good heat resistance, and less orientation defects.

The composition using the disk-like liquid crystal compound can increase heat resistance of the light reflecting layer obtained by fixing a cholesteric liquid crystalline phase than the composition using the rod-like liquid crystal compound. The composition using a chiral agent and a surfactant has satisfactory durability of the light reflecting layer obtained by fixing the cholesteric liquid crystalline phase under moist and hot environment. The composition using a surfactant can decrease the orientation defect of the light reflecting layer obtained by fixing the cholesteric liquid crystalline phase.

The disk-like liquid crystal composition is preferably for forming the light reflecting layer obtained by fixing the cholesteric liquid crystalline phase.

(Disk-Like Liquid Crystal Compound)

The disk-like liquid crystal composition includes a disk-like liquid crystal compound.

The disk-like liquid crystal compound refers to a compound having a structure in which two or more (preferably three or more) side chains are bonded to a mother nucleus so as to have a spread on a plane (for example, a structure in which at least the side chain is bonded to the ortho position and a meta position, in a case where a benzene ring is a mother nucleus). A structure in which two or more side chains are bonded to a mother nucleus having a ring structure is preferable, and a structure in which three or more side chains are bonded to a mother nucleus having a ring structure is more preferable. Examples of the mother nucleus include structures such as benzene, triphenylene, porphyrin, phthalocyanine, and cyclohexane. The disk-like liquid crystal compound is not particularly limited, and a well-known disk-like liquid crystal compound can be used.

Generally, in JP2013-195630A, a cholesteric disk-like liquid crystal compound is preferably a triphenylene structure. However, it has been found that the disk-like liquid crystal compound having a trisubstituted benzene structure rather than triphenylene has higher Δn and a greater full width at half maximum, and thus optical performances are higher in terms of reflectance. That is, the disk-like liquid crystal compound preferably has a trisubstituted benzene structure.

Among the compounds in which the disk-like liquid crystal compound has a trisubstituted benzene structure, the optical film of the present invention is preferably a compound represented by Formula (1).

Formula (1)

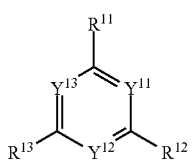

in Formula (1), $Y^{11}$, $Y^{12}$, and $Y^{13}$ each independently represent methine or a nitrogen atom, $R^{11}$, $R^{12}$, and $R^{13}$ each independently represent Formula (A), Formula (C), or a hydrogen atom, here, at least two of $R^{11}$, $R^{12}$, and $R^{13}$ are Formula (A) or (C);

Formula (A)

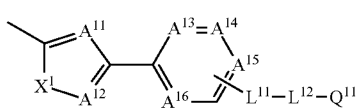

in Formula (A), $A^{11}$ and $A^{12}$ each independently represent a nitrogen atom or methine;

$A^{13}$, $A^{14}$, $A^{15}$, and $A^{16}$ each independently represent a nitrogen atom or methine (here, a hydrogen atom of methine may be substituted with a substituent $-L^{11}-L^{12}-Q^{11}$);

$X^1$ represents an oxygen atom, a sulfur atom, methylene, or imino;

$L^{11}$ represents a hetero 5-membered ring group;

$L^{12}$ represents an alkylene group or an alkenylene group, one $CH_2$ group or each of non-adjacent two or more $CH_2$ groups existing in a group of these alkylene groups or alkenylene groups may be substituted with —O—, —COO—, —OCO—, —OCOO—, —CO—, —S—, $—SO_2—$, —NR—, $—NRSO_2—$, or $—SO_2NR—$ (R represents a hydrogen atom or an alkyl group having 1 to 4 carbon atoms), and one or more hydrogen atoms existing in these groups may be substituted with a halogen atom;

$Q^{11}$ each independently represent a polymerizable group, a hydrogen atom, —OH, —COOH, or a halogen atom;

Formula (C)

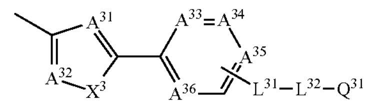

in Formula (C), $A^{31}$ and $A^{32}$ each independently represent a nitrogen atom or methine, $A^{33}$, $A^{34}$, $A^{35}$, and $A^{36}$ each independently represent a nitrogen atom or methine (here, a hydrogen atom of methine may be substituted with a substituent $-L^{31}-L^{32}-Q^{31}$);

$X^3$ represents an oxygen atom, a sulfur atom, methylene, or imino;

$L^{31}$ represents a hetero 5-membered ring group;

$L^{32}$ represents an alkylene group or an alkenylene group, one $CH_2$ group or each of non-adjacent two or more $CH_2$ groups existing in a group of these alkylene groups or alkenylene groups may be substituted with —O—, —COO—, —OCO—, —OCOO—, —CO—, —S—, $—SO_2—$, —NR—, $—NRSO_2—$, or $—SO_2NR—$ (R represents a hydrogen atom or an alkyl group having 1 to 4 carbon atoms), and one or more hydrogen atoms existing in these groups may be substituted with a halogen atom; and $Q^{31}$ each independently represent a polymerizable group, a hydrogen atom, —OH, —COOH, or a halogen atom.

In Formula (1), $Y^{11}$, $Y^{12}$, and $Y^{13}$ each independently represent methine or a nitrogen atom. In a case where $Y^{11}$, $Y^{12}$, and $Y^{13}$ are methine, a hydrogen atom of methine may be substituted with a substituent. Preferable examples of the substituent that may have methine include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Among these substituents, an alkyl group, an alkoxy group, an alkoxycarbonyl group, an acyloxy group, a halogen atom, and a cyano group are more preferable, and an alkyl group having 1 to 12 carbon atoms, an alkoxy group having 1 to 12 carbon atoms, an alkoxycarbonyl group having 2 to 12 carbon atoms, an acyloxy group having 2 to 12 carbon atoms, a halogen atom, and a cyano group are even more preferable.

In view of easiness of synthesis of the compound and the cost thereof, it is preferable that all of $Y^{11}$, $Y^{12}$, and $Y^{13}$ are methine, and it is more preferable that methine is unsubstituted. That is, a preferable example of the compound represented by Formula (1) includes a compound represented by Formula (1a), in which $Y^{11}$, $Y^{12}$ and $Y^{13}$ are unsubstituted methine.

Formula (1a)

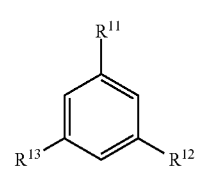

In Formulae (1) and (1a), $R^{11}$, $R^{12}$ and $R^{13}$ each independently represent a hydrogen atom, or Formula (A) or (C). Here, at least two of $R^{11}$, $R^{12}$, and $R^{13}$ are Formula (A) or (C). In view of synthesis and optical performances, Formula (A) or (C) is preferable and Formula (A) is more preferable. $R^{11}$, $R^{12}$, and $R^{13}$ are preferably $R^{11}=R^{12}=R^{13}$.

It is preferable that all of $R^{11}$, $R^{12}$, and $R^{13}$ are Formula (A) or (C), since a temperature range exhibiting a liquid crystalline phase tends to be wider.

Formula (A)

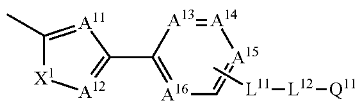

In Formula (A), $A^{11}$ and $A^{12}$ each independently represent a nitrogen atom or methine, $A^{13}$, $A^{14}$, $A^{15}$, and $A^{16}$ each independently represent a nitrogen atom or methine (here, a hydrogen atom of methine may be substituted with a substituent $-L^{11}-L^{12}-Q^{11}$).

It is preferable that at least one of $A^{11}$ and $A^{12}$ is a nitrogen atom, and it is more preferable that both are nitrogen atoms.

Among these, it is preferable that at least three of $A^{13}$, $A^{14}$, $A^{15}$, and $A^{16}$ are methine, and it is more preferable that all are methine. Here, a hydrogen atom of methine may be substituted with a substituent $-L^{11}-L^{12}-Q^{11}$. In view of high Δn, it is preferable that all of $A^{13}$, $A^{14}$, $A^{15}$, and $A^{16}$ are unsubstituted methine (that is, the substituent $-L^{11}-L^{12}-Q^{11}$ is bonded to a meta position), or that $A^{13}$, $A^{14}$, and $A^{16}$ are unsubstituted methine, and $A^{15}$ is a carbon atom to which the substituent $-L^{11}-L^{12}-Q^{11}$ is bonded (that is, the substituent $-L^{11}-L^{12}-Q^{11}$ is bonded to a para position), and it is more preferable that, in view of wavelength dispersion properties of Δn, all of $A^{13}$, $A^{14}$, $A^{15}$, and $A^{16}$ are unsubstituted methine (that is, a substituent $-L^{11}-L^{12}-Q^{11}$ is bonded to a meta position).

In a case where each of $A^{11}$ to $A^{16}$ represents methine, a hydrogen atom of methine may be substituted with a substituent other than the above. Examples thereof include a halogen atom (a fluorine atom, a chlorine atom, a bromine atom, and an iodine atom), a cyano group, a nitro group, an alkyl group having 1 to 16 carbon atoms, an alkenyl group having 2 to 16 carbon atoms, an alkynyl group having 2 to 16 carbon atoms, an alkyl group substituted with halogen having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 16 carbon atoms. Among these, a halogen atom, a cyano group, an alkyl group having 1 to 6 carbon atoms, and an alkyl group substituted with halogen having 1 to 6 carbon atoms are preferable, a halogen atom, an alkyl group having 1 to 4 carbon atoms, and an alkyl group substituted with halogen having 1 to 4 carbon atoms are more preferable, a halogen atom, an alkyl group having 1 to 3 carbon atoms, and a trifluoromethyl group are even more preferable.

In Formula (A), $X^1$ represents an oxygen atom, a sulfur atom, methylene, or imino, and an oxygen atom is preferable.

Formula (C)

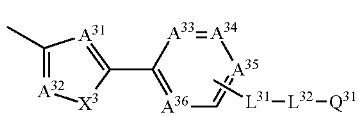

In Formula (C), $A^{31}$ and $A^{32}$ each independently represent a nitrogen atom or methine, $A^{33}$, $A^{34}$, $A^{35}$, and $A^{36}$ each independently represent a nitrogen atom or methine (here, a hydrogen atom of methine may be substituted with a substituent $-L^{31}-L^{32}-Q^{31}$).

It is preferable that at least one of $A^{31}$ and $A^{32}$ is a nitrogen atom, and it is more preferable that both are nitrogen atoms.

Among these, it is preferable that at least three of $A^{33}$, $A^{34}$, $A^{35}$, and $A^{36}$ are methine, and it is more preferable that all are methine. Here, a hydrogen atom of methine may be substituted with a substituent $-L^{31}-L^{32}-Q^{31}$. In view of high Δn, it is preferable that all of $A^{33}$, $A^{34}$, $A^{35}$, and $A^{36}$ are unsubstituted methine (that is, the substituent $-L^{31}-L^{32}-Q^{31}$ is bonded to a meta position), or that $A^{33}$, $A^{34}$, and $A^{36}$ are unsubstituted methine, and $A^{35}$ is a carbon atom to which the substituent $-L^{31}-L^{32}-Q^{31}$ is bonded (that is, the substituent $-L^{31}-L^{32}-Q^{31}$ is bonded to a para position), and it is more preferable that, in view of wavelength dispersion properties of Δn, all of $A^{33}$, $A^{34}$, $A^{35}$, and $A^{36}$ are unsubstituted methine (that is, a substituent $-L^{31}-L^{32}-Q^{31}$ is bonded to a meta position).

In a case where each of $A^{31}$ to $A^{36}$ represents methine, a hydrogen atom of methine may be substituted with a substituent other than the above, and examples of the substituent thereof are the same as the examples of the substituent that can be substituted with a hydrogen atom of methine of $A^{11}$ to $A^{16}$ in Formula (A).

In Formula (C), $X^3$ represents an oxygen atom, a sulfur atom, methylene, or imino, and an oxygen atom is preferable.

$L^{11}$ in Formula (A) and $L^{31}$ in Formula (C) each independently represent a hetero 5-membered ring group. The above hetero 5-membered ring is a 5-membered ring containing at least one heteroatom such as a nitrogen atom, an oxygen atom, and a sulfur atom as a ring-constituting atom, and may be an aromatic ring or a non-aromatic ring. Among these, a group represented by any one of the followings is preferable.

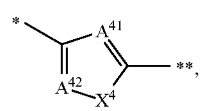

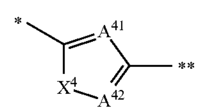

In the formula, * represents a region that is bonded to a 6-membered ring, ** represents a region bonded to each of $L^{12}$ and $L^{32}$; $A^{41}$ and $A^{42}$ each independently represent methine or a nitrogen atom; and $X^4$ represents an oxygen atom, a sulfur atom, methylene, or imino.

It is preferable that at least one of $A^{41}$ and $A^{42}$ is a nitrogen atom, and it is more preferable that both are nitrogen atoms. It is preferable that $X^4$ is an oxygen atom.

Specific examples of $L^{11}$ and $L^{31}$ include the followings.

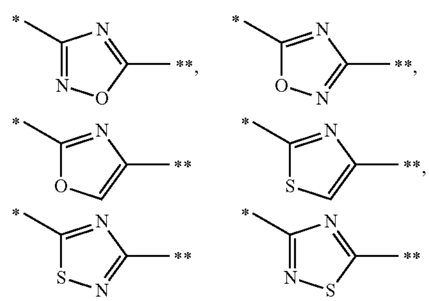

$L^{12}$ in Formula (A) and $L^{32}$ in Formula (C) each independently represent an alkylene group or an alkenylene group, one $CH_2$ group or each of non-adjacent two or more $CH_2$ groups existing in a group of these alkylene groups or alkenylene groups may be substituted with —O—, —COO—, —OCO—, —OCOO—, —CO—, —S—, —$SO_2$—, —NR—, —$NRSO_2$—, or —$SO_2NR$— (R represents a hydrogen atom or an alkyl group having 1 to 4 carbon atoms), and one or more hydrogen atoms existing in these groups may be substituted with a halogen atom.

It is preferable that the above alkylene group is an alkylene group having 1 to 20 carbon atoms, more preferably an alkylene group having 1 to 16 carbon atoms, and even more preferably an alkylene group having 1 to 12 carbon atoms. It is preferable that the above alkenylene group is an alkenylene group having 2 to 20 carbon atoms, more preferably an alkenylene group having 2 to 16 carbon atoms, and even more preferably an alkenylene group having 2 to 12 carbon atoms.

One $CH_2$ group or each of non-adjacent two or more $CH_2$ groups existing in a group of the above alkylene groups or alkenylene groups may be substituted with one or more selected from the group of divalent groups consisting of —O—, —COO—, —OCO—, —OCOO—, —CO—, —S—, —$SO_2$—, —NR—, —$NRSO_2$—, and —$SO_2NR$— (R represents a hydrogen atom or an alkyl group having 1 to 4 carbon atoms). It is obvious that the $CH_2$ group may be substituted with two or more groups selected from the group of divalent groups. Examples of the alkylene group include —$(CH_2)_m$-L-$(CH_2)_n$—. Here, m and n are the number of 1 or greater, and the sum thereof is preferably 20 or less, more preferably 16 or less, and even more preferably 12 or less, and the sum thereof is preferably 2 or greater and more preferably 4 or greater. L represents any one group selected from the above group of divalent groups.

One or more hydrogen atoms in the alkylene group and the alkenylene group may be substituted with one or more halogen atoms (a fluorine atom, a chlorine atom, a bromine atom, or an iodine atom).

$Q^{11}$ in Formula (A) and $Q^{31}$ in Formula (C) each independently represent a polymerizable group, a hydrogen atom, —OH, —COOH, or a halogen atom (a fluorine atom, a chlorine atom, a bromine atom, or an iodine atom). In order to cause the optical properties of the optical film of the present invention not to change according to the environments such as the temperature, it is preferable that each of $Q^{11}$ and $Q^{31}$ is a polymerizable group (here, even in a case where the compound of Formula (1) does not have a polymerizable group, in a case where the compound used together is polymerizable, the alignment of the compound of Formula (1) can be fixed by causing the polymerization reaction of the other compound). It is preferable that the polymerization reaction is addition polymerization (including ring-opening polymerization) or condensation polymerization. That is, it is preferable that the polymerizable group is a functional group capable of addition polymerization reaction or condensation polymerization reaction. Examples of the polymerizable group are provided below.

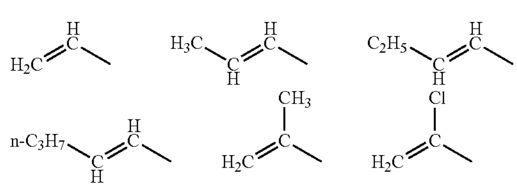

-continued

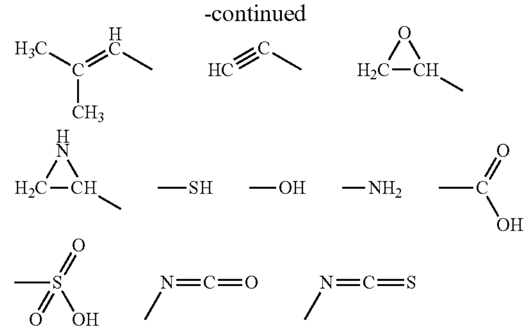

It is particularly preferable that the polymerizable group is a functional group that can perform addition polymerization reaction. As the polymerizable group, a polymerizable ethylenically unsaturated group or a ring-opening polymerizable group is preferable.

Examples of the polymerizable group that can perform the addition polymerization reaction include a polymerizable group represented by the following formula.

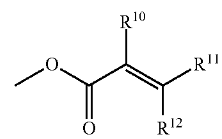

In the formula, $R^{10}$, $R^{11}$ and $R^{12}$ each independently represent a hydrogen atom or an alkyl group. Specific examples thereof include the following groups. The above alkyl group is preferably an alkyl group having 1 to 5 carbon atoms and most preferably a methyl group having 1 carbon atom. Examples of the polymerizable group represented by the above formula include an acrylate group represented by Formula (M-1) and a methacrylate group represented by Formula (M-2).

(M-1)

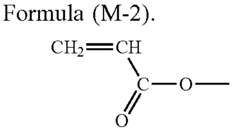

(M-2)

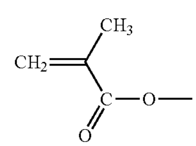

Another example of the polymerizable group that can perform the addition polymerization reaction includes groups represented by Formulae (M-3) to (M-6).

(M-3)

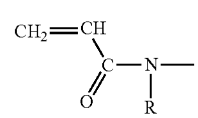

(M-4)

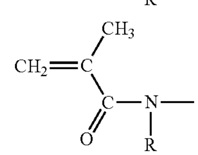

(M-5)

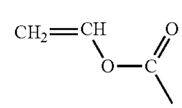

-continued (M-6)

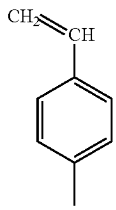

In Formulae (M-3) and (M-4), R represents a hydrogen atom or an alkyl group and is preferably a hydrogen atom or a methyl group.

Among Formulae (M-1) to (M-6), (M-1) or (M-2) is preferable, and (M-1) is more preferable.

The ring-opening polymerizable group is preferably a cyclic ether group, more preferably an epoxy group or an oxetanyl group, and most preferably an epoxy group.

Examples of the compound represented by Formula (1) include the following compounds. However, the range thereof is not limited to these.

In the present specification, Et represents an ethyl group, n-Bu represents an n-butyl group and n-Hex represents an n-hexyl group.

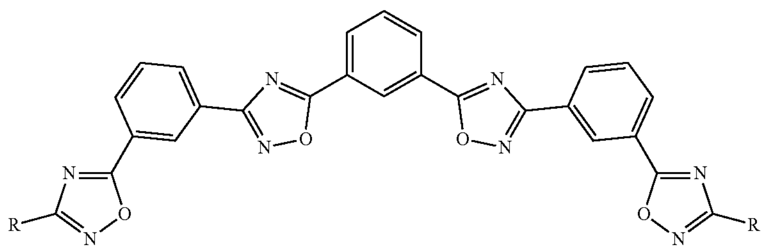

R = Et

R = n-Bu

R = n-Hex

R = 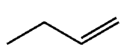

R = 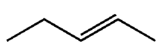

R = 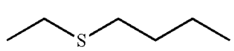

R = 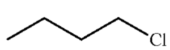

R = 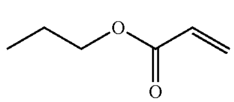

R = 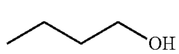

R = 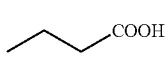

R = 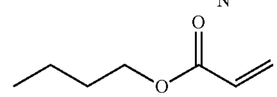

R = 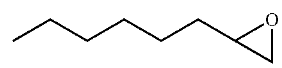

R = 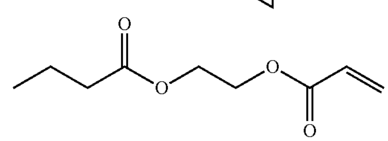

R = 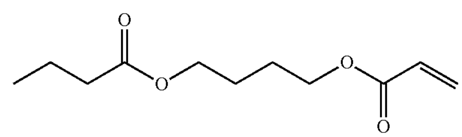

R = 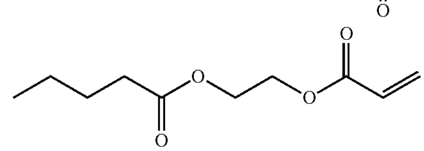

R = 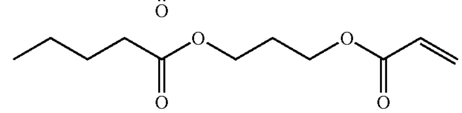

R = 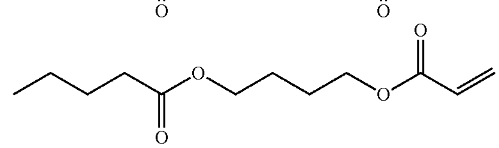

R = 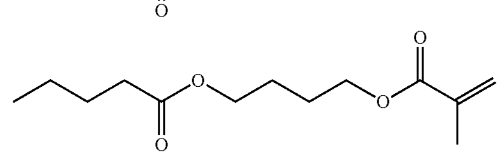

R = 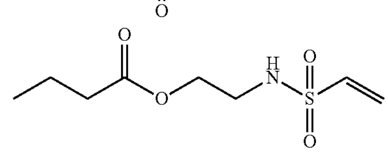

R = 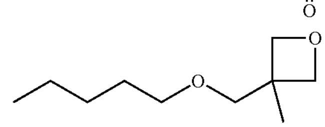

-continued
R = 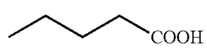
R = 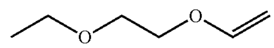
R = 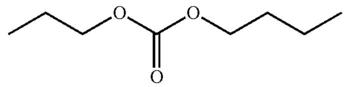
R = 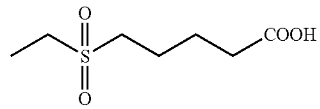
R = 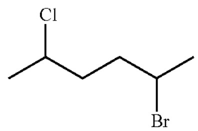
R = 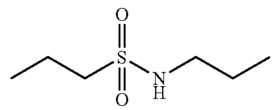
R = 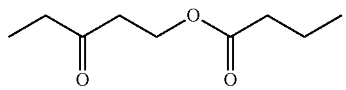
R = 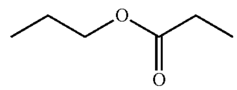
R = 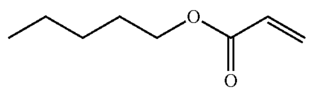
R = 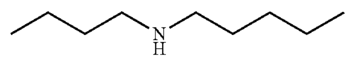
R = 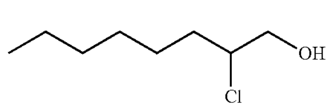
R = 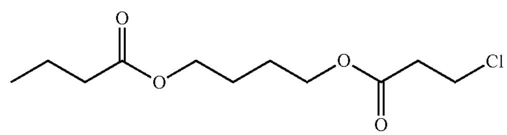
R = 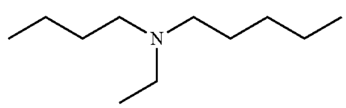
R = 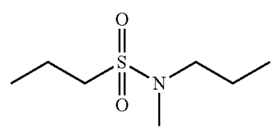
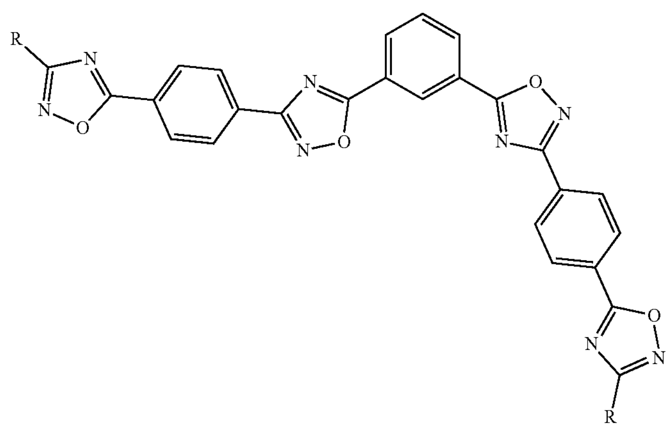
R = Et
R = 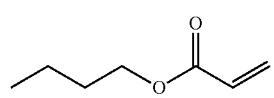
R = n-Bu
R = 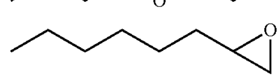
R = n-Hex
R = 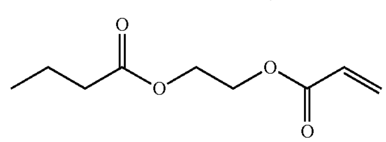
R = 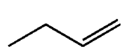
R = 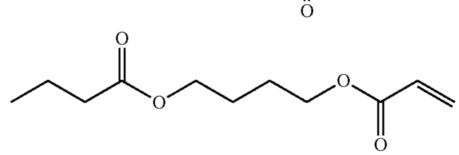

-continued
R = 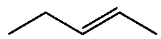
R = 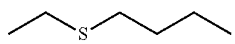
R = 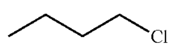
R = 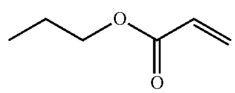
R = 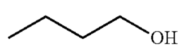
R = 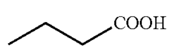
R = 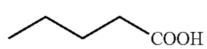
R = 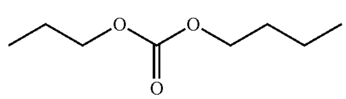
R = 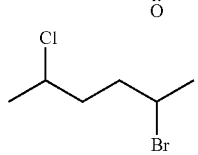
R = 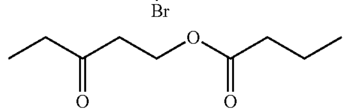
R = 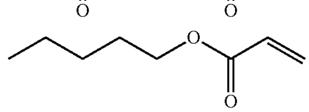
R = 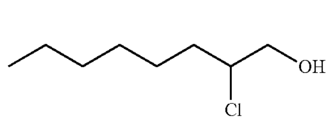
R = 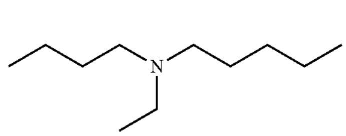
R = 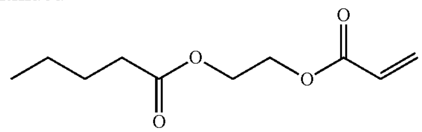
R = 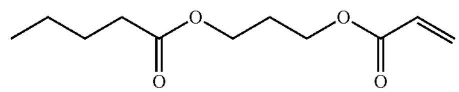
R = 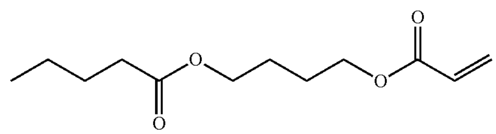
R = 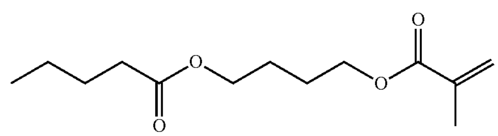
R = 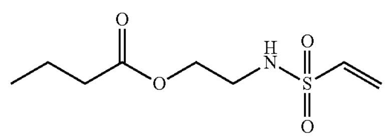
R = 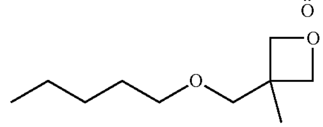
R = 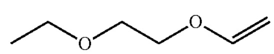
R = 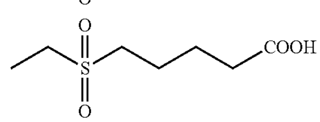
R = 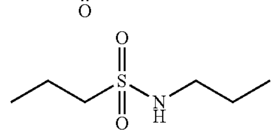
R = 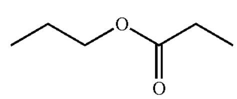
R = 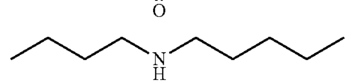
R = 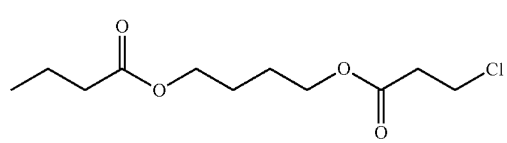
R = 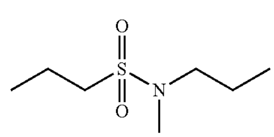
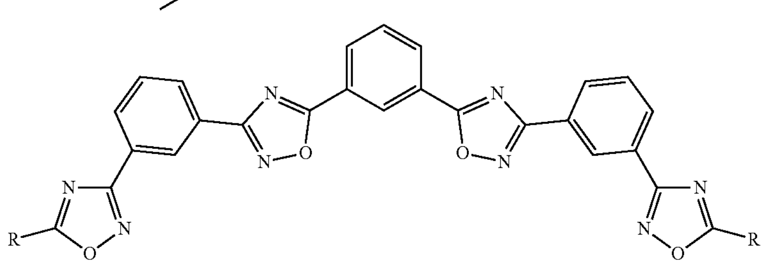

-continued
R = Et
R = n-Bu
R = n-Hex
R = 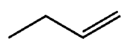
R = 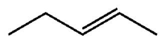
R = 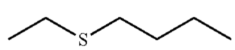
R = 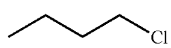
R = 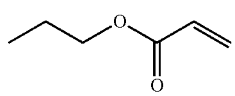
R = 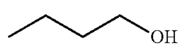
R = 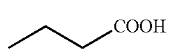
R = 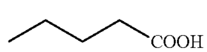
R = 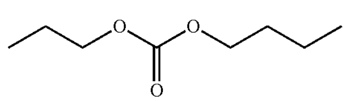
R = 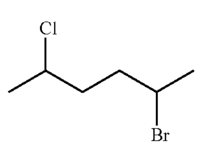
R = 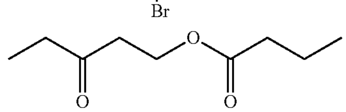
R = 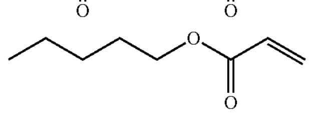
R = 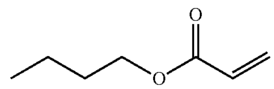
R = 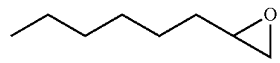
R = 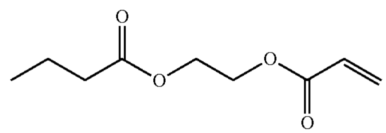
R = 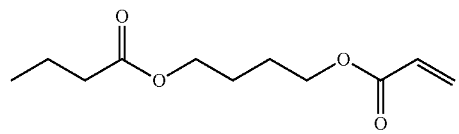
R = 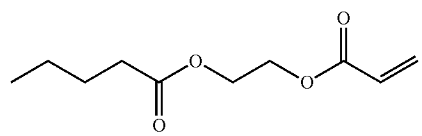
R = 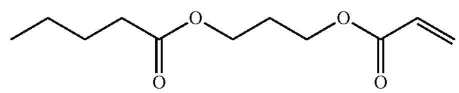
R = 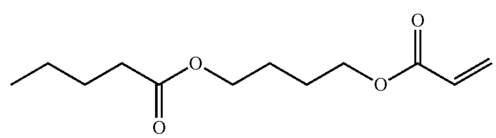
R = 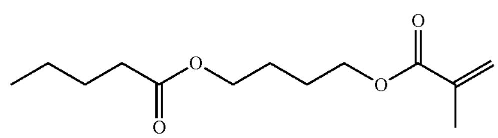
R = 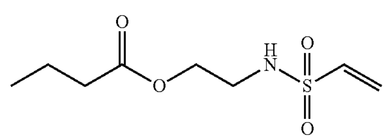
R = 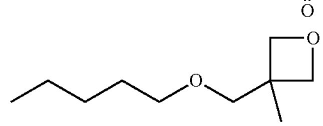
R = 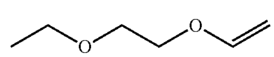
R = 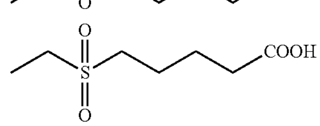
R = 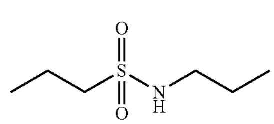
R = 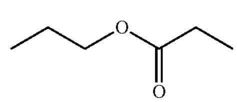
R = 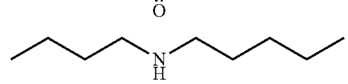

-continued
R = 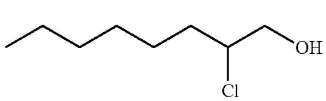
R = 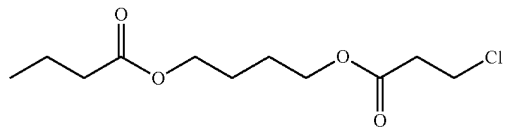
R = 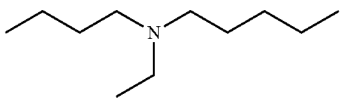
R = 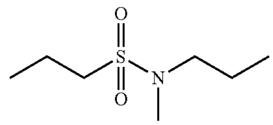
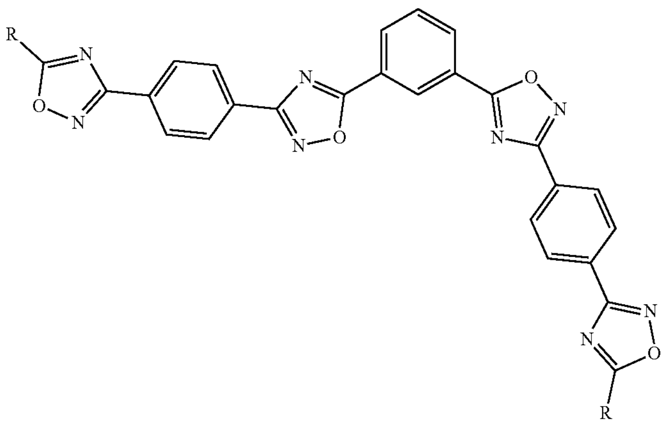
R = Et
R = 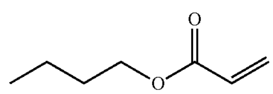
R = n-Bu
R = 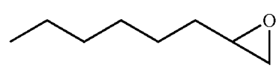
R = n-Hex
R = 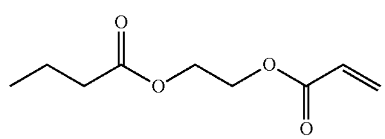
R = 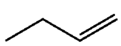
R = 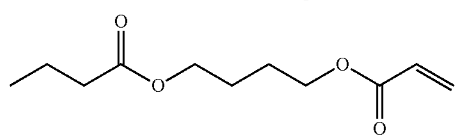
R = 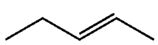
R = 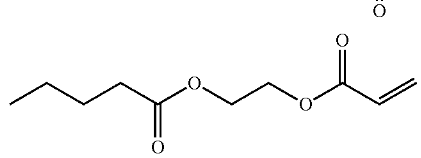
R = 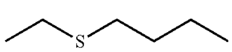
R = 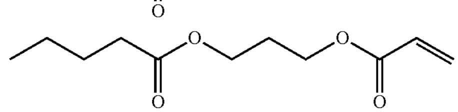
R = 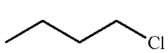
R = 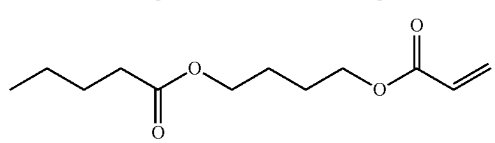
R = 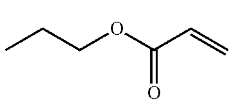
R = 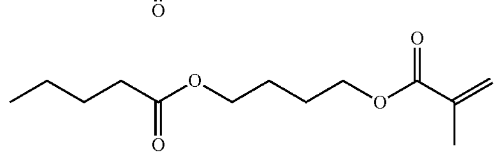

-continued
R = 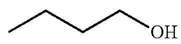
R = 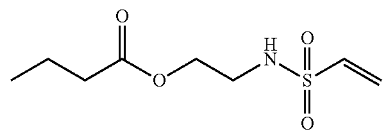
R = 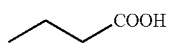
R = 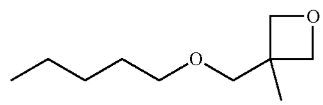
R = 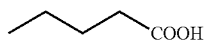
R = 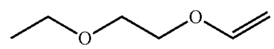
R = 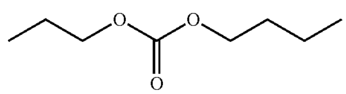
R = 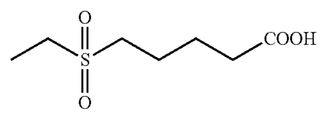
R = 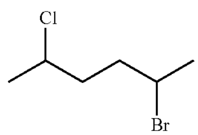
R = 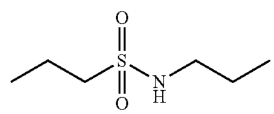
R = 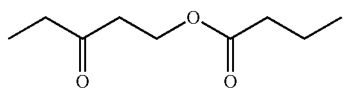
R = 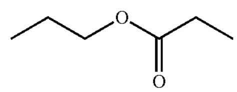
R = 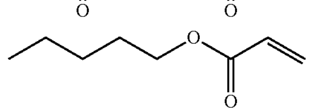
R = 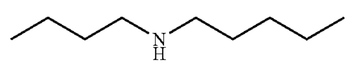
R = 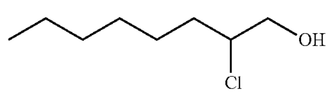
R = 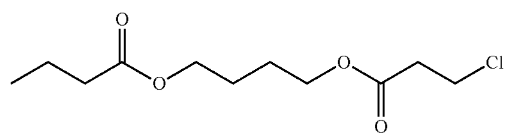
R = 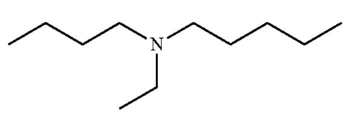
R = 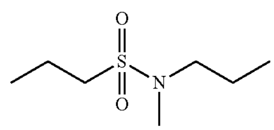
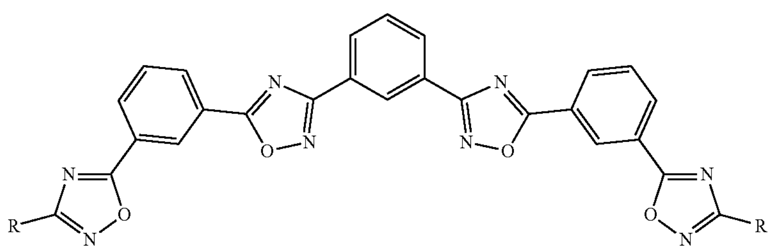
R = Et
R = 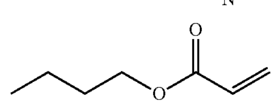
R = n-Bu
R = 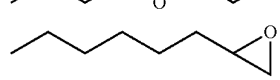
R = n-Hex
R = 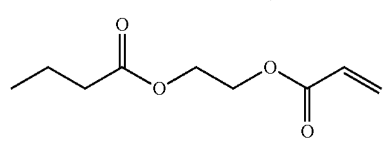
R = 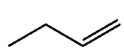
R = 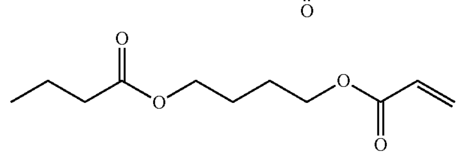

-continued
R = 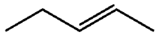
R = 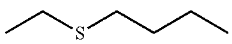
R = 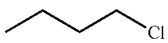
R = 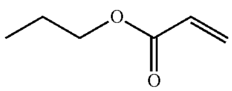
R = 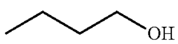
R = 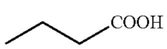
R = 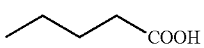
R = 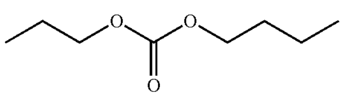
R = 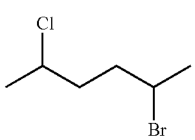
R = 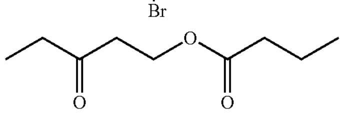
R = 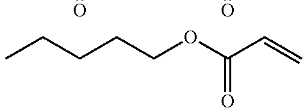
R = 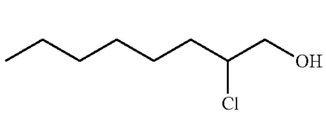
R = 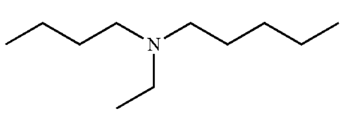
R = 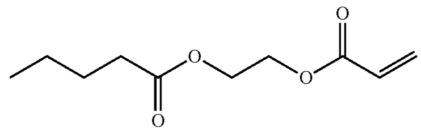
R = 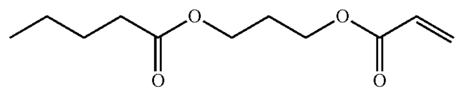
R = 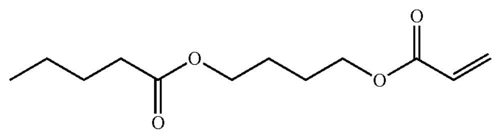
R = 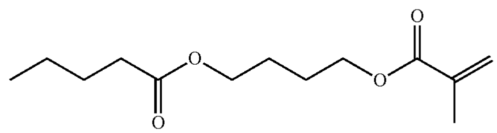
R = 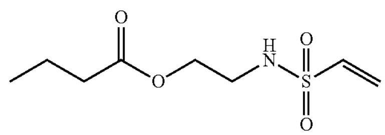
R = 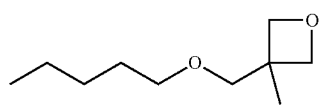
R = 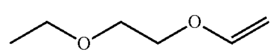
R = 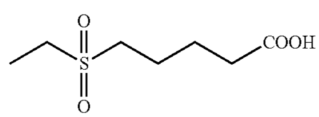
R = 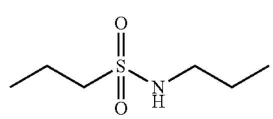
R = 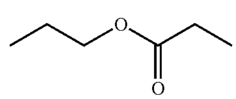
R = 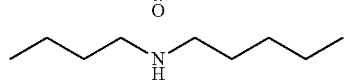
R = 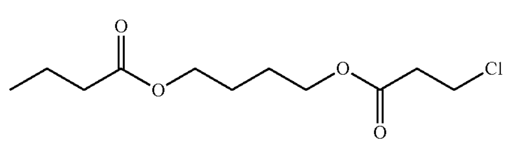
R = 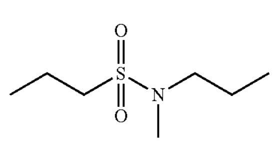

-continued
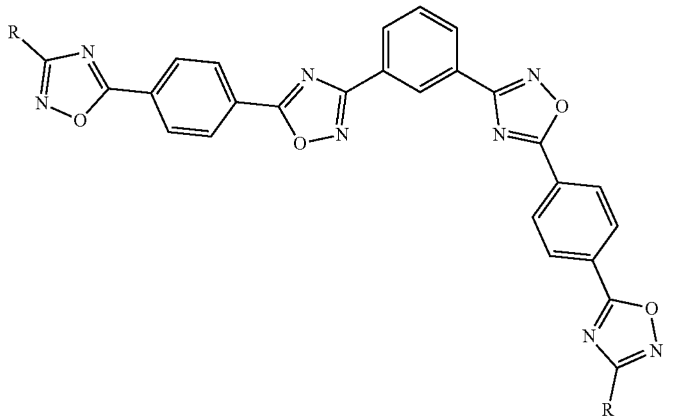
R = Et
R = n-Bu
R = n-Hex
R = 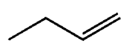
R = 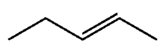
R = 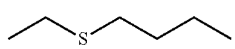
R = 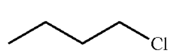
R = 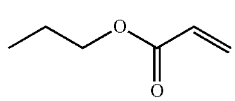
R = 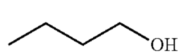
R = 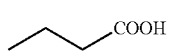
R = 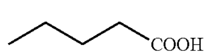
R = 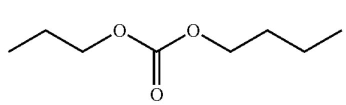
R = 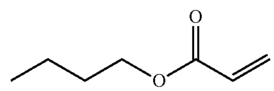
R = 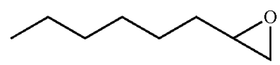
R = 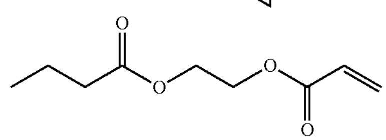
R = 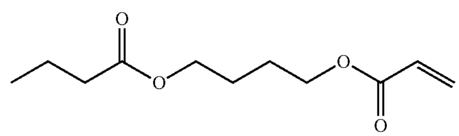
R = 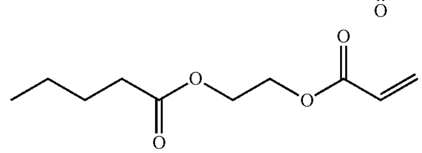
R = 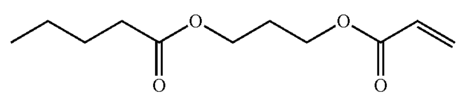
R = 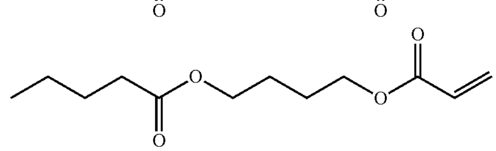
R = 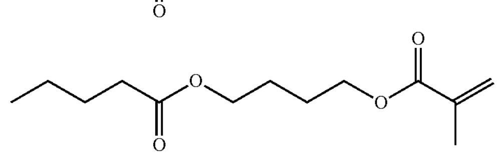
R = 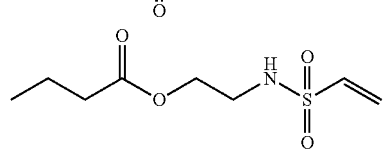
R = 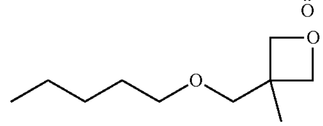
R = 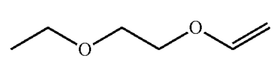
R = 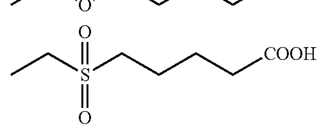

-continued
R = 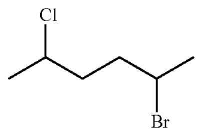 R = 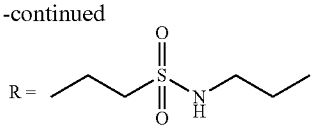
R = 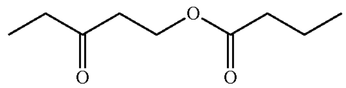 R = 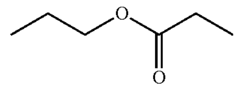
R = 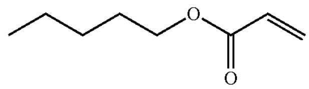 R = 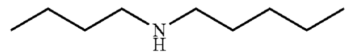
R = 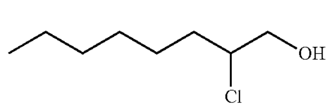 R = 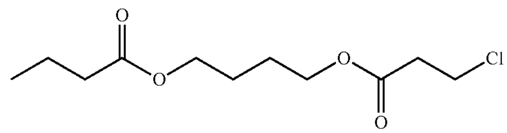
R = 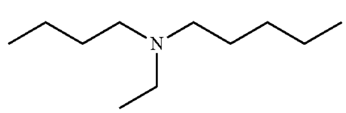 R = 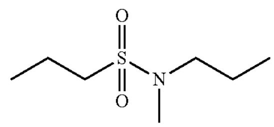
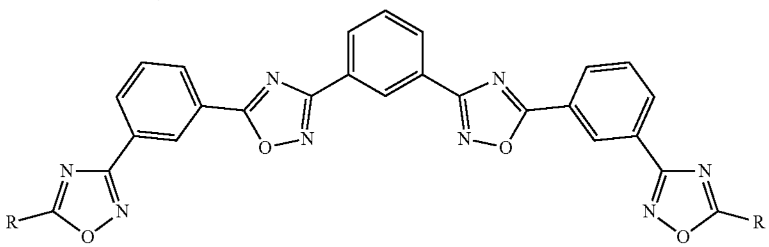
R = Et R = 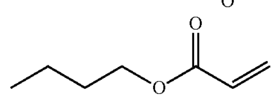
R = n-Bu R = 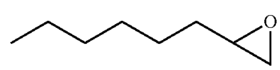
R = n-Hex R = 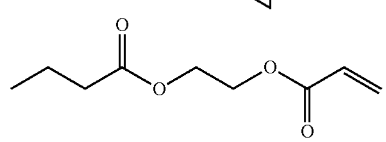
R = 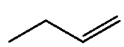 R = 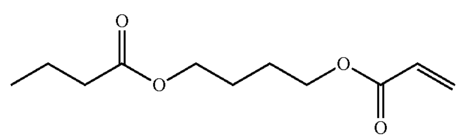
R = 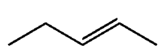 R = 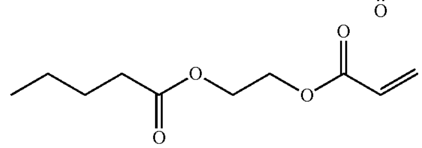
R = 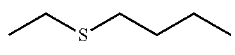 R = 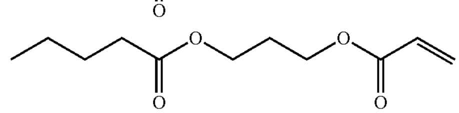
R = 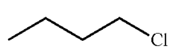 R = 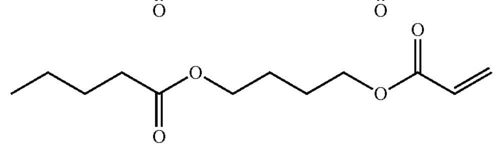
R = 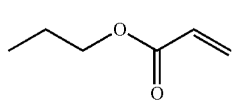 R = 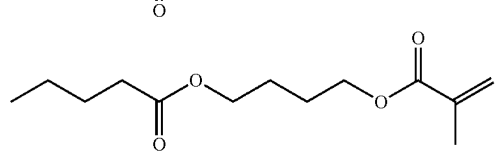

-continued
R = 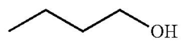 R = 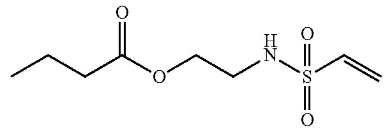
R = 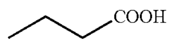 R = 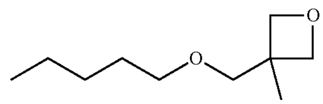
R = 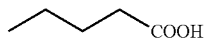 R = 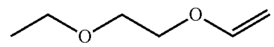
R = 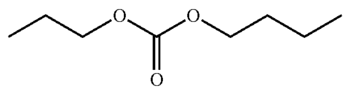 R = 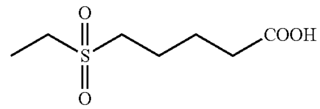
R = 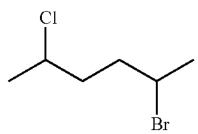 R = 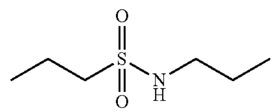
R = 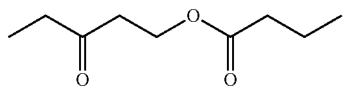 R = 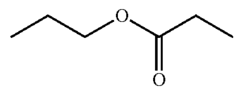
R = 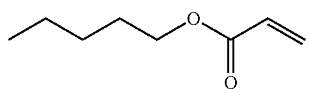 R = 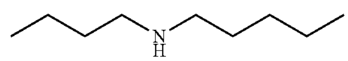
R = 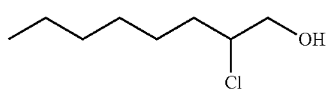 R = 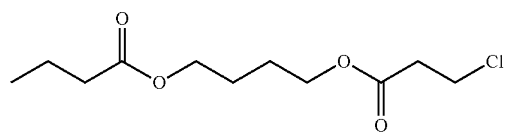
R = 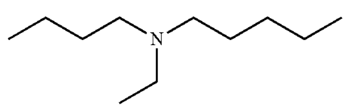 R = 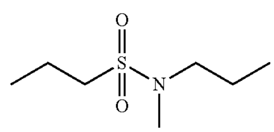
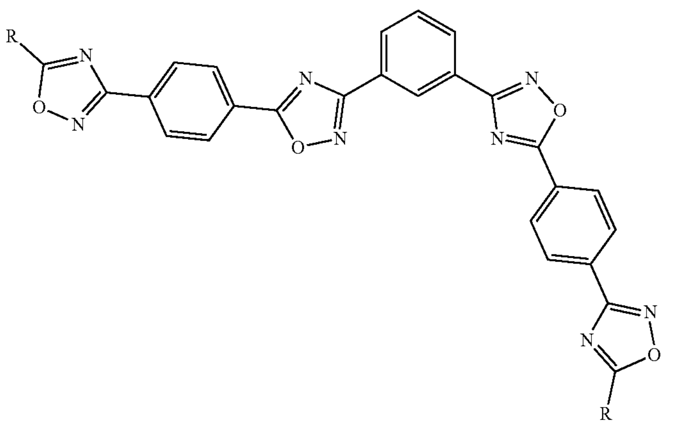
R = Et R = 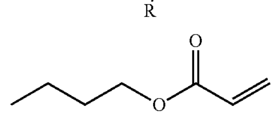
R = n-Bu R = 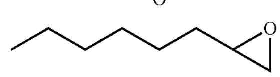

-continued
R = n-Hex
R = 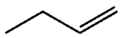
R = 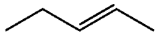
R = 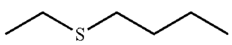
R = 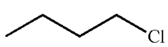
R = 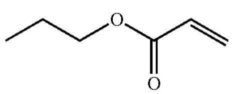
R = 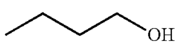
R = 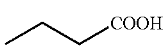
R = 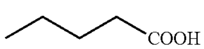
R = 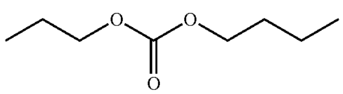
R = 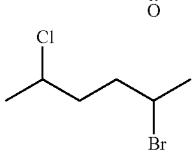
R = 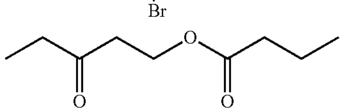
R = 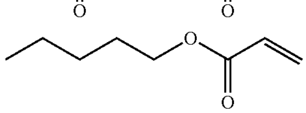
R = 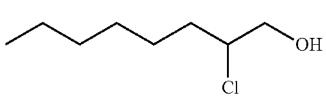
R = 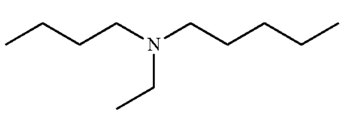
R = 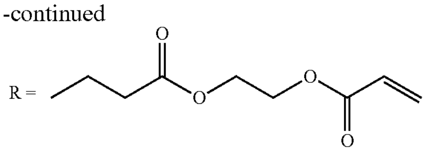
R = 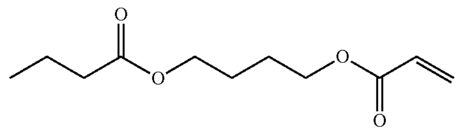
R = 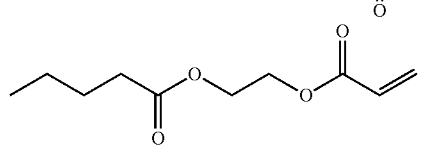
R = 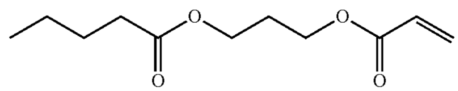
R = 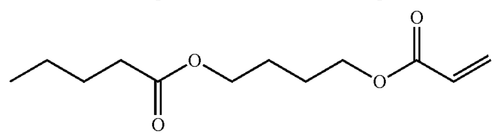
R = 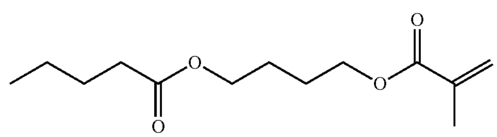
R = 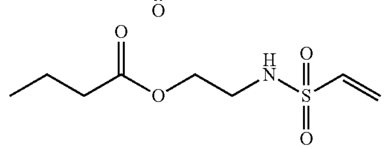
R = 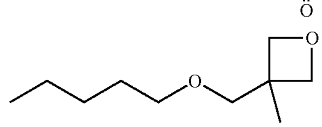
R = 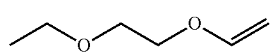
R = 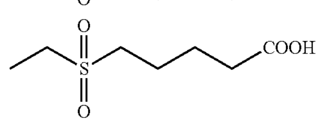
R = 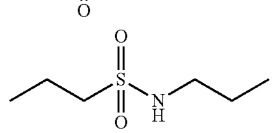
R = 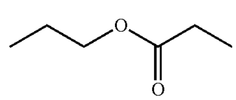
R = 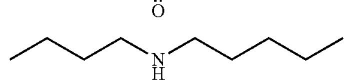
R = 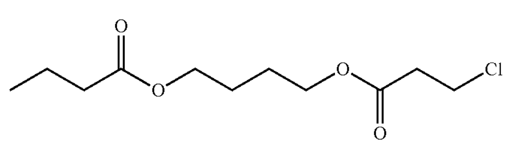
R = 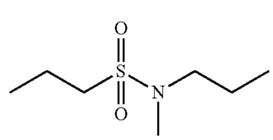

-continued
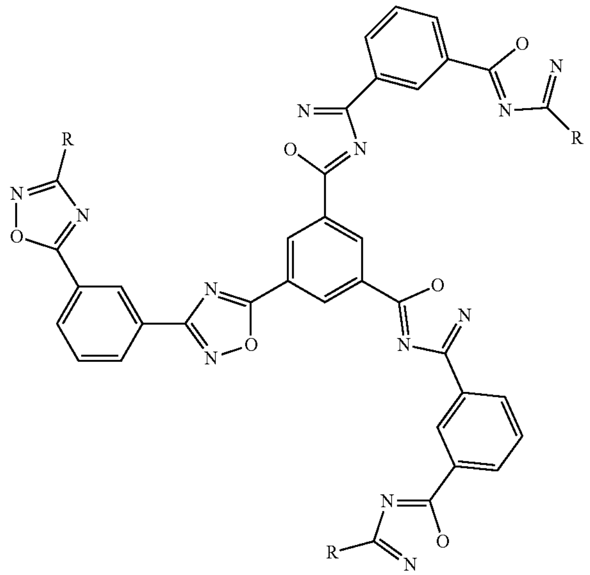
R = Et
R = 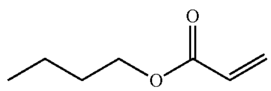
R = n-Bu
R = 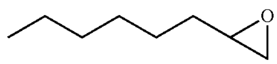
R = n-Hex
R = 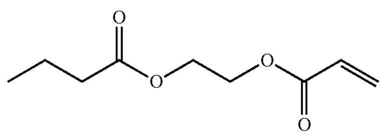
R = 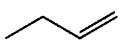
R = 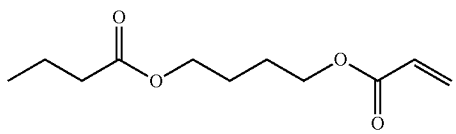
R = 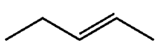
R = 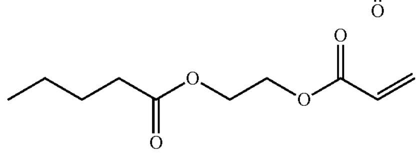
R = 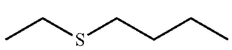
R = 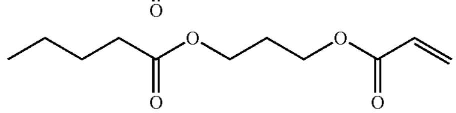
R = 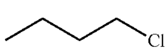
R = 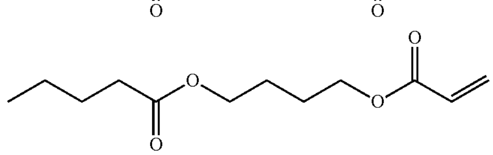
R = 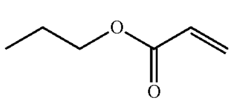
R = 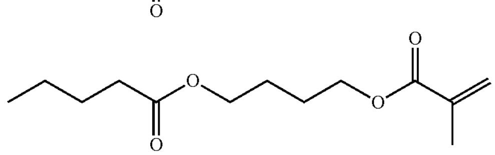
R = 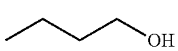
R = 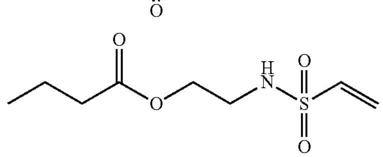
R = 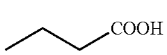
R = 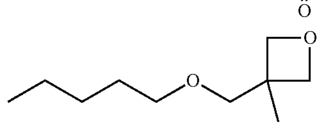

-continued
R = 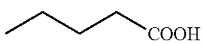
R = 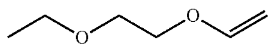
R = 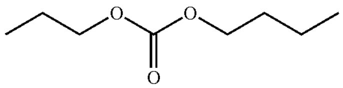
R = 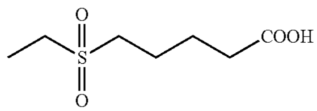
R = 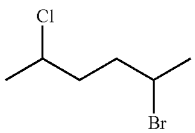
R = 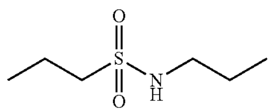
R = 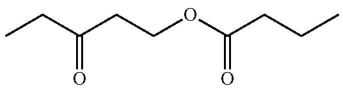
R = 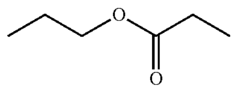
R = 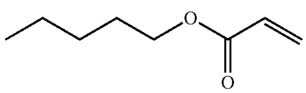
R = 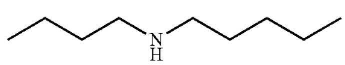
R = 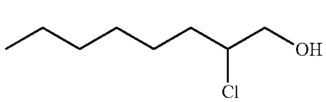
R = 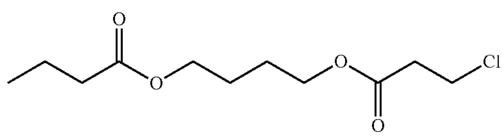
R = 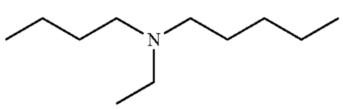
R = 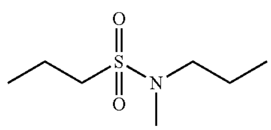
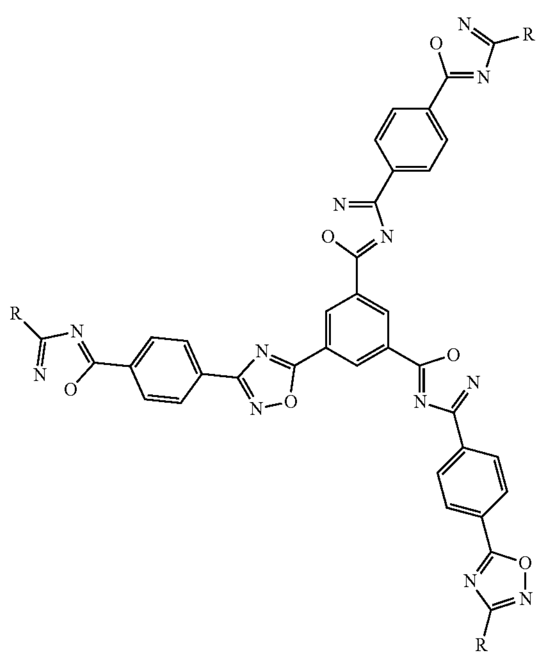
R = Et
R = 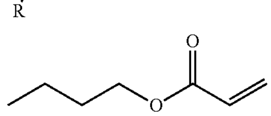
R = n-Bu
R = 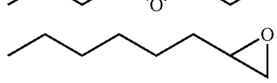

-continued
R = n-Hex
R = 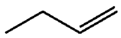
R = 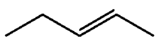
R = 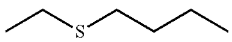
R = 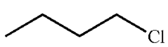
R = 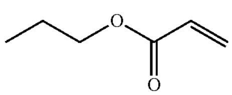
R = 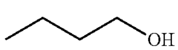
R = 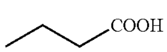
R = 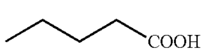
R = 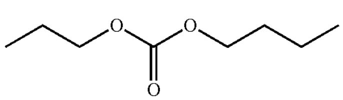
R = 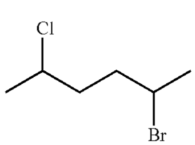
R = 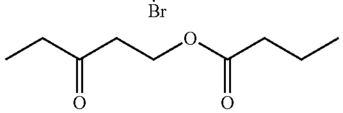
R = 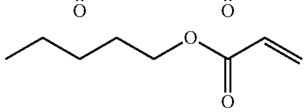
R = 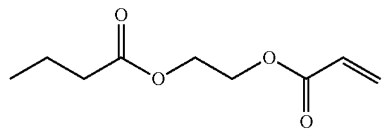
R = 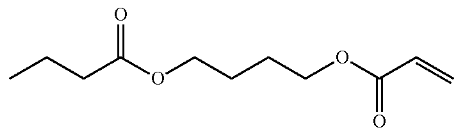
R = 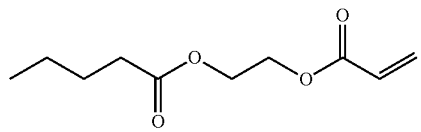
R = 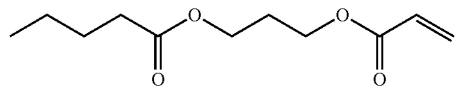
R = 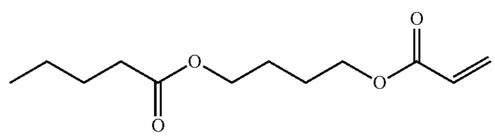
R = 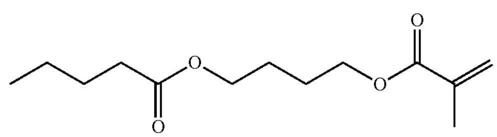
R = 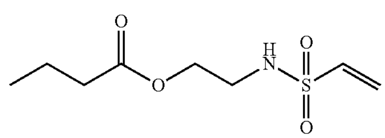
R = 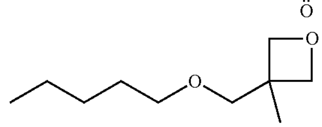
R = 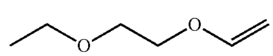
R = 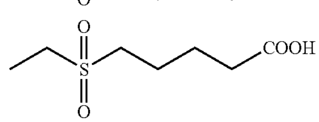
R = 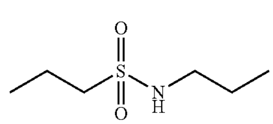
R = 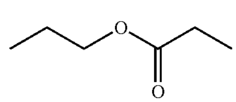
R = 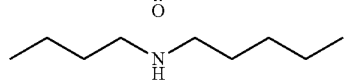

-continued
R = 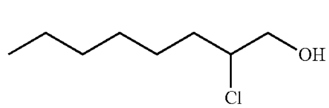
R = 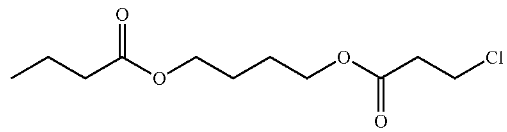
R = 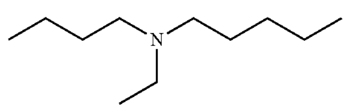
R = 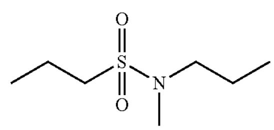
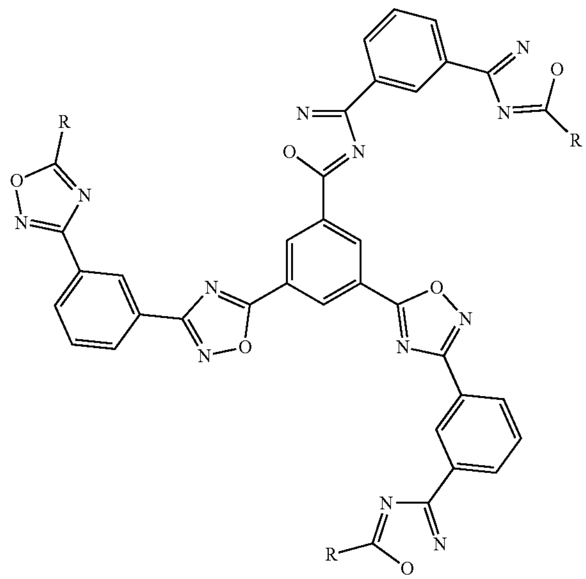
R = Et
R = 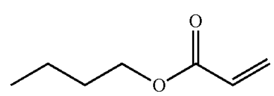
R = n-Bu
R = 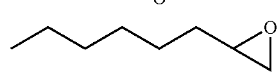
R = n-Hex
R = 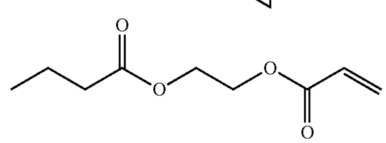
R = 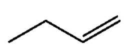
R = 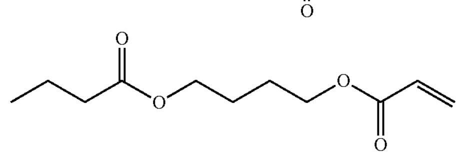
R = 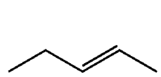
R = 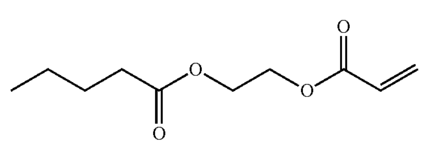
R = 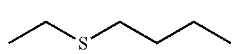
R = 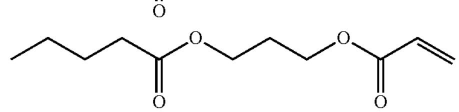

-continued
R = 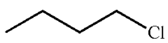
R = 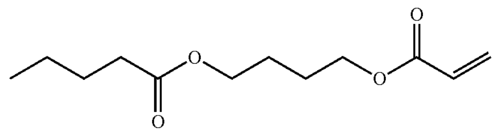
R = 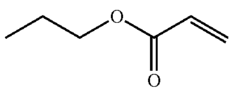
R = 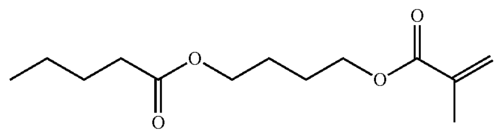
R = 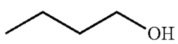
R = 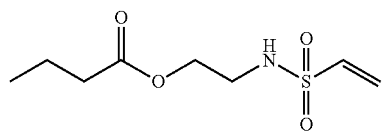
R = 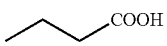
R = 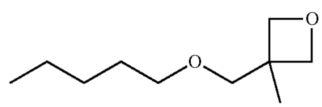
R = 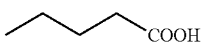
R = 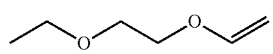
R = 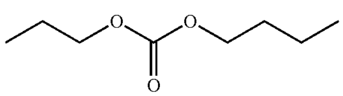
R = 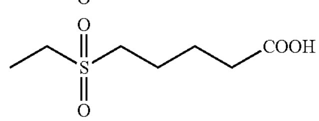
R = 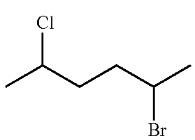
R = 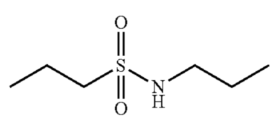
R = 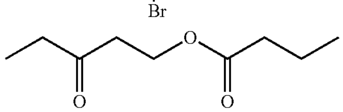
R = 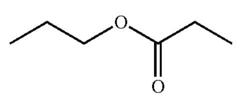
R = 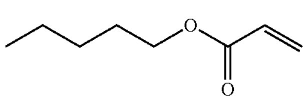
R = 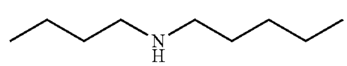
R = 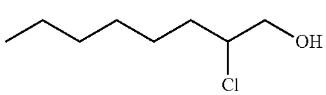
R = 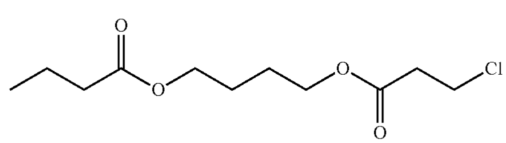
R = 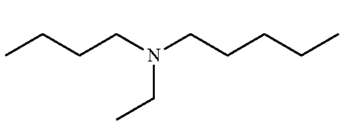
R = 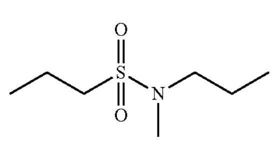

-continued
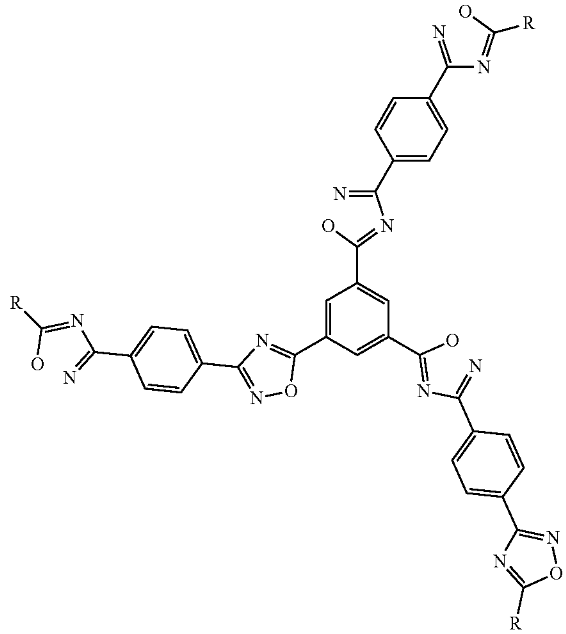
R = Et
R = 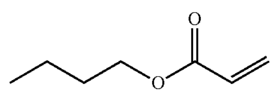
R = n-Bu
R = 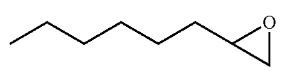
R = n-Hex
R = 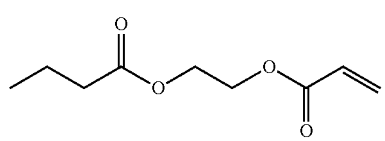
R = 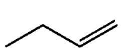
R = 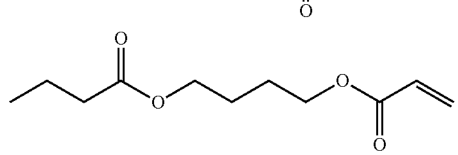
R = 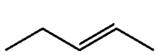
R = 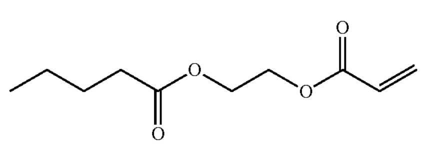
R = 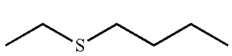
R = 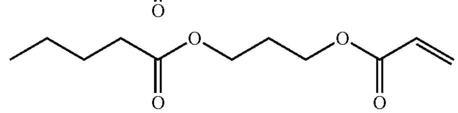
R = 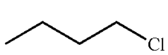
R = 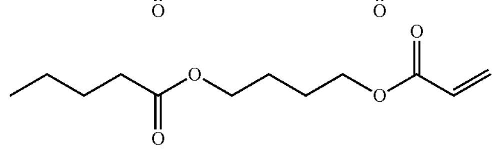
R = 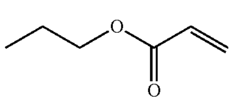
R = 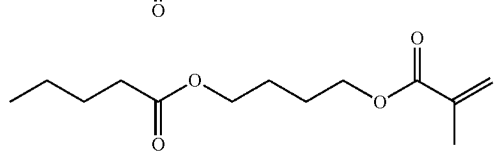

-continued
R = 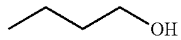
R = 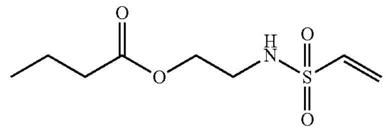
R = 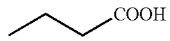
R = 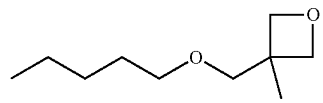
R = 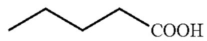
R = 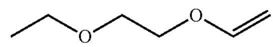
R = 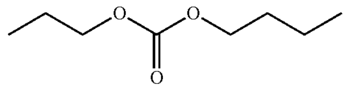
R = 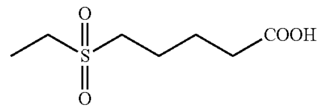
R = 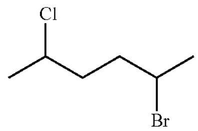
R = 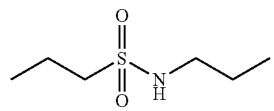
R = 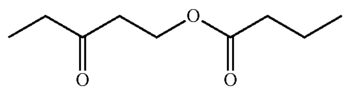
R = 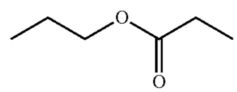
R = 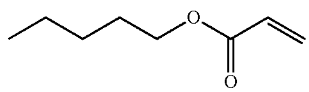
R = 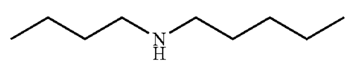
R = 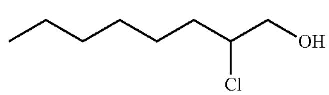
R = 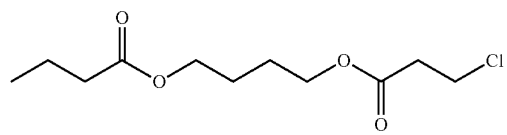
R = 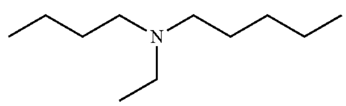
R = 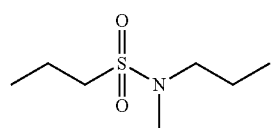
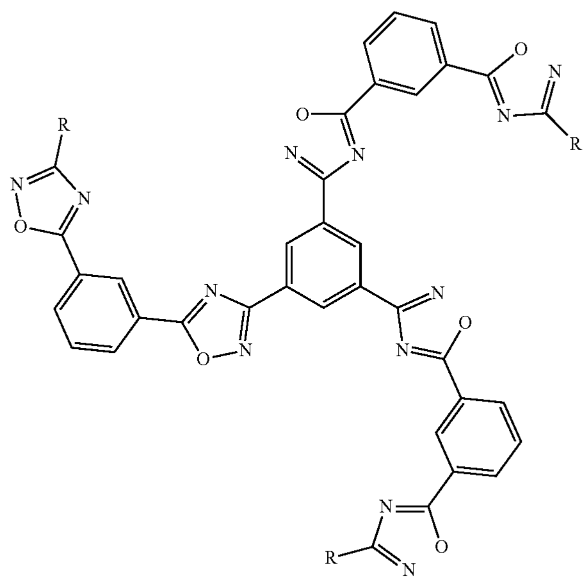
R = Et
R = 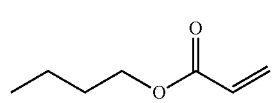
R = n-Bu
R = 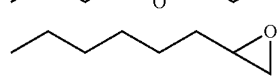

-continued
R = n-Hex
R = 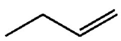
R = 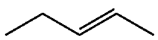
R = 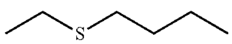
R = 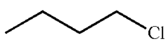
R = 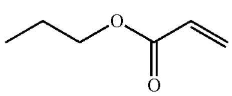
R = 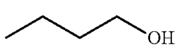
R = 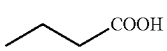
R = 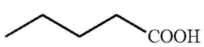
R = 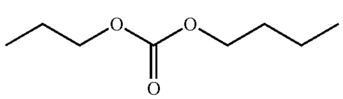
R = 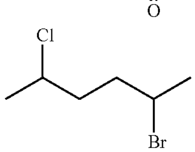
R = 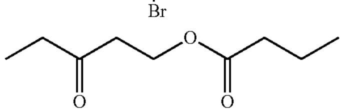
R = 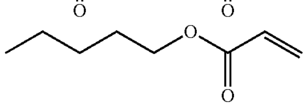
R = 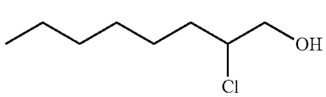
R = 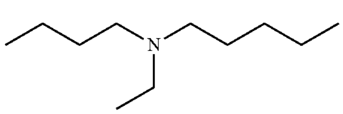
R = 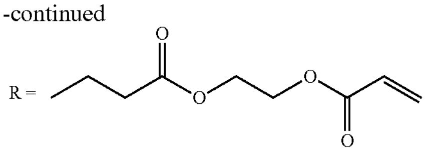
R = 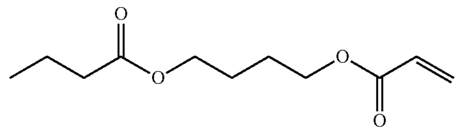
R = 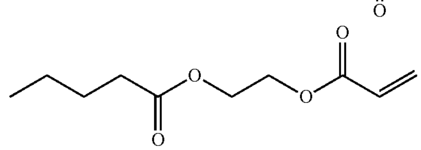
R = 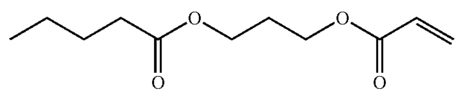
R = 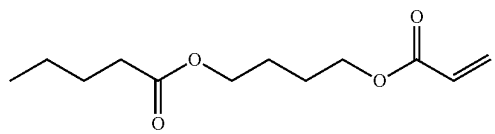
R = 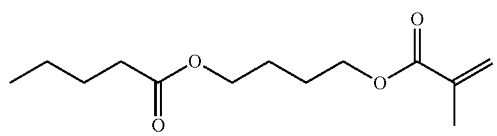
R = 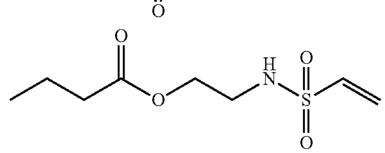
R = 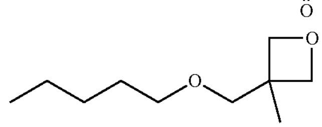
R = 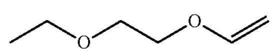
R = 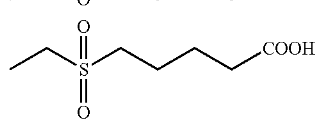
R = 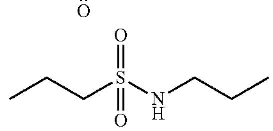
R = 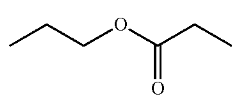
R = 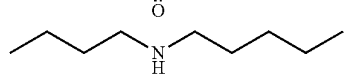
R = 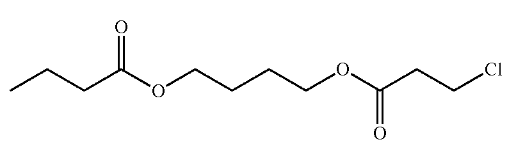
R = 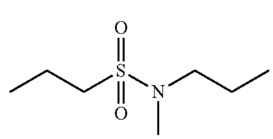

-continued
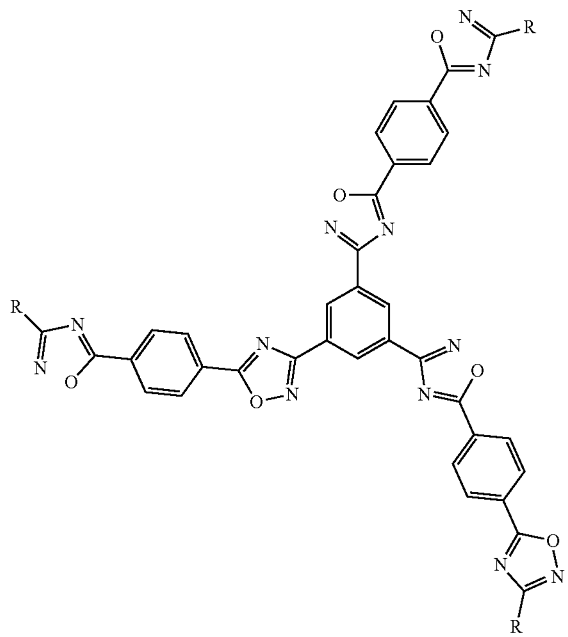
R = Et
R = 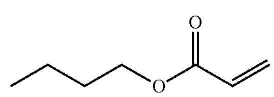
R = n-Bu
R = 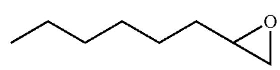
R = n-Hex
R = 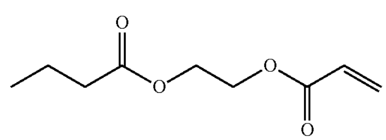
R = 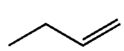
R = 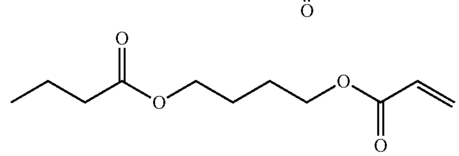
R = 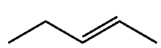
R = 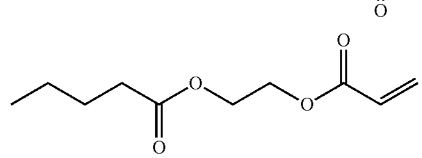
R = 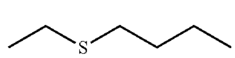
R = 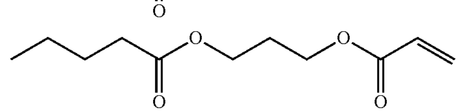
R = 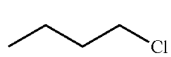
R = 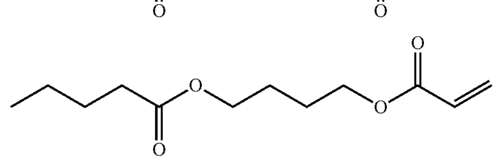
R = 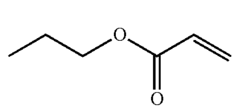
R = 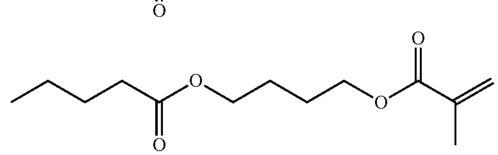

-continued
R = 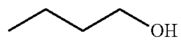
R = 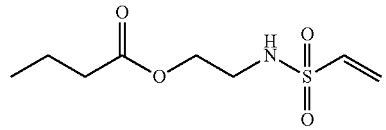
R = 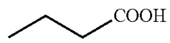
R = 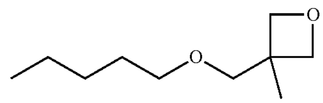
R = 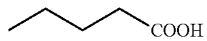
R = 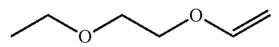
R = 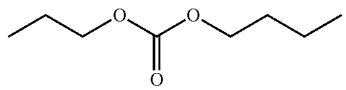
R = 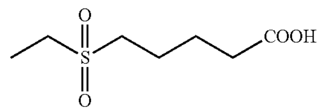
R = 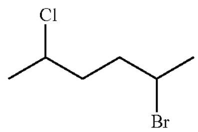
R = 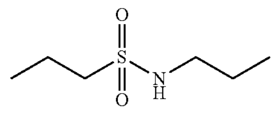
R = 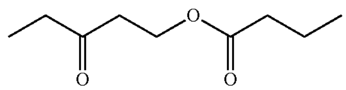
R = 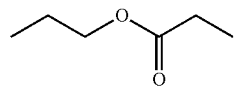
R = 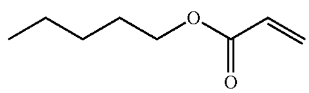
R = 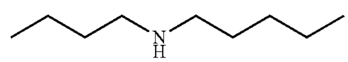
R = 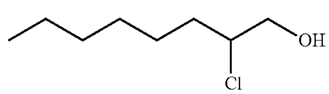
R = 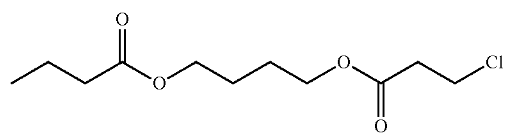
R = 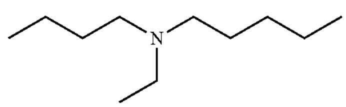
R = 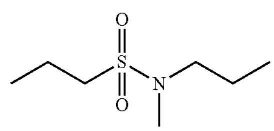
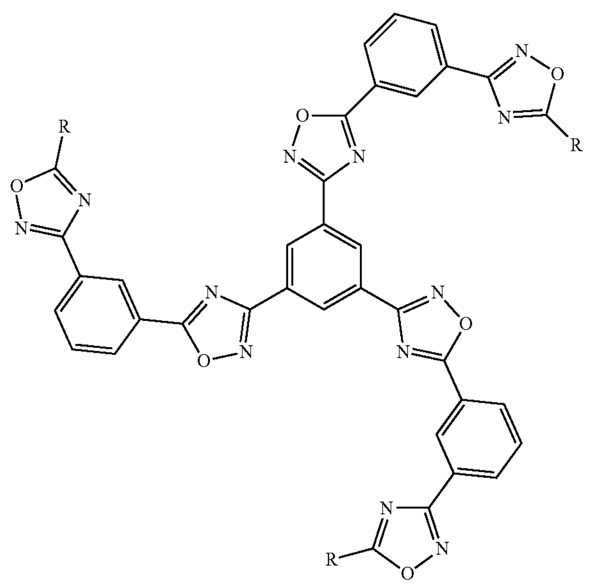
R = Et
R = 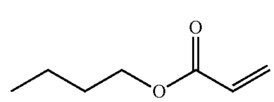
R = n-Bu
R = 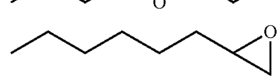

-continued
R = n-Hex
R = 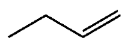
R = 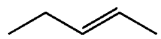
R = 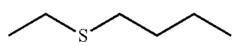
R = 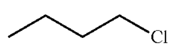
R = 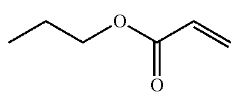
R = 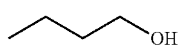
R = 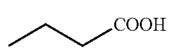
R = 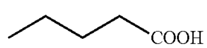
R = 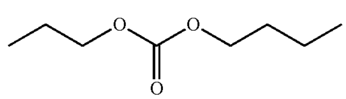
R = 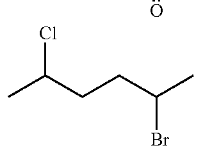
R = 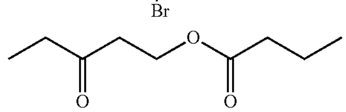
R = 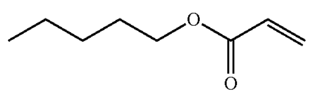
R = 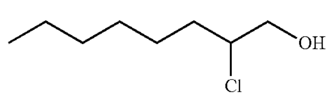
R = 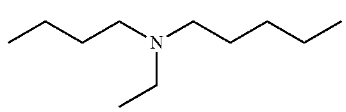
R = 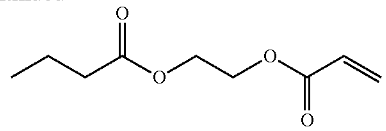
R = 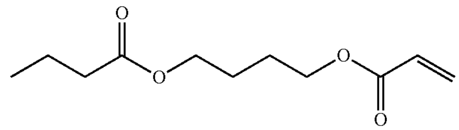
R = 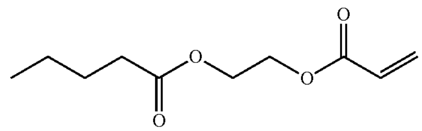
R = 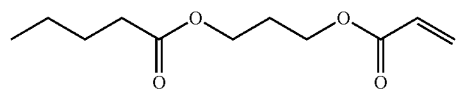
R = 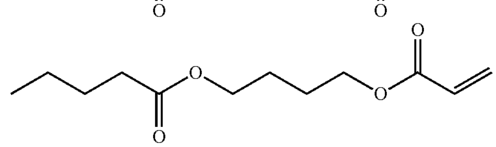
R = 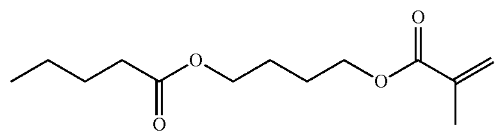
R = 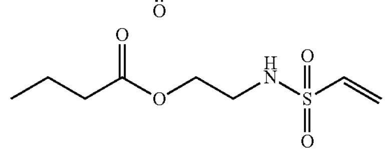
R = 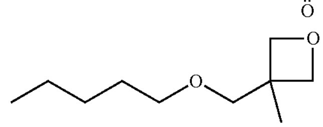
R = 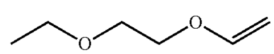
R = 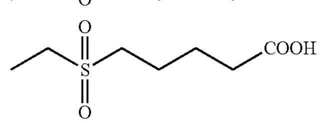
R = 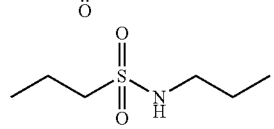
R = 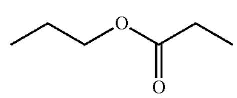
R = 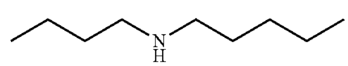
R = 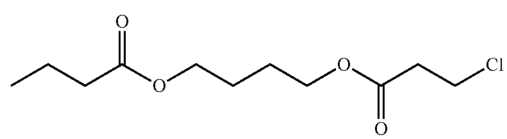
R = 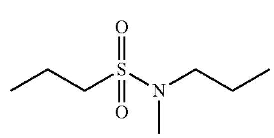

-continued
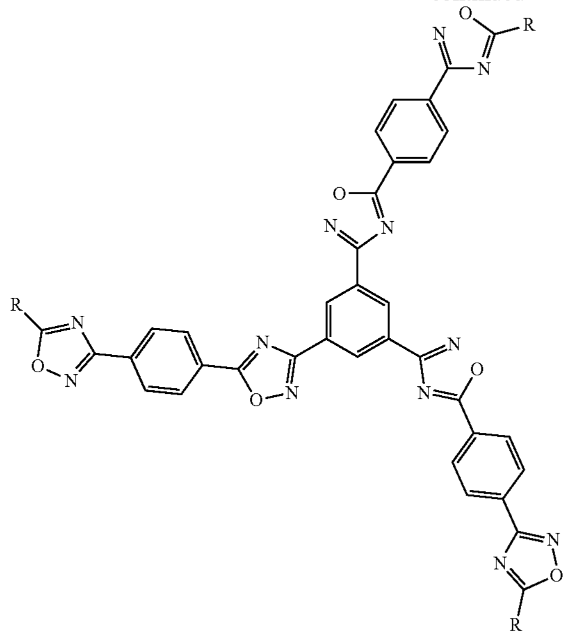
R = Et
R = 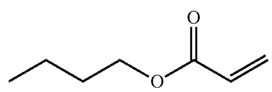
R = n-Bu
R = 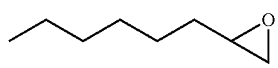
R = n-Hex
R = 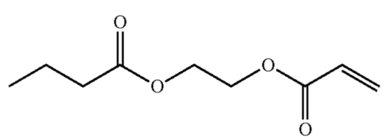
R = 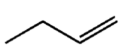
R = 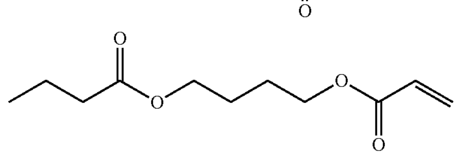
R = 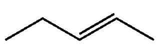
R = 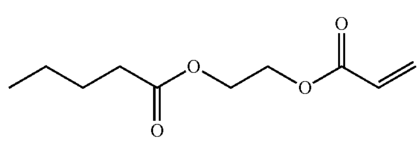
R = 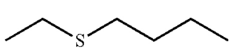
R = 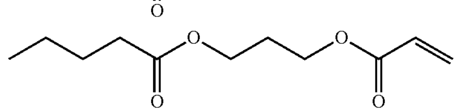
R = 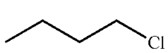
R = 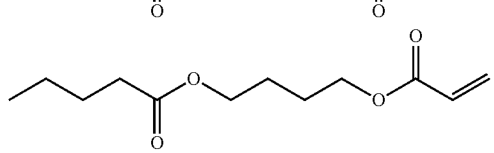
R = 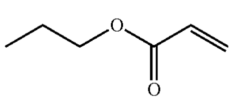
R = 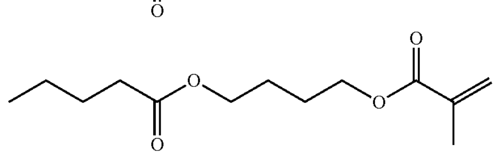

-continued
R = 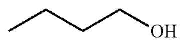
R = 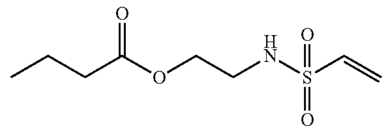
R = 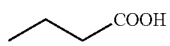
R = 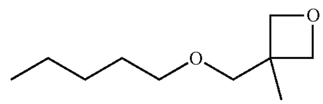
R = 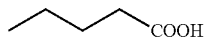
R = 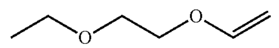
R = 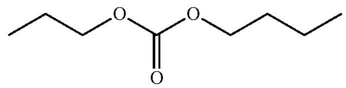
R = 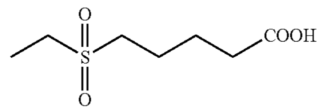
R = 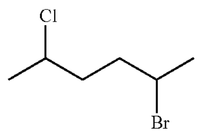
R = 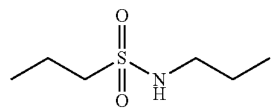
R = 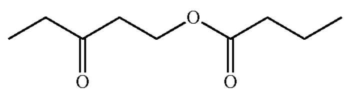
R = 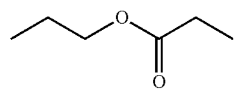
R = 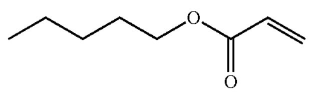
R = 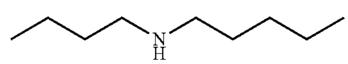
R = 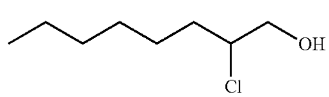
R = 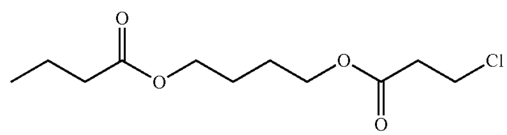
R = 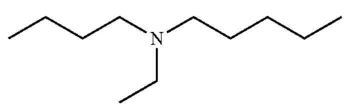
R = 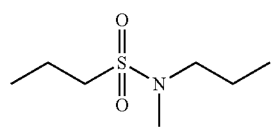
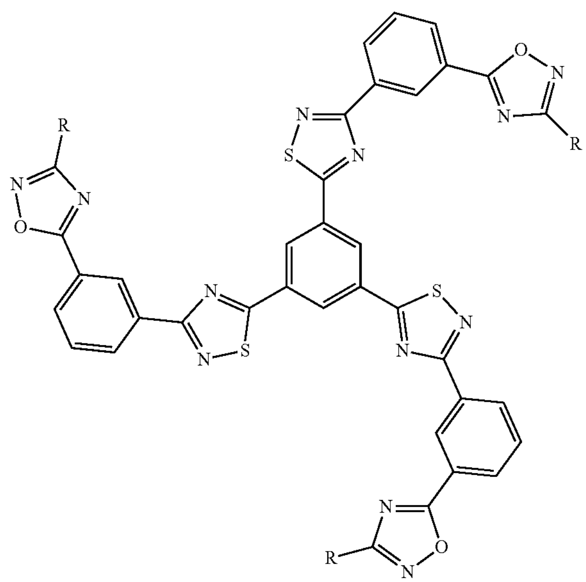
R = 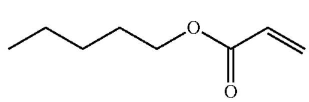

-continued
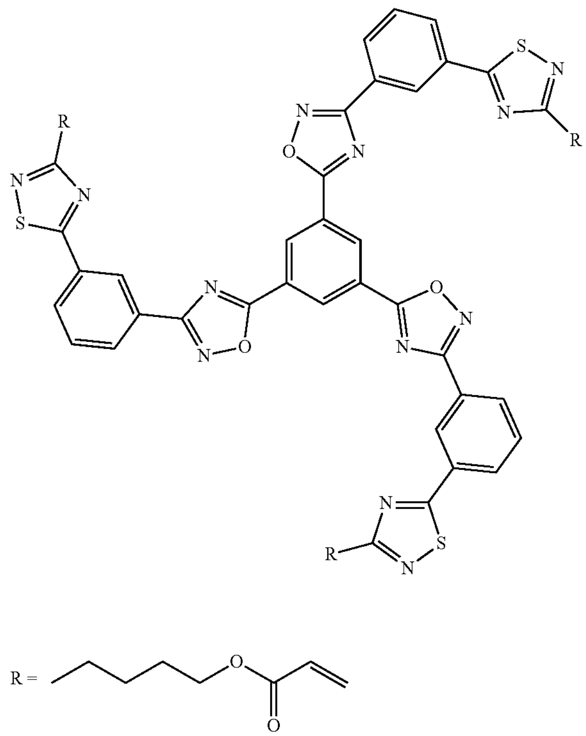
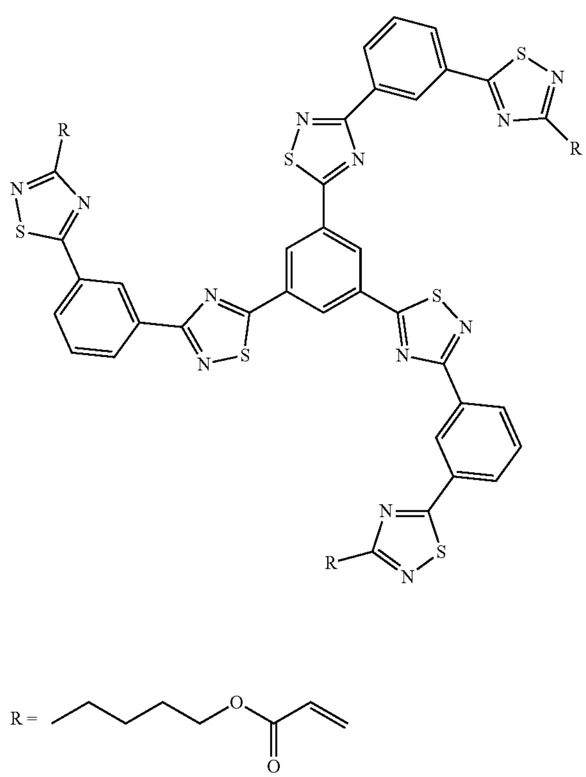

-continued
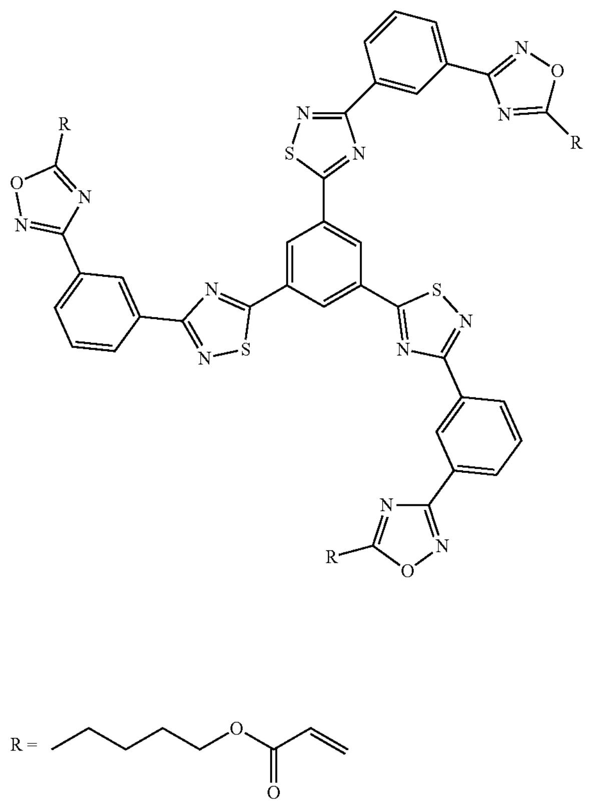
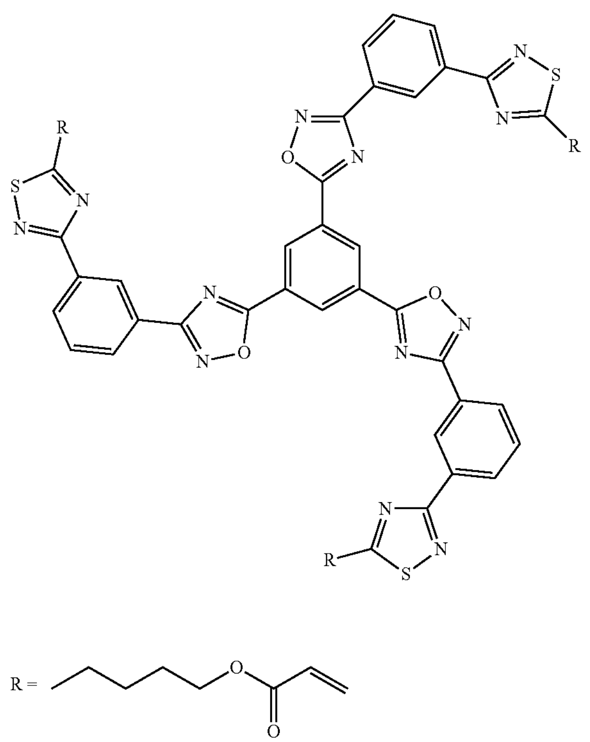

-continued
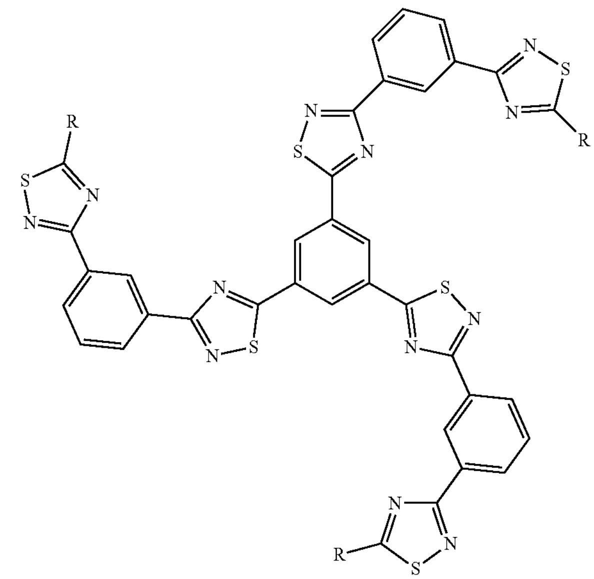
R = 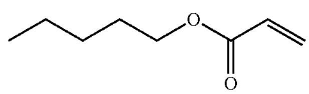
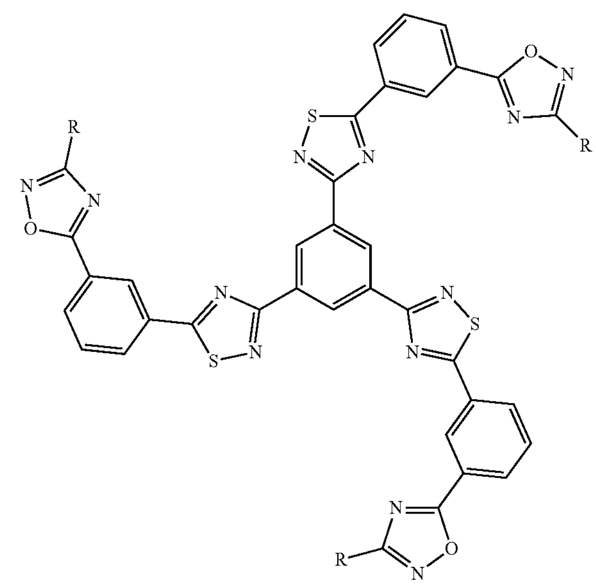
R = 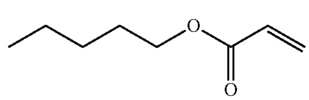

-continued
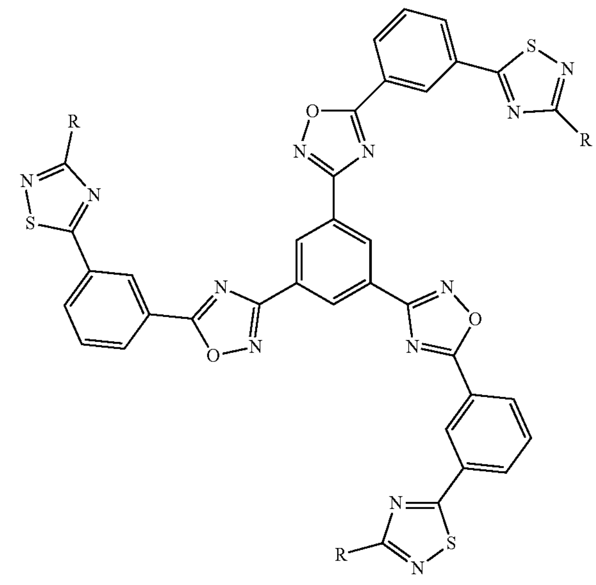
R = 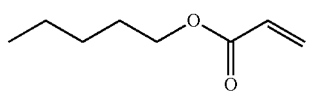
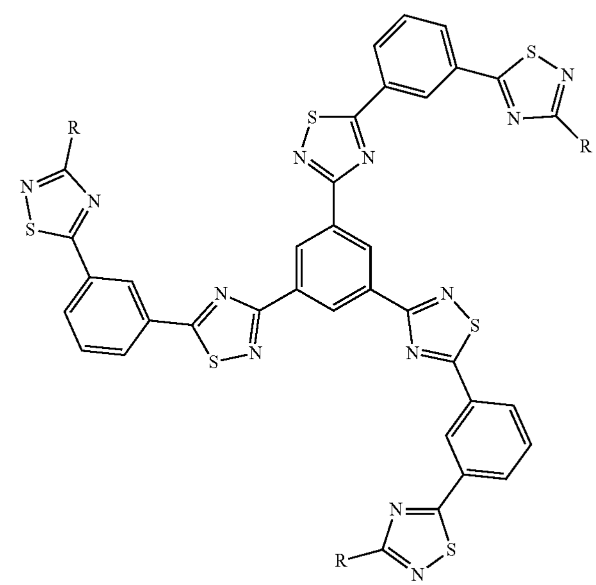
R = 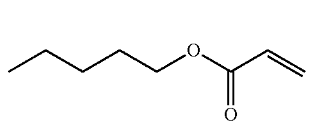

-continued
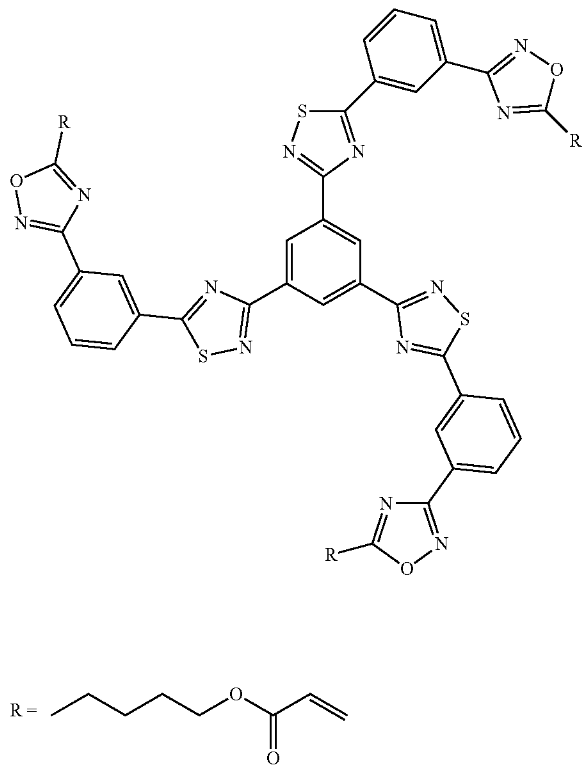
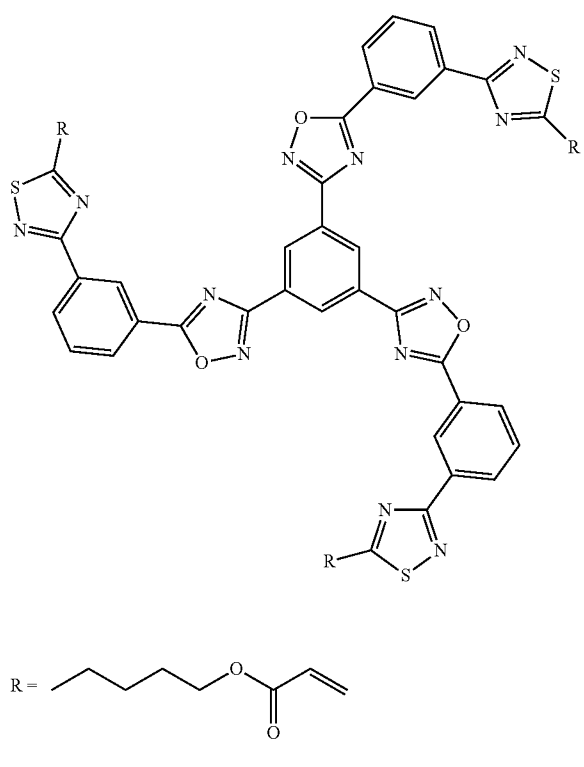

-continued

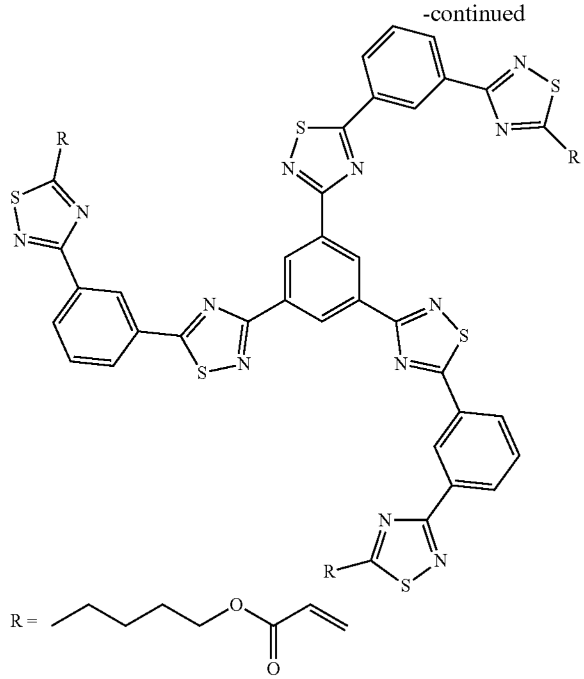

Examples of the compounds represented by Formulae (1) and (1a) include a liquid crystal compound exhibiting a liquid crystalline phase such as a discotic nematic liquid crystalline phase. This liquid crystal compound exhibits high Δn and a high and wide temperature range exhibiting a liquid crystalline phase. For example, in the example of the compounds of Formulae (1) and (1a), compared with the liquid crystal compound in which a hetero 5-membered ring group represented by $L^{11}$ and $L^{31}$ in Formulae (1) and (1a) does not exist, a liquid crystal compound having higher Δn and a higher and wider temperature range exhibiting a liquid crystalline phase exists. Accordingly, in a case where the compounds of Formulae (1) and (1a) are used, an optical film exhibiting optical properties based on the high Δn can be stably produced with a wide production latitude.

Preferable examples of the compounds of Formulae (1) and (1a) include a disk-like liquid crystal compound exhibiting the discotic nematic liquid crystalline phase in the range of 0° C. to 300° C. 20° C. to 250° C. is even more preferable. Here, the present invention is not limited to this range.

—Method of synthesizing compounds represented by Formulae (1) and (1a)—

The compounds represented by Formulae (1) and (1a) can be synthesized by combining various organic synthesis steps. Specifically, the compounds can be synthesized with reference to the synthesis method disclosed in JP2006-76992A and JP2007-2220A.

The compounds represented by Formulae (1) and (1a) can be synthesized by using a compound represented by Formula (1b) as a reagent.

The compound represented by Formula (1b) useful as a reagent used for manufacturing the compounds represented by Formula (1) and (1a) is described.

Formula (1B)

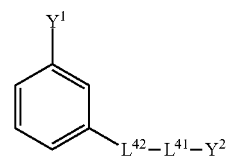

In Formula (1b), $L^{41}$ represents an alkylene group or an alkenylene group, one $CH_2$ group or each of non-adjacent two or more $CH_2$ groups existing in a group of these alkylene groups or alkenylene groups may be substituted with —O—, —COO—, —OCO—, —OCOO—, —CO—, —S—, —$SO_2$—, —NR—, —$NRSO_2$—, or —$SO_2NR$— (R represents a hydrogen atom or an alkyl group having 1 to 4 carbon atoms), and one or more hydrogen atoms existing in these groups may be substituted with a halogen atom.

In Formula (1b), $L^{42}$ represents a group represented by Formula (D) or (F).

Formula (D)

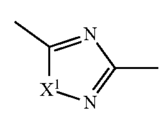

Formula (F)

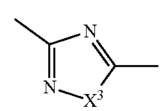

In Formula (1b), each of $X^1$ and $X^3$ represents an oxygen atom, a sulfur atom, methylene, or imino, and preferable examples thereof are the same as the preferable examples thereof in Formula (1).

In Formula (1b), $Y^1$ represents —CN, —COOH, or an amidoxime group.

In Formula (1b), $Y^2$ corresponds to $Q^{11}$ or $Q^{31}$ in Formulae (1) and (1a), and is converted to be $Q^{11}$ or $Q^{31}$ as desired.

Examples of the compound represented by Formula (1b) include a compound represented by each of Formula (1b-1) or (1b-2).

(1b-1)

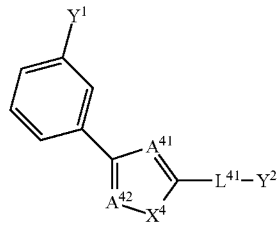

(1b-2)

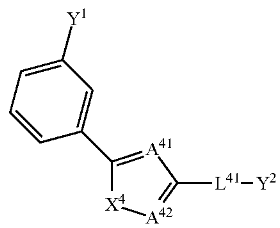

In Formulae (1b-1) and (1b-2), $A^{41}$ and $A^{42}$ each independently represent methine or a nitrogen atom; $X^4$ represents an oxygen atom, a sulfur atom, methylene, or imino; $Y^1$ each independently represent —CN, —COOH, or an amidoxime group; $Y^2$ each independently represent a polymerizable group, a hydrogen atom, —OH, —COOH, an alkylene group having 1 to 4 carbon atoms, a halogen atom, and a hydrogen atom; $L^{41}$ is an alkylene group or an alkenylene group, one $CH_2$ group or each of non-adjacent two or more $CH_2$ groups existing in a group of these alkylene groups or alkenylene groups may be substituted with —O—, —COO—, —OCO—, —OCOO—, —CO—, —S—, —$SO_2$—, —NR—, —$NRSO_2$—, or —$SO_2NR$— (R is a hydrogen atom or an alkyl group having 1 to 4 carbon atoms), or one or more hydrogen atoms existing in these groups may be substituted with a halogen atom.

The compound represented by Formula (1b) can be manufactured by combining various synthesis methods.

As presented in the following scheme, the compound in which $Y^1$ is an amidoxime group can be synthesized by causing an amidoxime group and an activated carboxyl group to react with each other to be converted to a 1,2,4-oxadiazole derivative.

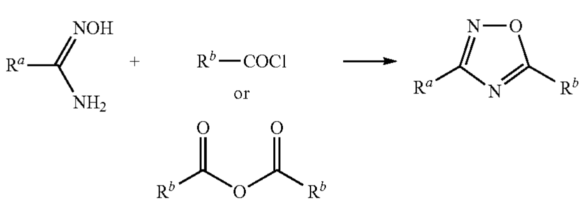

The compound in which $Y^1$ is —CN (cyano group) can be synthesized by converting a cyano group to an amidoxime group, causing an amidoxime group and an activated carboxyl group to react with each other as presented in the above scheme and to be converted to a 1,2,4-oxadiazole derivative.

The compound in which $Y^1$ is —COOH can be synthesized by converting —COOH to acid chloride and reacting acid chloride with an amidoxime derivative or a hydrazine derivative to be converted to a 1,2,4-oxadiazole derivative as presented in the scheme below.

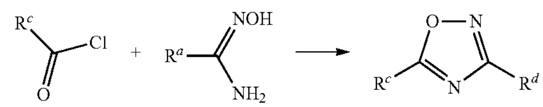

In this manner, an intermediate of the compound of Formula (1) which is the compound represented by Formula (1b) can be synthesized as a 1,2,4-oxadiazole derivative by a general and simple synthesis method.

In Formulae (1b-1) and (1b-2), $Y^2$ corresponds to $Q^{11}$ or $Q^{31}$ in Formulae (1) and (1a), and is converted to be $Q^{11}$ or $Q^{31}$ as desired.

The compound represented by Formula (1b) can be synthesized by combining a plurality kinds of organic synthesis. For example, the compound of Formula (1b) can be synthesized by using the compound of Formula (1c) as a starting material.

Formula (1c)

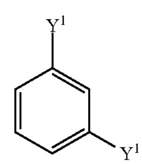

In Formula (1c), $Y^1$ has the same meaning as $Y^1$ in Formula (1b), that is, $Y^1$ represents —CN (cyano group), —COOH (carboxyl group), or an amidoxime group. $Y^1$ can be converted to $-L^{42}-L^{41}-Y^2$ in the method as above.

Examples of the compound represented by Formula (1b) include the following compounds. Here, the present invention is not limited to the following compounds.

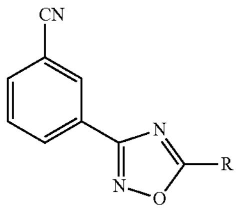
R = Et
R = n-Bu
R = n-Hex
R = 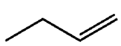
R = 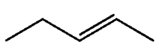
R = 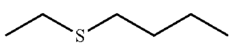
R = 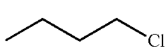
R = 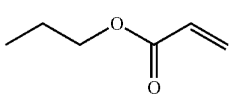
R = 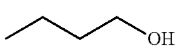
R = 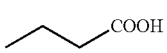
R = 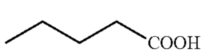
R = 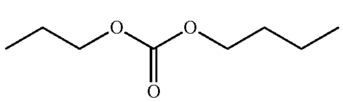
R = 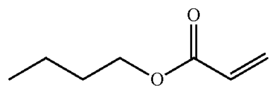
R = 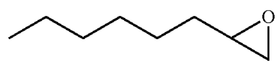
R = 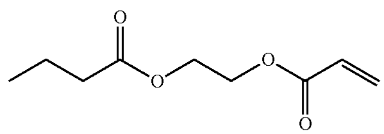
R = 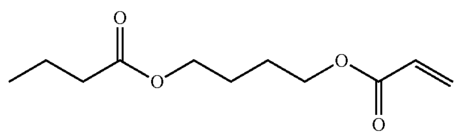
R = 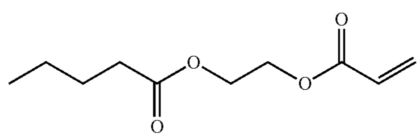
R = 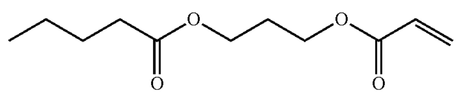
R = 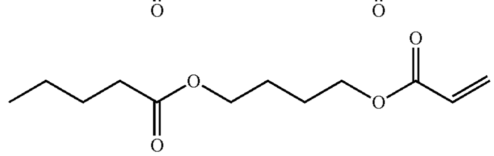
R = 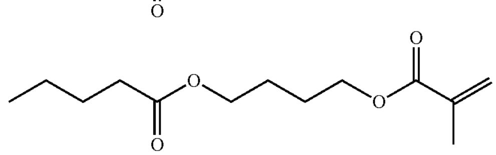
R = 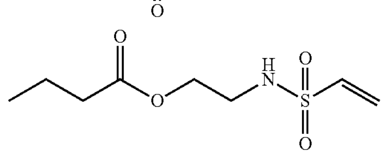
R = 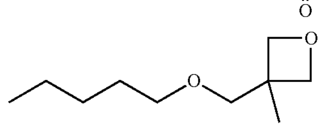
R = 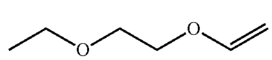
R = 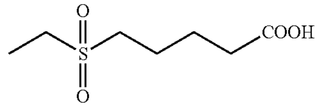

-continued
R = 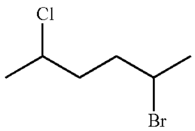
R = 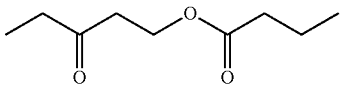
R = 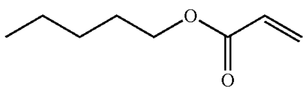
R = 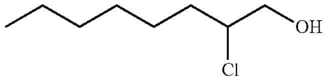
R = 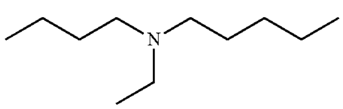
R = 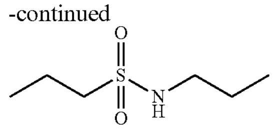
R = 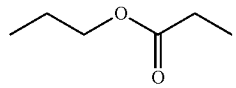
R = 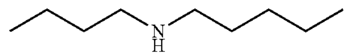
R = 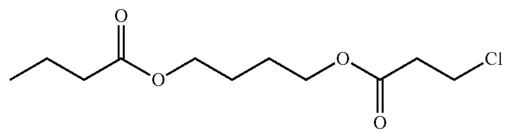
R = 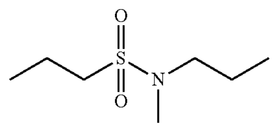
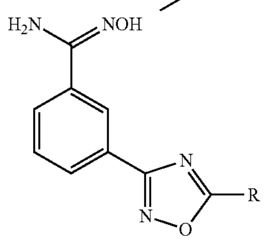
R = Et
R = n-Bu
R = n-Hex
R = 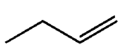
R = 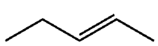
R = 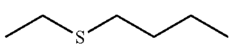
R = 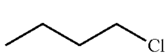
R = 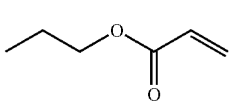
R = 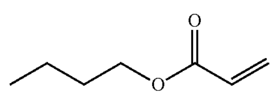
R = 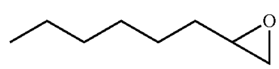
R = 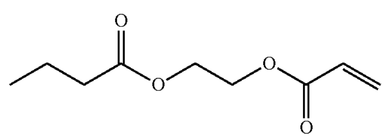
R = 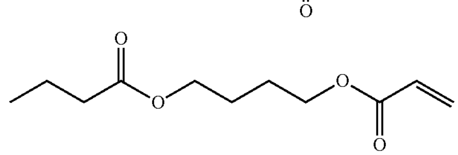
R = 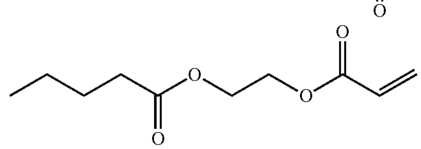
R = 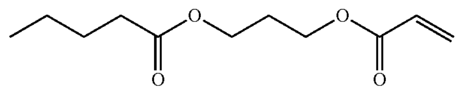
R = 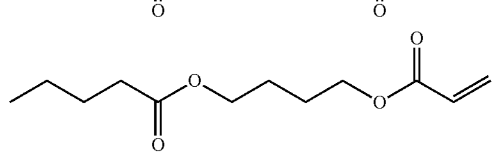
R = 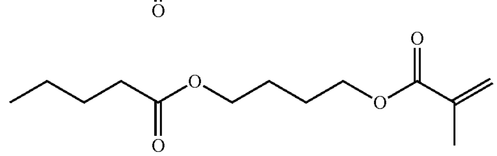

-continued
R = 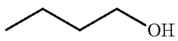
R = 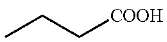
R = 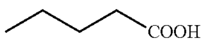
R = 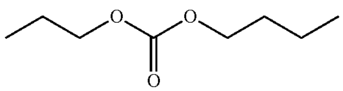
R = 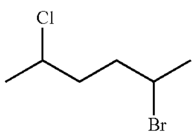
R = 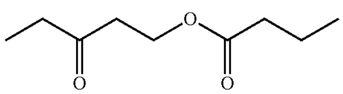
R = 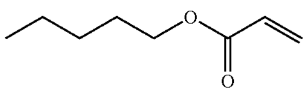
R = 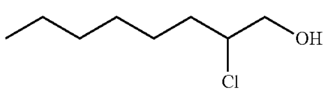
R = 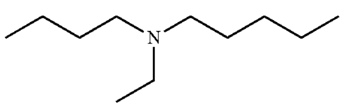
R = 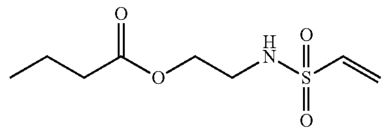
R = 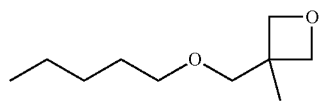
R = 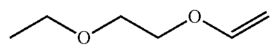
R = 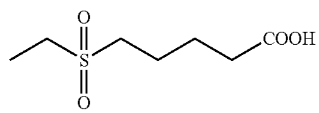
R = 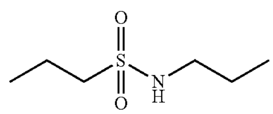
R = 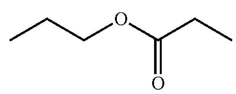
R = 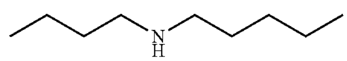
R = 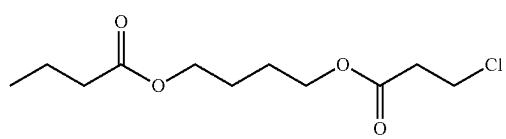
R = 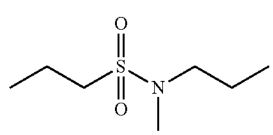
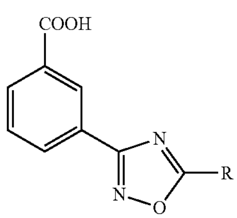
R = Et
R = n-Bu
R = n-Hex
R = 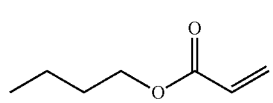
R = 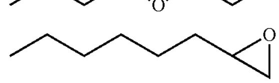
R = 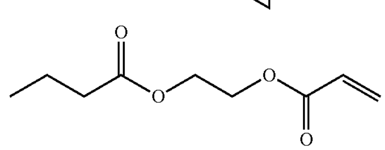
R = 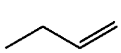
R = 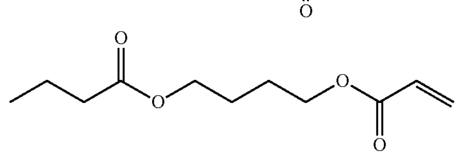

-continued
R = 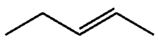
R = 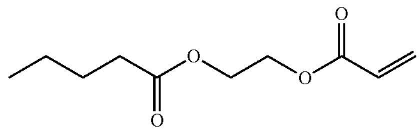
R = 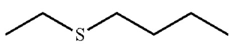
R = 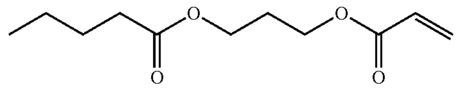
R = 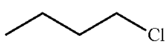
R = 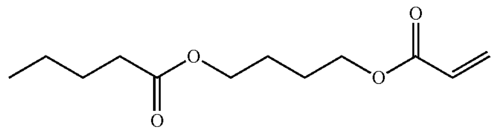
R = 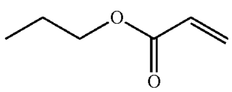
R = 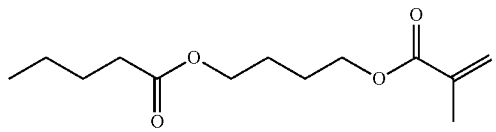
R = 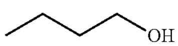
R = 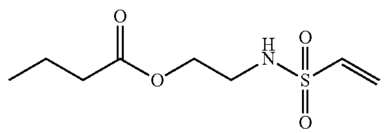
R = 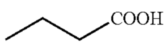
R = 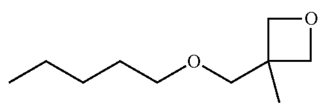
R = 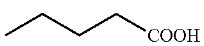
R = 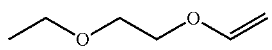
R = 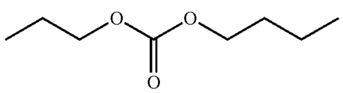
R = 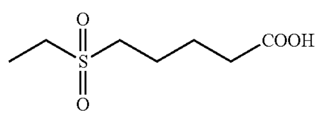
R = 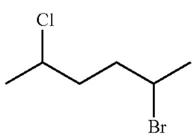
R = 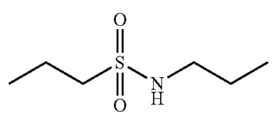
R = 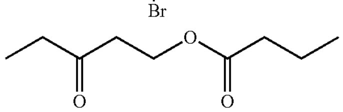
R = 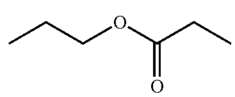
R = 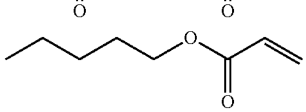
R = 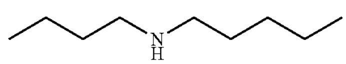
R = 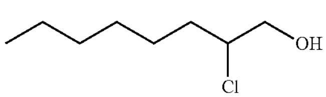
R = 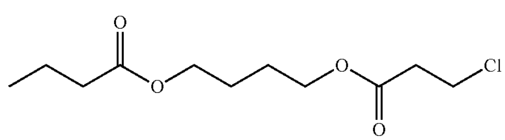
R = 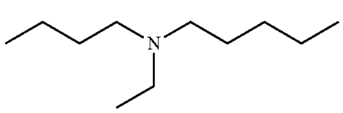
R = 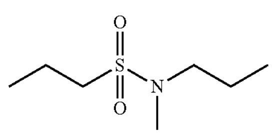
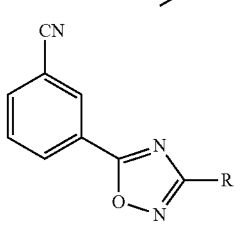

-continued
R = Et
R = 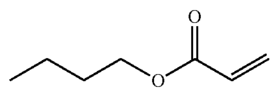
R = n-Bu
R = 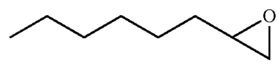
R = n-Hex
R = 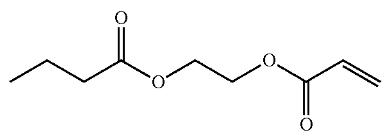
R = 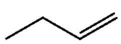
R = 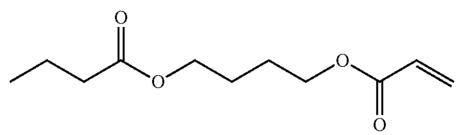
R = 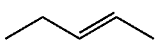
R = 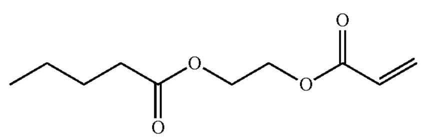
R = 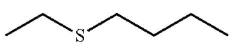
R = 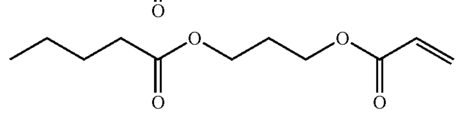
R = 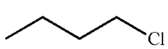
R = 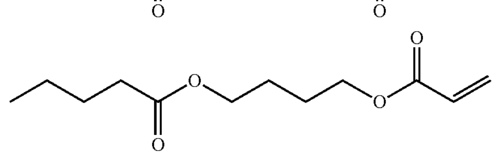
R = 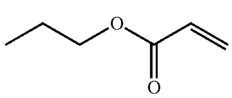
R = 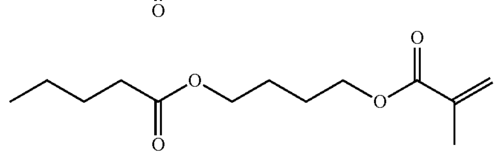
R = 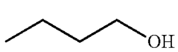
R = 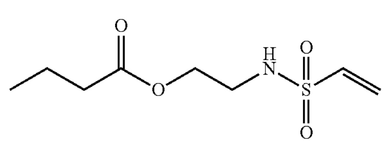
R = 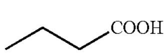
R = 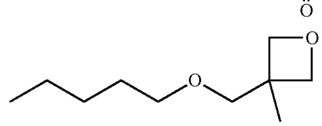
R = 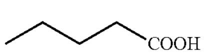
R = 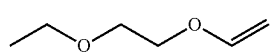
R = 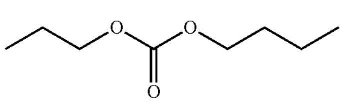
R = 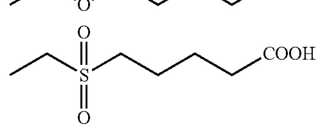

-continued
R = 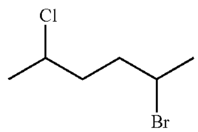
R = 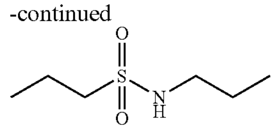
R = 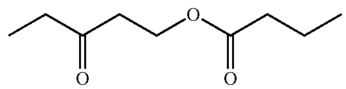
R = 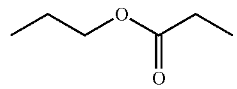
R = 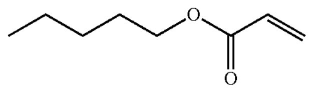
R = 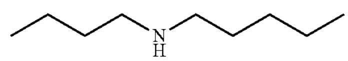
R = 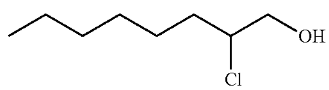
R = 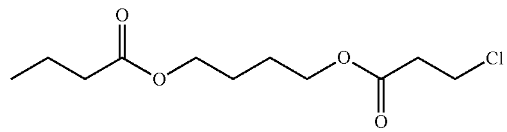
R = 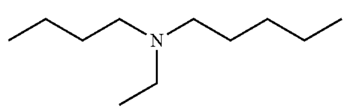
R = 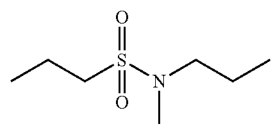
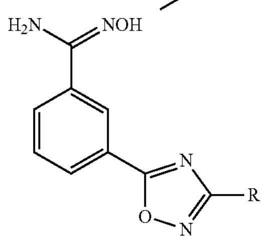
R = Et
R = 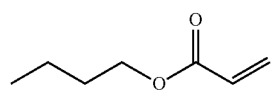
R = n-Bu
R = 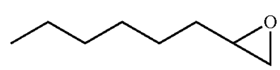
R = n-Hex
R = 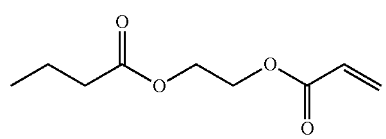
R = 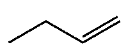
R = 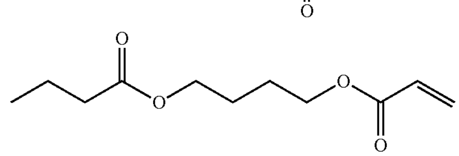
R = 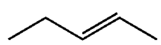
R = 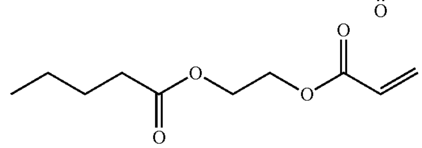
R = 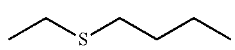
R = 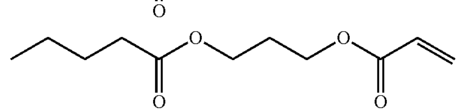
R = 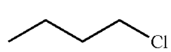
R = 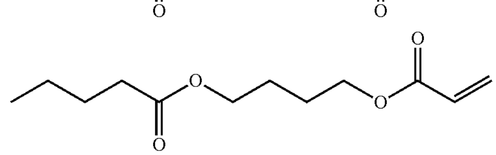
R = 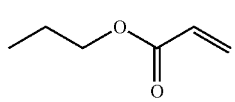
R = 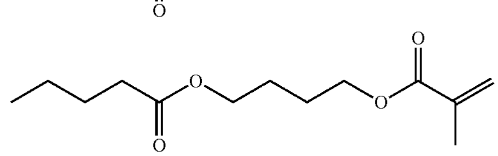

-continued
R = 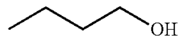
R = 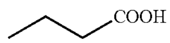
R = 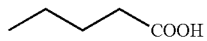
R = 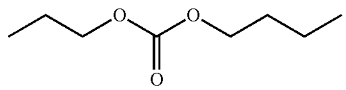
R = 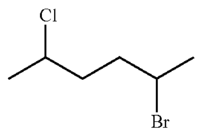
R = 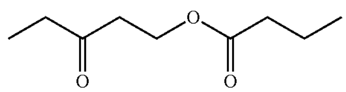
R = 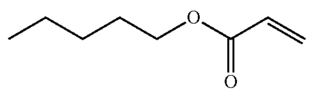
R = 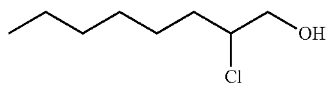
R = 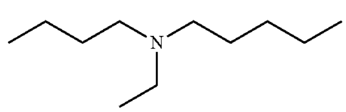
R = 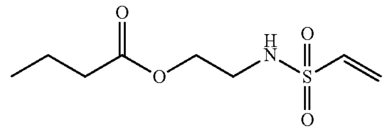
R = 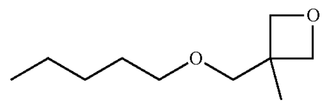
R = 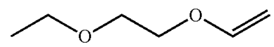
R = 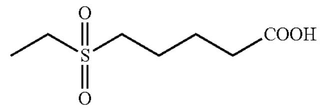
R = 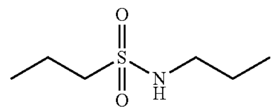
R = 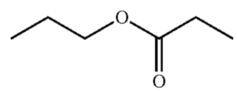
R = 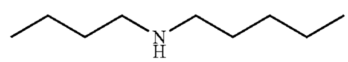
R = 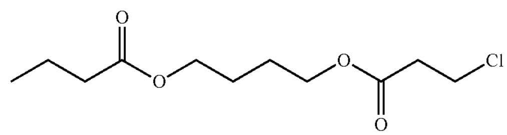
R = 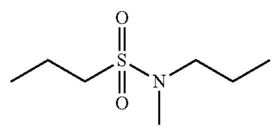
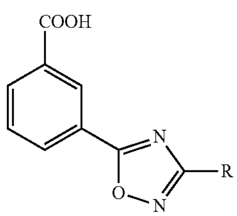
R = Et
R = n-Bu
R = n-Hex
R = 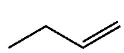
R = 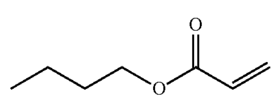
R = 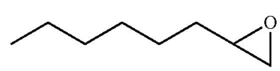
R = 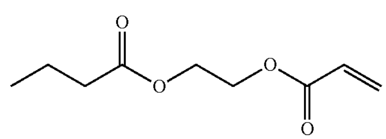
R = 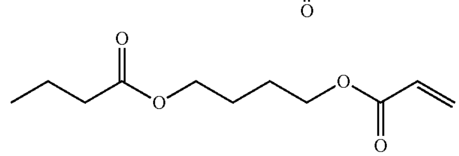

-continued
R = 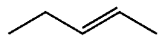
R = 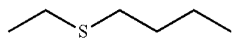
R = 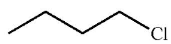
R = 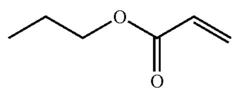
R = 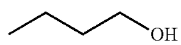
R = 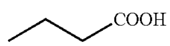
R = 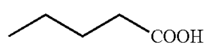
R = 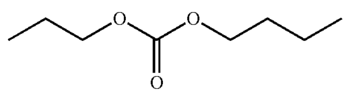
R = 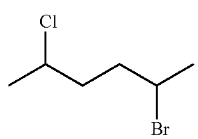
R = 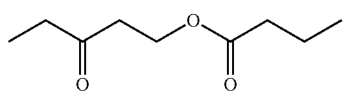
R = 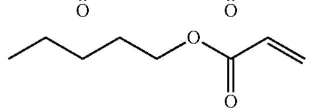
R = 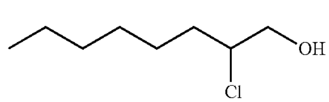
R = 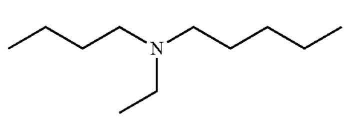
R = 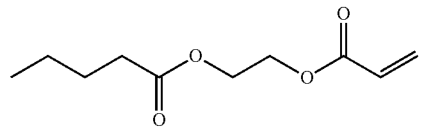
R = 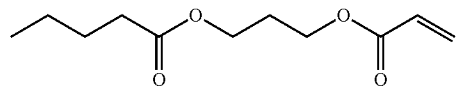
R = 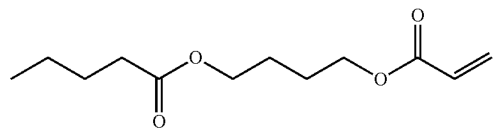
R = 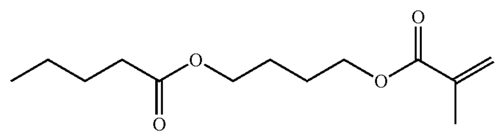
R = 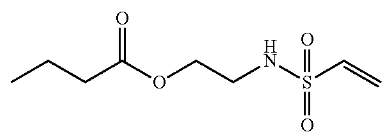
R = 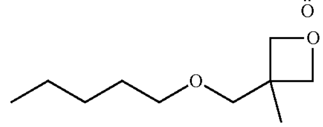
R = 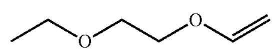
R = 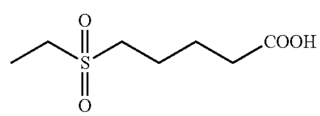
R = 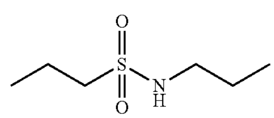
R = 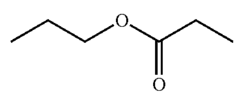
R = 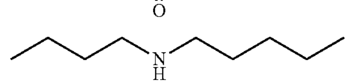
R = 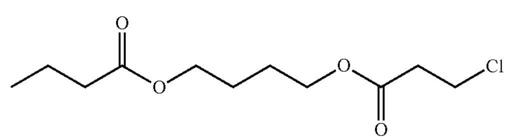
R = 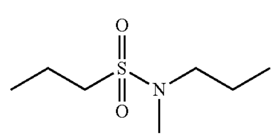
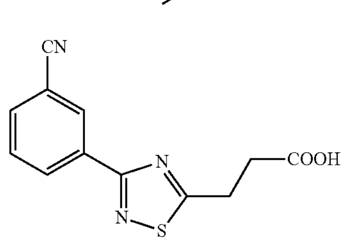
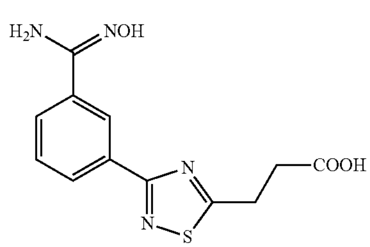
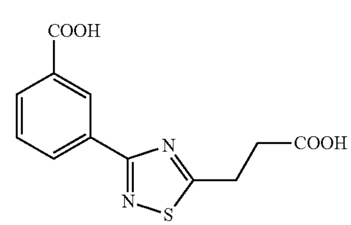

-continued

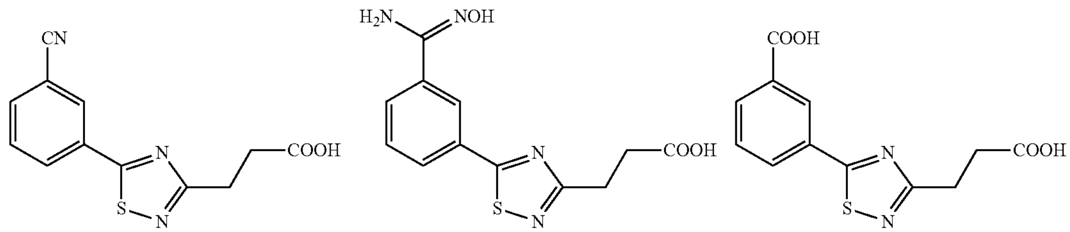

(Chiral Agent)

The disk-like liquid crystal composition used in the present invention preferably contains a chiral agent. In a case where the disk-like liquid crystal composition used in the present invention does not contain a chiral agent, a disk-like liquid crystal compound in which the disk-like liquid crystal compound itself has chirality is preferably used.

The chiral agent can be selected from various known chiral agents (for example, a chiral agent disclosed in Liquid Crystal Device Handbook, Chapter 3, section 4-3, a chiral agent for TN and STN, and a chiral agent disclosed in p. 199, Japan Society for the Promotion of Science edited by the first 42nd committee in 1989).

A compound having an asymmetric carbon atom, an axial asymmetric compound having an axially asymmetric structure (which may be a compound not containing an asymmetric carbon atom), or a planar asymmetric compound (which may be a compound not containing an asymmetric carbon atom) can be used as a chiral agent. In an example of the axial asymmetric compound or the planar asymmetric compound, binaphthyl, helicene, paracyclophane, and a derivative thereof are included.

The chiral agent may have a polymerizable group. Examples of the chiral agent exhibiting a strong twisting force include chiral agents disclosed in JP2010-181852A, JP2003-287623A, JP2002-80851A, JP2002-80478A, and JP2002-302487A. Isomannide compounds having a corresponding structure are able to be used as isosorbide compounds disclosed in the publications, and isosorbide compounds having a corresponding structure are able to be used as isomannide compounds disclosed in the publications.

The chiral agent used in the disk-like liquid crystal composition preferably has an axially asymmetric structure and more preferably a binaphthyl structure, and it is particularly preferable that the binaphthyl structure contains binaphthol as a partial structure. As a reason for estimating that the reflectance and the orientation defect become higher, it is presumed that, in a case of being used as a disk-like liquid crystal compound, an axially asymmetric chiral agent having a higher aspect ratio has higher interactivity and does not destroy liquid crystallinity, compared with a disk-like liquid crystal compound using an asymmetric carbon atom.

The chiral agent having a binaphthyl structure is preferably represented by Formula (11) and more preferably represented by Formula (12).

Formula (11)

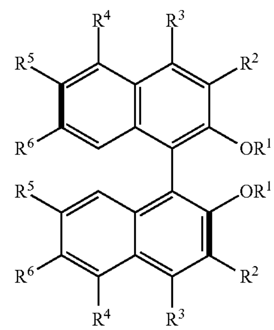

In Formula (11), $R^1$ to $R^6$ each independently represent a monovalent organic group or an inorganic group;

a plurality of $R^1$'s to $R^6$'s are identical to or different from each other, $R^1$ and $R^6$ may be bonded to each other.

Examples of a monovalent organic group or an inorganic group represented by $R^1$ to $R^6$ in Formula (11) include a hydrogen atom, a halogen atom, an alkyl group, an alkynyl group, an aryl group, a formyl group, an acyl group, a sulfonyl group, a sulfinyl group (—S(═O)—), a phospho group, a phosphono group, and a phosphoryl group.

$R^1$ in Formula (11) is preferably an alkyl group, an aryl group, an acyl group, a sulfonyl group, a sulfinyl group (—S(═O)—), a phospho group, a phosphono group, or a phosphoryl group. A plurality of $R^1$'s in Formula (11) are preferably bonded to each other.

$R^2$ to $R^4$ and $R^6$ in Formula (11) are preferably a hydrogen atom.

Formula (12)

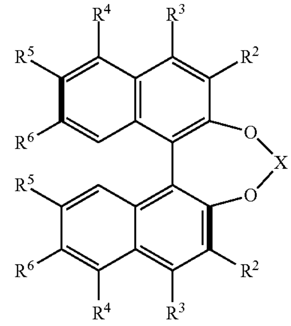

In Formula (12), $R^2$ to $R^6$ each independently represent a monovalent organic group;

a plurality of $R^2$'s to $R^6$'s are identical to or different from each other;

$R^2$ and $R^6$ may be bonded to each other; and

X represents a divalent organic group or an inorganic group.

Examples and preferable ranges of $R^2$ to $R^6$ in Formula (12) are the same as those of $R^2$ to $R^6$ in Formula (11).

The divalent organic group or inorganic group represented by X in Formula (11) is preferably an ether linkage chain, an ester linkage chain, a linkage chain including a phosphorus atom, and a linkage chain including a sulfur atom. Specific examples of the divalent organic group or inorganic group represented by X include an alkylene group, an arylene group, a heteroarylene group, and a compound that is —C(═O)-$L^1$-C(═O)— ($L^1$ represents a divalent linking group), a sulfinyl group (—S(═O)—), and —P(═O)(—$OR^P$)—($R^P$ preferably represents a substituent, an alkyl group, and an aryl group).

The specific compound preferably used as the chiral agent having a binaphthyl structure is preferably the following compounds.

The compound in which X in Formula (11) is an ether linkage chain is preferably a compound in which X is an alkylene group, an arylene group, or a heteroarylene group.

The compound in which X is an alkylene group in Formula (11) is preferably compounds disclosed in [0019] to [0045] of JP2002-179669A and the contents thereof are incorporated to the present invention.

The compound in which X is an arylene group or a heteroarylene group in Formula (11) is preferably compounds disclosed in [0010] to [0044] of JP2002-179670A and the contents disclosed in the publication are incorporated to the present invention.

The compound in which X in Formula (11) is an ester linkage chain, that is, the compound in which X is —C(═O)-$L^1$-C(═O)— ($L^1$ represents a divalent linking group), is preferably compounds disclosed in [0017] to [0053] of JP2002-179668A, and the contents disclosed in the publication are incorporated to the present invention.

The compound in which X in Formula (11) is a linkage chain including a phosphorus atom is preferably compounds disclosed in [0018] to [0048] of JP2002-180051A, and the contents disclosed in the publication are incorporated to the present invention.

The addition amount of the chiral agent is different according to the required reflection wavelength, and is different according to the type of the chiral agent and the components included in the disk-like liquid crystal composition. However, for example, in a case where the reflection wavelength is set in the visible light range, the addition amount is preferably in the range of 0.1 to 20 parts by mass, more preferably in the range of 0.3 to 13 parts by mass, and even more preferably in the range of 0.5 to 8 parts by mass with respect to 100 parts by mass of the disk-like liquid crystal compound.

(Polymerizable Compound)

A polymerizable compound that does not have liquid crystallinity may be added to the disk-like liquid crystal composition used in the present invention. The polymerizable compound that can be used in the present invention is not particularly limited, as long as the polymerizable compound does not significantly cause the alignment inhibition of the disk-like liquid crystal composition. Among these, a compound having a polymerization active ethylenically unsaturated group such as a vinyl group, a vinyloxy group, an oxetanyl group, an acryloyl group, and a methacryloyl group is preferably used.

Preferable example of the polymerizable compound that can be used in the present invention include the following compounds.

Polymerizable Compound P1

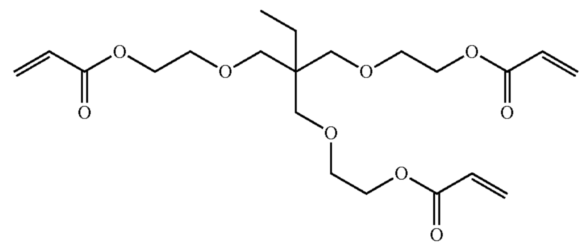 [SMILES: C=CC(=O)OCCOCC(CC)(COCCOC(=O)C=C)COCCOC(=O)C=C]

The addition amount of the polymerizable compound is preferably in the range of 0.5 to 30 parts by mass and more preferably in the range of 1 to 20 parts by mass with respect to 100 parts by mass of the disk-like liquid crystal compound.

(Polymerization Initiator)

The polymerization initiator that can be used in the present invention is not particularly limited and is preferably a photopolymerization initiator. As the photopolymerization initiator, various photopolymerization initiators can be used without particular limitation. Examples of the photopolymerization initiator include α-carbonyl compounds (disclosed in U.S. Pat. Nos. 2,367,661A, 2,367,670A), acyloin ether (disclosed in U.S. Pat. No. 2,448,828A), α-hydrocarbon substituted aromatic acyloin compounds (disclosed in U.S. Pat. No. 2,722,512A), polynuclear quinone compounds (disclosed in U.S. Pat. Nos. 3,046,127A and 2,951,758A), combinations of triarylimidazole dimer and paraaminophenylketone (disclosed in U.S. Pat. No. 3,549,367A), acridine and phenazine compounds (disclosed in JP1985-105667A (JP-S60-105667A) and U.S. Pat. No. 4,239,850A), oxadiazole compounds (disclosed in U.S. Pat. No. 4,212,970A), and acylphosphine oxide compounds (disclosed in JP1988-40799B (JP-S63-40799B), JP1993-29234B (JP-H05-29234B), JP1998-95788A (JP-H10-95788A), and JP1998-29997A (JP-H10-29997A)). Commercially available polymerization initiators may be used as polymerization initiators that can be used in the present invention, and examples of commercially available polymerization initiators include IRGACURE 184, IRGACURE 907, IRGACURE 369, and IRGACURE 651 manufactured by BASF SE, and KAYACURE DETX-S manufactured by Nippon Kayaku Co., Ltd.

The addition amount of the polymerization initiator is preferably in the range of 0.01 to 30 parts by mass and preferably in the range of 0.1 to 15 parts by mass with respect to 100 parts by mass of the disk-like liquid crystal compound. In a case where the addition amount of the polymerization initiator is 0.01 parts by mass or greater with respect to 100 parts by mass of the disk-like liquid crystal compound, the disk-like liquid crystal compound is easily cured. In a case where the addition amount is 15 parts by mass or less, an orientation defect of the cholesteric layer hardly occurs.

(Surfactant)

The surfactant used in the disk-like liquid crystal composition can be suitably selected without particular limitation. Specific examples thereof include surfactants disclosed in [0103] to [0144] of JP2009-193046A, examples of low molecular surfactants include surfactants disclosed in [0140]

to [0147] of JP2013-242555A, examples of high molecular surfactants include surfactants disclosed in [0016] to [0032] of JP2013-228433A, but the present invention is not limited thereto. In view of reducing the orientation defect and reducing the cissing, high molecular surfactants are preferable.

The weight-average molecular weight of the high molecular surfactant is preferably 1,000 to 30,000, more preferably 1,500 to 20,000, and even more preferably 2,000 to 10,000. As the weight-average molecular weight of the surfactant used in the present invention, a value obtained by the following method is used.

As the weight-average molecular weight of the surfactant, a value calculated as a value in terms of polystyrene by gel permeation chromatography (GPC) analysis is used.

It has been found that, in a case where the high molecular surfactant is used, the durability is unexpectedly improved. It is considered that, this is because, in the high molecular surfactant, the hydrolysis at the interface between the layers hardly progresses, the acid is hardly generated, and thus the decomposition of the composition of the cholesteric layer is not promoted.

The high molecular surfactant is preferably a fluorine-based surfactant, a silicone-based surfactant, and a compound having an alkyl chain and having 4 or more carbon atoms, more preferably a fluorine-based surfactant and a compound having an alkyl chain and having 4 or more carbon atoms, and most preferably a fluorine-based surfactant. In a case where a surfactant is used, orientation defects can be reduced and cissing can be reduced. Therefore, the film becomes suitable as a light reflection film.

As the fluorine-based surfactant, the weight content of the monomer unit having fluorine is preferably 40% or greater, more preferably 60% or greater, and most preferably 80% or greater. In a case where the content of the fluorine-containing monomer unit is high, film thickness unevenness hardly occurs, such that the alignment time and orientation defects are reduced and the performance of the brightness enhancement film becomes satisfactory.

The fluorine-based surfactant is preferably a polymer having a fluorinated alkyl group having 1 to 20 carbon atoms (here, which may be interrupted by an ether bond, an ester bond, a carbonyl group, or a urethane bond) and an amphiphilic group in a side chain.

The fluorinated alkyl group is not particularly limited as long as fluorinated alkyl group has 1 to 20 carbon atoms and may be interrupted by an ether bond (—O—), an ester bond (—CO—O—), a carbonyl group (—CO—), and a urethane bond (—NH—CO—O—). A fluorinated alkyl group that is not interrupted by these groups, that is, a fluorinated alkyl group that is represented by $—C_kH_lF_m$ (k represents an integer of 1 to 20, 1 represents an integer of 0 to 40, and m represents an integer of 1 to 41, and l+m=2k+1.), is preferable.

As the fluorinated alkyl group, it is preferable that a perfluoroalkyl group having 1 to 10 carbon atoms is included and the remaining carbon atoms are not fluorinated. The number of carbon atoms of the perfluoroalkyl group is more preferably 3 to 10.

On the other hand, examples of the amphiphilic group include amphiphilic groups included in conventionally known nonionic surfactants, but it is preferable to include an alkylene group interrupted by an ether bond, an ester bond, or a carbonyl group. Among these, it is preferable to include a polyalkyleneoxy group (a polyethyleneoxy group, a polypropyleneoxy group, and a polybutyleneoxy group).

The fluorine-based surfactant can be obtained by polymerizing at least the monomer having a fluorinated alkyl group and the monomer having an amphiphilic group. As the monomer having a fluorinated alkyl group and the monomer having an amphiphilic group, monomers represented by Formulae (h1), (h2), and (X) are preferable.

(h1)

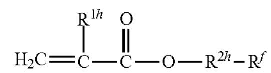

(h2)

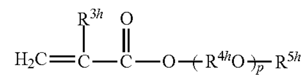

Formula X $$Z^{X1}—L^{X1}—L^{X2}—M—(L^{X3}—L^{X4}—Z^{X2})_n$$

In Formula (h1), $R^{1h}$ represents a hydrogen atom or a methyl group, $R^{2h}$ represents a linear, branched, or cyclic alkylene group having 1 to 15 carbon atoms and preferably having 1 to 10 carbon atoms, and $R^f$ represents a perfluoroalkyl group having 1 to 5 carbon atoms and preferably having 3 to 5 carbon atoms.

In Formula (h2), $R^{3h}$ represents a hydrogen atom or a methyl group, $R^{4h}$ represents an alkylene group having 2 to 4 carbon atoms, and $R^{5h}$ represents a hydrogen atom or an alkyl group having 1 to 15 carbon atoms and preferably having 1 to 10 carbon atoms.

In Formula (h2), p represents an integer of 1 to 50.

Specific examples of the monomer represented by Formula (h1) include 2,2,2-trifluoroethyl (meth)acrylate, 2,2,3,3,3-pentafluoropropyl (meth)acrylate, 2-(perfluorobutyl) ethyl (meth)acrylate, and 2-(perfluoro-3-methylbutyl)ethyl (meth)acrylate.

Specific examples of the monomer represented by the general formula (h2) include methoxypolyethylene glycol ester (meth)acrylate [for example, those in which the number (r) of ethylene glycol repeating units is 1 to 50], methoxypolypropylene glycol ester (meth)acrylate [for example, those in which the number (r) of propylene glycol repeating units is 1 to 50], methoxypoly (ethylene-propylene) glycol ester (meth)acrylate [for example, those in which the sum (r) of the number of ethylene glycol repeating units and the number of repeating units of propylene glycol is 2 to 50], methoxypoly (ethylene-tetramethylene) glycol ester (meth)acrylate [for example, those in which the sum (r) of the number of ethylene glycol repeating units and the number of tetramethylene glycol repeating units is 2 to 50], butoxypoly (ethylene-propylene) glycol ester (meth)acrylate [for example, those in which the sum (r) of the number of ethylene glycol repeating units and the number of repeating units of propylene glycol is 2 to 50], octoxypoly (ethylene-propylene) glycol ester (meth)acrylate [for example, those in which the sum (r) of the number of ethylene glycol repeating units and the number of repeating units of propylene glycol is 2 to 50], lauroxy polyethylene glycol ester (meth)acrylate [for example, those in which the number (r) of ethylene glycol repeating units is from 2 to 50], lauroxypoly (ethylene-propylene) glycol ester (meth)acrylate [for example, those in which the sum (r) of the number of ethylene glycol repeating units and the number of repeating units of propylene glycol is 2 to 50], polyethylene glycol (meth)acrylate, polypropylene glycol (meth)acrylate, polyethylene glycol-polypropylene glycol (meth)acrylate, polyethylene glycol-polybutylene glycol (meth)acrylate, polystyryl ethyl (meth)acrylate, or LIGHT ESTER HOA-MS and LIGHT ESTER HOMS manufactured by Kyoeisha Chemical Co., Ltd.

In Formula X, $Z^{X1}$ and $Z^{X2}$ each independently represent a group having a radically polymerizable double bond, $L^{1}$ and $L^{X4}$ each independently represent a single bond or an alkylene group having a hydroxyl group, $L^{X2}$ and $L^{X3}$ each independently represent a single bond or a divalent linking group including at least one selected from the group consisting of —O—, —(C═O)O—, —O(C═O)—, a divalent chain group, an alkylene group having a hydroxyl group, and a divalent aliphatic cyclic group, M represents a single bond or a divalent to tetravalent linking group, and n represents an integer of 1 to 3.

$Z^{X1}$ and $Z^{X2}$ each independently represent a group having a radically polymerizable double bond. Examples of the group having a radically polymerizable double bond are provided below.

Examples of the group having a radically polymerizable double bond include Formulae Z1 to Z6 and $CH_2$═C($R^1$)—C(═O)—O— (a preferable range of $R^1$ in this linking group is the same as the preferable range of $R^1$ in Formula X1).

Formula Z1

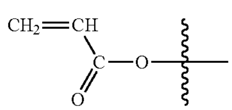

Formula Z2

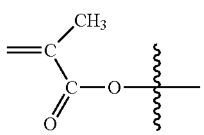

Formula Z3

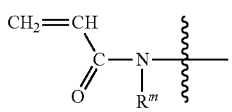

Formula Z4

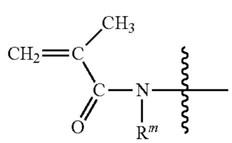

Formula Z5

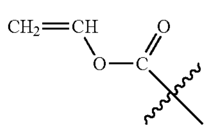

Formula Z6

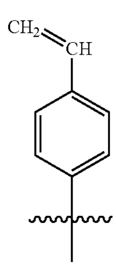

In Formulae Z1 to Z6, $R^m$ represents a hydrogen atom or an alkyl group having 1 to 20 carbon atoms, more preferably an alkyl group having 1 to 7 carbon atoms, and most preferably a hydrogen atom or a methyl group.

Among Formulae Z1 to Z6, Formula Z1 or Z2 is preferable, and Formula Z1 is more preferable.

$L^{x1}$ and $L^{x4}$ each independently represent a single bond or an alkylene group having a hydroxyl group. $L^{x1}$ and $L^{x4}$ each independently and preferably represent —$CH_2CH(OH)CH_2$— or —$CH_2CH(CH_2OH)$— and most preferably —$CH_2CH(OH)CH_2$—. $L^{x1}$ and $L^{x4}$ may be identical to or different from each other.

$L^{X2}$ and $L^{X3}$ each independently represent a single bond, —O—, —(C═O)O—, —O(C═O)—, a divalent chain group, an alkylene group having a hydroxyl group, a divalent aliphatic cyclic group, or a combination thereof. The divalent chain group may be linear or branched. As the alkylene group having a hydroxyl group, —$CH_2CH(OH)CH_2$— and —$CH_2CH(CH_2OH)$— are preferable, and —$CH_2CH(OH)CH_2$— is more preferable.

Preferable combinations of $L^{X2}$ are provided below. A left side is bonded to a $Z^{x1}$ side, and a right side is bonded to M.

Lx21: —O-divalent chain group-

Lx22: —O-divalent aliphatic cyclic group-divalent chain group-

Lx23: —OC(═O)-divalent aliphatic cyclic group-

Lx24: -Divalent aliphatic cyclic group-(C═O)O—

Lx25: —(O-divalent chain group)$_n$-

Lx26: —O-alkylene group having hydroxyl group-

Preferable combinations of $L^{X3}$ are provided below. A left side is bonded to a M side, and a right side is bonded to $Z^{x2}$ side.

Lx31: -Divalent chain group-O—

Lx32: -Divalent chain group-divalent aliphatic cyclic group-O—

Lx33: -Divalent aliphatic cyclic group-C(═O)O—

Lx34: —O(C═O)-divalent cyclic group-

Lx35: -(Divalent chain group-O—)$_n$-

Lx36: -Alkylene group having hydroxyl group-O—

The divalent chain group means an alkylene group, a substituted alkylene group, an alkenylene group, a substituted alkenylene group, an alkynylene group, and a substituted alkynylene group. The alkylene group, the substituted alkylene group, the alkenylene group, and the substituted alkenylene group are preferable, and an alkylene group and an alkenylene group are even more preferable.

The alkylene group may have a branch. The number of carbon atoms of the alkylene group is preferably 1 to 12, more preferably 2 to 10, and most preferably 2 to 8.

The alkylene portion of the substituted alkylene group is the same as the above alkylene group. Examples of the substituent include a halogen atom.

The alkenylene group may have a branch. The number of carbon atoms of the alkenylene group is preferably 2 to 12, more preferably 2 to 10, and most preferably 2 to 8.

The alkenylene portion of the substituted alkenylene group is the same as the above alkenylene group. Examples of the substituent include a halogen atom.

The alkynylene group may have a branch. The number of carbon atoms of the alkynylene group is preferably 2 to 12, more preferably 2 to 10, and most preferably 2 to 8.

The alkynylene portion of the substituted alkynylene group is the same as the above alkynylene group. Examples of the substituent include a halogen atom.

Specific examples of the divalent chain group include ethylene, trimethylene, propylene, tetramethylene, 2-methyl-tetramethylene, pentamethylene, hexamethylene, octamethylene, 2-butenylene, and 2-butynylene.

The divalent aliphatic cyclic group in $L^{X2}$ and $L^{X3}$ of Formula X is preferably a 5-membered ring, a 6-membered ring, or a 7-membered ring, more preferably a 5-membered ring or a 6-membered ring, and most preferably a 6-membered ring.

The ring included in the divalent aliphatic cyclic group may be either an aliphatic ring or a saturated heterocyclic ring. Examples of the aliphatic ring include a cyclohexane ring, a cyclopentane ring, and a norbornene ring.

The divalent aliphatic cyclic group may have a substituent. Examples of the substituent include a halogen atom, a cyano group, a nitro group, an alkyl group having 1 to 5 carbon atoms, a halogen-substituted alkyl group having 1 to 5 carbon atoms, an alkoxy group having 1 to 5 carbon atoms, an alkylthio group having 1 to 5 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms, and an acylamino group having 2 to 6 carbon atoms. Among these, an alkyl group having 1 to 5 carbon atoms and a halogen-substituted alkyl group having 1 to 5 carbon atoms are preferable.

In Formula X, n represents an integer of 1 to 3. In a case where n is 2 or 3, a plurality of existing $L^{X3}$'s and $L^{X4}$'s may be identical to or different from each other, and a plurality of existing $Z^{x2}$'s may be identical to or different from each other. n is preferably 1 or 2 and more preferably 1.

In Formula X, M is a single bond or a divalent to tetravalent linking group. In Formula X, in a case where n is 1, a linking group is divalent, and in a case where n is 2, a linking group is trivalent, and in a case where n is 3, a linking group is tetravalent.

M is preferably a divalent to tetravalent chain group, a group having an aliphatic cyclic group, and a group having an aromatic group. The divalent to tetravalent chain group represents a saturated hydrocarbon group having 2 to 4 bonding hands. The number of carbon atoms of the saturated hydrocarbon group is preferably 1 to 40, more preferably 1 to 20, and even more preferably 1 to 10. The saturated hydrocarbon group may be linear or branched.

Examples of the group having an aliphatic cyclic group include a cyclohexane ring, a cyclopentane ring, and a norbornene ring.

Examples of the group having an aromatic ring include a phenyl group and a naphthyl group.

The valence of M is more preferably divalent or trivalent and particularly preferably trivalent.

The monomer represented by Formula X is even more preferably a monomer represented by Formula X1.

Formula X1

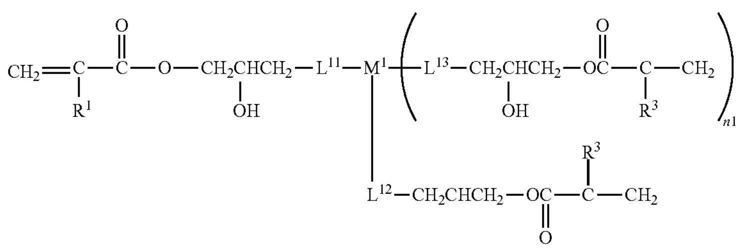

In Formula X1, $R^1$, $R^2$, and $R^3$ in Formula X1 each independently represent a hydrogen atom or an alkyl group having 1 to 20 carbon atoms, $L^{11}$, $L^{12}$, and $L^{13}$ each independently represent a single bond or a divalent linking group including at least one selected from the group consisting of —O—, —(C═O)O—, —O(C═O)—, a divalent chain group, an alkylene group having a hydroxyl group, and a divalent aliphatic cyclic group, $M^1$ represents a single bond or a divalent to tetravalent linking group, and n1 represents an integer of 0 to 2.

$R^1$, $R^2$, and $R^3$ in Formula X1 are preferably a hydrogen atom or an alkyl group having 1 to 12 carbon atoms, more preferably an alkyl group having 1 to 6 carbon atoms, and particularly preferably a hydrogen atom or a methyl group. A more preferable range of $R^1$ and $R^2$ in Formula X1 is the same as the preferable range of $R^1$ and $R^2$ in Formula X2.

$L^{11}$, $L^{12}$, and $L^{13}$ are the same as $L^{x2}$ and $L^{x3}$ in Formula X, and preferable combinations thereof are the same. The even more preferable range of $L^{11}$, $L^{12}$, and $L^{13}$ in Formula X1 is the same as the preferable range of $L^{11}$ and $L^{12}$ in Formula X2.

n in Formula X1 is preferably 0 or 1 and more preferably 0.

$M^1$ in Formula X1 is the same as M in Formula X, and the preferable ranges thereof are the same. A more preferable range of $M^1$ in Formula X1 is the same as the preferable range of $M^1$ in Formula X2.

In a case where n is 0 in Formula X, and M is a divalent linking group, a monomer represented by Formula X is preferably a monomer represented by Formula X2.

Formula X2

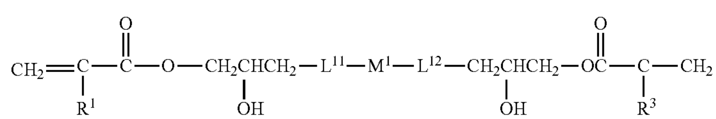

In Formula X2, $R^1$ and $R^2$ in Formula X2 each independently represent a hydrogen atom or an alkyl group having 1 to 20 carbon atoms, $L^{11}$ and $L^{12}$ each independently represent a single bond or a divalent linking group including at least one selected from the group consisting of —O—, —(C═O)O—, —O(C═O)—, a divalent chain group, an alkylene group having a hydroxyl group, and a divalent aliphatic cyclic group, and $M^1$ represents a single bond or a divalent linking group.

$R^1$ and $R^2$ in Formula X2 are preferably a hydrogen atom or a methyl group and most preferably a hydrogen atom.

$L^{11}$ and $L^{12}$ in Formula X2 each independently and preferably represent *—O—**, *—O—$CH_2$—**, *—OCH $(CH_3)$—**, *—O—$C_2H_4$—**, *—O—$C_3H_6$—**, and *—$OCH_2CH(OH)CH_2$—** and more preferably *—O—** or *—O—$CH_2$—**. * is bonded to an alkyl group side having a hydroxyl group in Formula X1 or X2, and ** is bonded to $M^1$.

$M^1$ in Formula X2 is preferably a single bond, —$C_6H_{10}$—, —O(C═O)$C_6H_4$(C═O)O—, —O(C═O)$C_6H_{10}$(C═O)O—, and —O—$C_6H_4$—C($CH_3$)($CH_3$)—$C_6H_4$—O—.

In addition to the monomer represented by Formula (h1) and the monomer represented by Formula (h2), the fluorine-based surfactant may be preferably polymerized with a (meth)acrylic acid alkyl ester without deteriorating the effect of the present invention. Specific examples of the (meth) acrylic acid alkyl ester include methyl (meth)acrylate, ethyl (meth)acrylate, n-propyl (meth)acrylate, i-propyl (meth) acrylate, n-butyl (meth)acrylate, i-butyl (meth)acrylate, n-octyl (meth)acrylate, 2-ethylhexyl (meth)acrylate, i-nonyl (meth)acrylate, lauryl (meth)acrylate, hexadecyl (meth) acrylate, stearyl (meth)acrylate, cyclohexyl (meth)acrylate, benzyl (meth)acrylate, and isobornyl (meth)acrylate.

The fluorine-based surfactant may be any one of a random polymer and a graft polymer, and is preferably a graft polymer.

Preferable examples of the surfactant that can be used in the present invention include the following compounds.

Surfactant S1

59/41 (mass ratio), weight-average molecular weight Mw 2,200

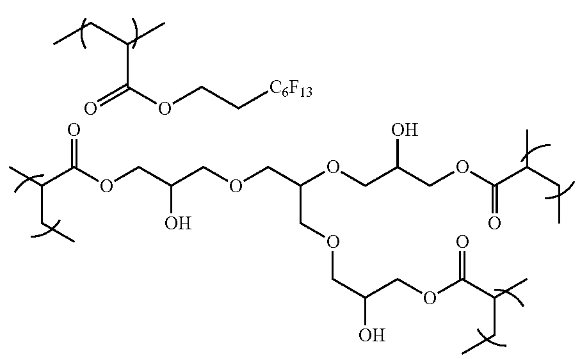

(Solvent)

As the solvent of the disk-like liquid crystal composition for forming a cholesteric layer, an organic solvent is preferably used. Examples of the organic solvent include amide (for example, N,N-dimethyl formamide), sulfoxide (for example, dimethyl sulfoxide), a heterocyclic compound (for example, pyridine), hydrocarbon (for example, benzene and hexane), alkyl halide (for example, chloroform and dichloromethane), ester (for example, methyl acetate and butyl acetate), ketone (for example, acetone, methyl ethyl ketone, and cyclohexanone), and ether (for example, tetrahydrofuran and 1,2-dimethoxyethane). The alkyl halide and the ketone are preferable. Two or more types of organic solvents may be used in combination.

(Other Components)

The disk-like liquid crystal composition may contain other components such as an alignment aid besides the disk-like liquid crystal compound. Examples of the other components such as alignment aids that can be used for the disk-like liquid crystal composition include compounds that can be used for forming the optically anisotropic layer of the λ/4 plate.

<Configuration>

The configuration of the optical film of the present invention is described with reference to the drawings.

As an example of the optical film of the present invention, FIG. 1 illustrates an aspect in which a λ/4 plate and an underlayer (alignment film) 17 are formed on a support 15, and a cholesteric layer 14*a* (first light reflecting layer) is laminated thereon in direct contact. The optical film of the present invention is not limited to the aspect of FIG. 1, the λ/4 plate 12 is laminated on the support 15 as illustrated in FIG. 3, the cholesteric layer 14*a* (first light reflecting layer) is laminated thereon via an adhesive layer (pressure sensitive adhesive material) 20, and an underlayer (alignment film) 18 is laminated thereon.

Figure 3:
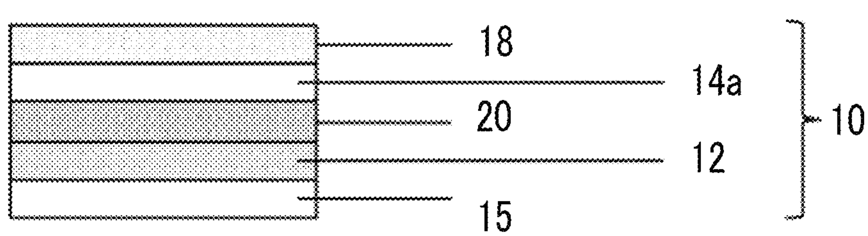
FIG. 3 is a schematic view illustrating a cross section in another example of a brightness enhancement film of the present invention and illustrates an aspect in which a λ/4 plate is laminated on a support, a first light reflecting layer is laminated thereon via an adhesive layer, and an underlayer (alignment film) is laminated thereon.

The λ/4 plate 12 illustrated in FIGS. 1 and 3 may be a single layer, or a laminate of two or more layers, and it is preferable that the λ/4 plate is a laminate of two or more layers.

(Cholesteric Layer)

The optical film of the present invention has a cholesteric layer of the disk-like liquid crystal composition including the disk-like liquid crystal compound, the cholesteric layer exhibits a cholesteric liquid crystalline phase, and the fluctuation of the helical pitch in the film thickness direction of the cholesteric layer is 2% or greater.

—Helical Pitch—

Figure 5:
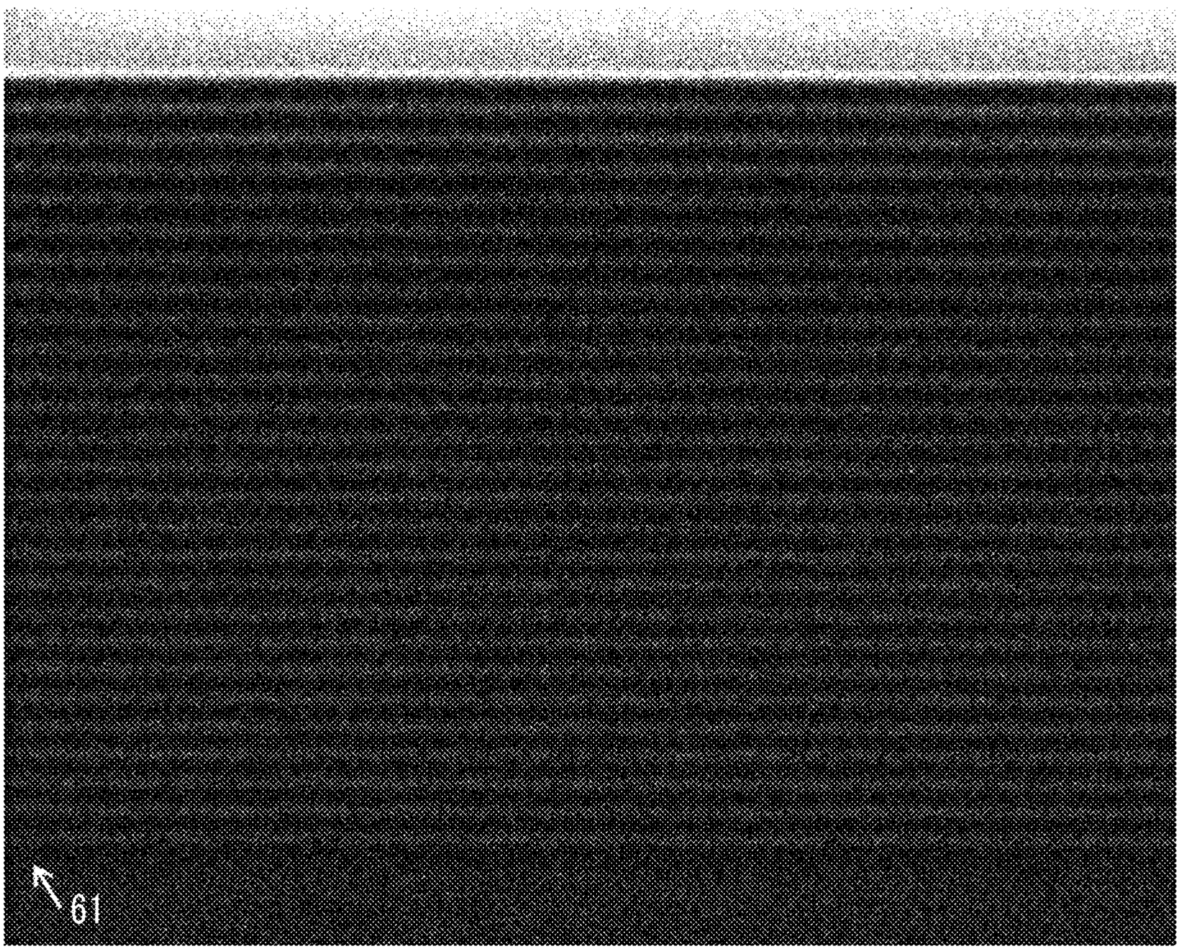
FIG. 5 is a cross section image using a Transmission Electron Microscopy (TEM) of a cholesteric layer of an optical film of Example 1.

The fluctuation of the helical pitch in the film thickness direction of the cholesteric layer is calculated in the following expression by using a minimum value Pmin of a half pitch (for example, a distance between adjacent light-dark layers in the cross-sectional TEM image as illustrated in FIG. 5) of the helical pitch in the film thickness direction of the cholesteric layer and a maximum value Pmax of the half pitch of the helical pitch.

$$\text{Maximum value (\%) of fluctuation of helical pitch in film thickness direction of cholesteric layer}=100\%\times(P\text{max}-P\text{min})/P\text{min}$$

It is preferable that the fluctuation of the helical pitch in the film thickness direction of the cholesteric layer is 2% to 60%, from the viewpoint that the reflection bandwidth is widened so as to perform selective reflection in the wavelength range of 400 to 700 nm. In view of reducing the length per helical pitch and increasing the stability of the cholesteric layer, the fluctuation is more preferably 2% to 30% and even more preferably 2% to 15%.

In view of widening the reflection bandwidth, the lower limit value of the fluctuation of the helical pitch in the film thickness direction of the cholesteric layer is preferably 3% or greater, more preferably 5% or greater, and particularly preferably 10% or greater.

The length per one half pitch of the helical pitch in the film thickness direction of the cholesteric layer is preferably 100 to 280 nm, more preferably 125 to 265 nm, and particularly preferably 130 to 230 nm. The length per one half pitch of the helical pitch in the film thickness direction of the cholesteric layer can be controlled according to Δn of the disk-like liquid crystal compound and the helical twisting power (HTP) of the chiral agent used.

Among the thickness of the cholesteric layer, the region (that is, the region having a half pitch having the fluctuation width with a size of 2% or greater than the minimum value of the half pitch in the helical pitch in the film thickness direction of the cholesteric layer) in which the fluctuation of the helical pitch in the film thickness direction of the cholesteric layer is 2% or greater is preferably a thickness of 0.5 μm or greater, more preferably 0.7 to 6.0 μm, and particularly preferably 1.0 to 5.0 μm. Among the thickness of the cholesteric layer, the number of helical pitch (the number of turns of helical half pitch) in the region in which the fluctuation of the helical pitch in the film thickness direction of the cholesteric layer is 2% or greater is preferably 1 to 32, more preferably 2 to 28, and particularly preferably 3 to 25.

Among the thickness of the cholesteric layer, a region (that is, a region having a half pitch in which a fluctuation width of the half pitch is less than 2% than the minimum value of the half pitch in the helical pitch in the film thickness direction of the cholesteric layer) in which the fluctuation of the helical pitch in the film thickness direction of the cholesteric layer is less than 2% is preferably 0.5 μm or greater, more preferably 0.7 to 6.0 μm, and particularly preferably 1.0 to 5.0 μm. Among the thickness of the cholesteric layer, the number of helical pitch (the number of turns of helical pitch) in the region in which the fluctuation of the helical pitch in the film thickness direction of the cholesteric layer is less than 2% is preferably 1 to 15, more preferably 2 to 12, and particularly preferably 3 to 10.

The minimum value of the half pitch of the helical pitch in the film thickness direction of the cholesteric layer is preferably 250 nm or less, more preferably 110 to 240 μm, and particularly preferably 130 to 230 μm.

In view of manufacturing cost, it is preferable that the cholesteric layer in the optical film of the present invention has an interface only on the surface of the layer. In other words, with respect to the optical film of the present invention, it is preferable that the cholesteric layer is a single layer. That the cholesteric layer has an interface only on the surface of the layer can be determined from the cross section image using TEM. It is preferable to not have an interface in a cholesteric layer, and particularly it is more preferable to not have a solid-solid interface such as an interface between two cholesteric layers of a cholesteric layer in which two or more cholesteric layers are laminated in direct contact or an interface between one cholesteric layer of a cholesteric layer in which two or more cholesteric layers are laminated via an adhesive layer and the adhesive layer.

—Light Reflecting Layer—

The cholesteric layer is preferably a light reflecting layer obtained by fixing a cholesteric liquid crystalline phase and more preferably a first light reflecting layer in a brightness enhancement film described below.

The first light reflecting layer is preferably a light reflecting layer obtained by fixing a cholesteric liquid crystalline phase, and it is preferable that, in the first light reflecting layer, the disk-like liquid crystal compound is vertically aligned.

The expression the disk-like liquid crystal compound is "vertically aligned" refers to a state in which the surface vertical to the director of the disk-like liquid crystal compound is vertical to the air interface or the underlayer of the film. The expression "vertical" as used herein does not have to be vertical (an angle formed by the surface and the straight line is 90°) in a strict sense, but an optical error is allowed. For example, an angle formed by an air interface of the disk-like liquid crystal compound or an underlayer and a plane vertical to the director of the disk-like liquid crystal compound is preferably 90°±20°, more preferably 90°±15°, and particularly preferably 90°±10°.

Here, that the disk-like liquid crystal compound is vertically aligned in an arbitrary film can be checked by the following method.

The vertical alignment of the disk-like liquid crystal compound can be measured, for example, by measuring Re and Rth with AxoScan of Axometrics Inc.

With respect to the vertical alignment of the disk-like liquid crystal compound that does not form a cholesteric liquid crystalline phase, the vertical alignment can be confirmed in a case where Re represents a positive value.

With respect to the vertical alignment of the disk-like liquid crystal compound that forms a cholesteric liquid crystalline phase, the vertical alignment can be confirmed in a case where Rth represents a negative value.

That the disk-like liquid crystal compound is vertically aligned so as to form a cholesteric liquid crystalline phase in an arbitrary film can be checked by the following method.

For example, in a case where Rth is measured with AxoScan of Axometrics Inc. and Rth is a negative value, it is possible to check that the disk-like liquid crystal compound is vertically aligned. That a cholesteric liquid crystalline phase is formed can be checked based on the existence of wavelength that selectively reflects light in a case where UV absorption spectrum is measured. In a case where visible light is reflected, that selective reflection occurs is checked by checking that the reflected light transmits only one of the right circular polarization plate and the left circular polarization plate, and thus it is possible to confirm that a cholesteric liquid crystalline phase is formed.

As the method of obtaining Rth of the cholesteric layer, a method of using polarized ellipso can be applied.

For example, as described in M. Kimura et al. Jpn. J. Appl. Phys. 48 (2009) 03B021, in a case where an ellipsometry measurement method is used, the thickness, the helical pitch, the twisted angle, and the like of the cholesteric layer can be obtained, and the value of Rth is able to be obtained therefrom.

The reflection center wavelength and the full width at half maximum of the optical film (substantially cholesteric layer or light reflecting layer) can be determined as follows.

In a case where a transmission spectrum of an optical film is measured by using AxoScan manufactured by Axometrics Inc., a decreasing peak of transmittance in a selective reflection region is observed. Among two wavelengths at which the transmittance becomes transmittance at a height of ½ of the maximum peak height, in a case where the value of the wavelength on a short wavelength side is λ1 (nm) and the value of the wavelength on a long wavelength side is λ2 (nm), the reflection center wavelength and the full width at half maximum can be denoted by the following expressions.

$$\text{Reflection Center Wavelength}=(\lambda1+\lambda2)/2$$

$$\text{Full width at half maximum}=(\lambda2-\lambda1)$$

A wavelength (that is, a wavelength having the largest peak height among the decrease peaks of the transmittance) providing a peak of a reflectance can be adjusted by changing the helical pitch or the refractive index of the helical structure in the cholesteric liquid crystalline phase of the cholesteric layer, but the change of the helical pitch can be easily adjusted by changing an addition amount of a chiral agent. Specifically, there is a detailed description in Fujifilm Research Report No. 50 (2005) pp. 60 to 63.

(Underlayer)

The underlayer can be suitably selected without particular limitation. Examples of the underlayer include a well-known alignment film and a layer including a disk-like liquid crystal compound. In view of reducing orientation defects, a layer including a disk-like liquid crystal compound is preferable, and a film in which a disk-like liquid crystal compound is vertically aligned is more preferable. In a case where a layer including a disk-like liquid crystal compound having a large exclusion volume exists in the underlayer, an excellent performance as an alignment film is exhibited. If the underlayer is a vertical alignment layer, in a case where the light reflecting layer is vertically aligned, it is considered that the underlayer is advantageous for alignment in which the surface free energy becomes the same and the intermolecular force increases.

As a well-known alignment film, SUNEVER SE-130 (manufactured by Nissan Chemical Industries, Ltd.) and the like can be used.

The optical film of the present invention is preferably laminated by causing the first light reflecting layer to come into direct contact with the surface of the underlayer.

With respect to the optical film of the present invention, the underlayer is preferably laminated on the support. The support of the underlayer is not particularly limited, and an arbitrary resin film or glass can be used. A preferable aspect of the support is described below as a preferable aspect of a support of a λ/4 plate.

(λ/4 Plate)

The optical film preferably has a λ/4 plate. The optical film of the present invention is preferably obtained by laminating a cholesteric layer (preferably a first light reflecting layer) and a λ/4 plate, and it is more preferable that the underlayer of the cholesteric layer (preferably a first light reflecting layer) is a λ/4 plate.

The λ/4 plate is a layer for converting circularly polarized light that passes through the reflection polarizer to the linearly polarized light.

At the same time, it is possible to cancel the phase difference in the film thickness direction of the cholesteric layer (preferably a first light reflecting layer) generated in a case of being viewed from the oblique orientation by adjusting the retardation (Rth) in the film thickness direction of the λ/4 plate.

In the optical film of the present invention, Rth (550) of the λ/4 plate is preferably −120 to 120 nm, more preferably −80 to 80 nm, and particularly preferably −70 to 70 nm.

In the present specification, the definition and measurement method of Re and Rth of the λ/4 plate are the same as the definition and measurement method of Re and Rth of the polarizing plate protective film described below.

In the optical film of the present invention, it is preferable that the λ/4 plate satisfies Expressions (A) to (C).

$$450\text{ nm}/4-35\text{ nm}<Re(450)<450\text{ nm}/4+35\text{ nm} \quad \text{Expression (A)}$$

$$550\text{ nm}/4-35\text{ nm}<Re(550)<550\text{ nm}/4+35\text{ nm} \quad \text{Expression (B)}$$

$$630\text{ nm}/4-35\text{ nm}<Re(630)<630\text{ nm}/4+35\text{ nm} \quad \text{Expression (C)}$$

(In Expressions (A) to (C), Re (λ) represents retardation (Unit: nm) in an in-plane direction at a wavelength of λ nm.)

The material used in the λ/4 plate is not particularly limited. Various polymer films, for example, a polyester-based polymer such as cellulose acylate, a polycarbonate-based polymer, polyethylene terephthalate, or polyethylene naphthalate, an acrylic polymer such as polymethyl methacrylate, a styrene-based polymer such as polystyrene or an acrylonitrile-styrene copolymer, and the like are able to be used. One or more polymers are selected from polyolefin such as polyethylene and polypropylene, a polyolefin-based polymer such as an ethylene-propylene copolymer, an amide-based polymer such as a vinyl chloride-based polymer, nylon, or aromatic polyamide, an imide-based polymer, a sulfone-based polymer, a polyether sulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy-based polymer, or a polymer obtained by mixing the above polymers, and the like and used as a main component, so as to manufacture a polymer film, and the polymer film can be used for manufacturing of an optical element in a combination of satisfying the properties described above.

It is preferable that the λ/4 plate includes at least one layer formed of the composition containing the liquid crystal compound. That is, it is preferable that the λ/4 plate is a laminate of the polymer film (the support) and the optically anisotropic layer formed of the composition containing the liquid crystal compound. In the support, a polymer film having small optical anisotropy may be used, and a polymer film exhibiting optical anisotropy by a stretching treatment and the like may be used. With respect to the support, it is preferable that visible light transmittance is 80% or greater.

The type of liquid crystal compound which is used for forming the optically anisotropic layer is not particularly limited. For example, an optically anisotropic layer that can be obtained by forming a low molecular liquid crystal compound in nematic alignment in a liquid crystal state, and fixing the alignment by photo-crosslinking or thermal crosslinking or an optically anisotropic layer that can be obtained by forming a high molecular liquid crystal compound in nematic alignment in a liquid crystal state and fixing the alignment by cooling can be used. Furthermore, in the present invention, even in a case where the liquid crystal compound is used in the optically anisotropic layer, the optically anisotropic layer is a layer formed by fixing the liquid crystal compound by polymerization or the like, and it is not necessary to exhibit liquid crystallinity anymore after the layer is formed. A polymerizable liquid crystal compound may be a polyfunctional polymerizable liquid crystal or a monofunctional polymerizable liquid crystal compound. The liquid crystal compound may be a disk-like liquid crystal compound, or may be a rod-like liquid crystal compound. In the present invention, the disk-like liquid crystal compound is more preferable.

For example, rod-like liquid crystal compounds disclosed in JP1999-513019A (JP-H11-513019A) or JP2007-279688A can be preferably used, and for example, disk-like liquid crystal compounds disclosed in JP2007-108732A or JP2010-244038A can be preferably used. However, the present invention is not limited thereto. According to the present invention, the preferable range of the liquid crystal compound used for forming an optically anisotropic layer of the λ/4 plate is the same as the preferable range of the disk-like liquid crystal compound used in the cholesteric layer, and the disk-like liquid crystal compound which is the same as the disk-like liquid crystal compound used in the cholesteric layer is more preferable.

In the optically anisotropic layer described above, it is preferable that the molecules of the liquid crystal compound are fixed in any one alignment state of a vertical alignment, a horizontal alignment, a hybrid alignment, and a tilt alignment. In order to prepare a phase difference plate having symmetric view angle dependency, it is preferable that a disk plane of the disk-like liquid crystal compound is substantially vertical to a film surface (the surface of the optically anisotropic layer), or a long axis of the rod-like liquid crystal compound is substantially horizontal to the film surface (the surface of the optically anisotropic layer). The disk-like liquid crystal compound being substantially vertical to the film surface indicates that the average value of an angle between the film surface (the surface of the optically anisotropic layer) and the disk plane of the disk-like liquid crystal compound is in a range of 70° to 90°. 80° to 90° is more preferable, and 85° to 90° is even more preferable. The rod-like liquid crystal compound being substantially horizontal to the film surface indicates that an angle between the film surface (the surface of the optically anisotropic layer) and a director of the rod-like liquid crystal compound is in a range of 0° to 20°. The angle is more preferably 0° to 10°, and is even more preferably 0° to 5°.

—Alignment Aid—

It is preferable that the optically anisotropic layer of the λ/4 plate further includes an alignment aid. Examples of the alignment aid include a compound containing boron and an onium salt compound (alignment film side alignment controlling agent).

The optically anisotropic layer of the λ/4 plate is preferably included in order to realize vertical alignment of the liquid crystal compound having an onium salt compound (alignment film-side alignment controlling agent) polymerizable group, particularly, vertical alignment of the disk-like liquid crystal compound having a polymerizable group. The onium salt compound is unevenly distributed at the alignment film interface and performs an act of increasing the tilt angle in the vicinity of the alignment film interface of the liquid crystal molecules. Examples of the onium salt compound include the compounds disclosed in paragraphs [0048] to [0081] of JP2014-191156A, and the content of this publication is incorporated to the present specification.

Hereinafter, preferable examples of the onium salt compound are provided below, but the present invention is not limited thereto.

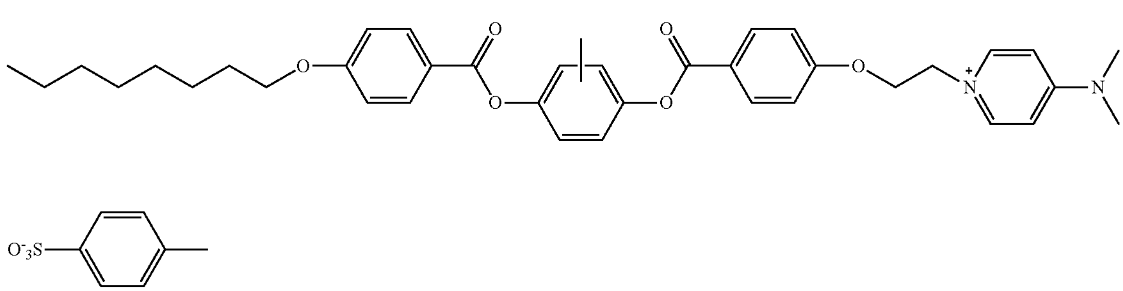

The content of the onium salt compound in the optically anisotropic layer is preferably 0.1 to 10 mass % and more preferably 0.3 mass % to 1 mass % with respect to the content of the liquid crystal compound.

The optically anisotropic layer of the λ/4 plate includes a compound including boron is preferable in view of vertically aligning the smectic liquid crystal compound and easily forming a C-plate of reciprocal wavelength dispersion. Examples of the compound including boron include the compounds disclosed in paragraphs [0064] to [0079] of JP2014-191156A, and the content of this publication is incorporated to the present specification.

Hereinafter, preferable examples of the compound including boron are provided below, but the present invention is not limited thereto.

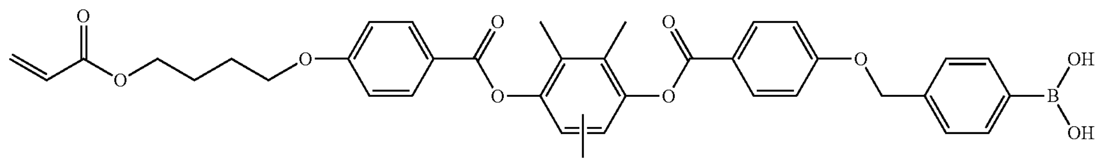

The content of the compound including boron in the optically anisotropic layer is preferably 0.01 to 10 mass % and more preferably 0.03 mass % to 1 mass % with respect to the content of the liquid crystal compound.

The optically anisotropic layer described above can be formed by coating the support with a coating liquid including the liquid crystal compound such as the rod-like liquid crystal compound or the disk-like liquid crystal compound, and a polymerization initiator, an alignment aid, an alignment control agent, a surfactant, or other additives, as desired. It is preferable that the optically anisotropic layer is formed by forming the alignment layer on the support, and by coating the surface of the alignment layer with the coating liquid described above. Examples of the surfactant used in the optically anisotropic layer of the λ/4 plate include MEGAFACE F444 of DIC Corporation.

According to the present invention, it is preferable to coat the surface of the alignment layer with the composition and align molecules of the liquid crystal compound. Since the alignment layer has a function of specifying the alignment direction of the liquid crystal compound, it is preferable that the alignment layer is used for realizing the preferable aspect of the present invention. However, in a case where the alignment state is fixed after the liquid crystal compound is aligned, the alignment layer has completed the role thereof, and thus the alignment layer is not essential as a component of the present invention. That is, it is possible to manufacture the λ/4 plate by transferring only the optically anisotropic layer on the alignment layer in which the alignment state is fixed to a support.

It is preferable that the alignment layer is formed by a rubbing treatment of a polymer.

Examples of the polymer that can be used in the alignment layer include a methacrylate-based copolymer, a styrene-based copolymer, polyolefin, polyvinyl alcohol, modified polyvinyl alcohol, poly(N-methylol acrylamide), polyester, polyimide, a vinyl acetate copolymer, carboxymethyl cellulose, and polycarbonate disclosed in paragraph number in the specification of JP1996-338913A (JP-H08-338913A). A silane coupling agent can be used as a polymer. A water-soluble polymer (for example, poly(N-methylol acrylamide), carboxymethyl cellulose, gelatin, polyvinyl alcohol, and modified polyvinyl alcohol) is preferable, gelatin, polyvinyl alcohol, and modified polyvinyl alcohol are more preferable, and polyvinyl alcohol and modified polyvinyl alcohol are particularly preferable.

It is preferable that the molecules of the liquid crystal compound are aligned by coating the rubbing treated surface of the alignment layer with the composition. Thereafter, if necessary, it is possible to form an optically anisotropic layer by causing the alignment layer polymer and the polyfunctional monomer contained in the optically anisotropic layer to react with each other or crosslinking the alignment layer polymer by using a crosslinking agent.

It is preferable that the film thickness of the alignment layer in the range of 0.1 to 10 μm.

The in-plane retardation (Re) of the support (polymer film) supporting the optically anisotropic layer is preferably 0 to 50 nm, more preferably 0 to 30 nm, and even more preferably 0 to 10 nm. It is preferable that Re of the support is set to be in the range described above since a light leak of reflected light is able to be reduced to a degree of being invisible.

It is preferable that the retardation (Rth) in the film thickness direction of this support is selected by the combination with the optically anisotropic layer provided on or below the support. Accordingly, it is possible to decrease the light leak of the reflected light or tint attachment in a case of being observed in the oblique direction.

Examples of the material of a polymer film used as the support include the materials used in the λ/4 plate, a cellulose acylate film (for example, a cellulose triacetate film (a refractive index of 1.48), a cellulose diacetate film, a cellulose acetate butyrate film, and a cellulose acetate propionate film), polyolefin such as polyethylene and polypropylene, a polyester film such as polyethylene terephthalate and polyethylene naphthalate, a polyacrylic resin film such as a polyether sulfone film and a polymethyl methacrylate, a polyurethane-based resin film, a polycarbonate film, a polysulfone film, a polyether film, a polymethyl pentene film, a polyether ketone film, a (meth)acrylonitrile film, a polymer having an alicyclic structure (a norbornene-based resin (ARTON: Product Name, manufactured by JSR Corporation), amorphous polyolefin (ZEONEX: Product Name, manufactured by Zeon Corporation)), and the like. Among them, the triacetyl cellulose, the polyethylene terephthalate, and the polymer having an alicyclic structure are preferable, and the triacetyl cellulose is particularly preferable.

A transparent support having a thickness of approximately 5 μm to 150 μm is able to be used, and the thickness of the transparent support is preferably 5 μm to 80 μm, and is more preferably 20 μm to 60 μm. The transparent support may be formed by laminating a plurality of layers. In order to suppress external light reflection, a thinner thickness is preferable. In a case where the thickness is thicker than 5 μm, the strength of the film becomes stronger, and thus the thicker thickness tends to be preferable. In order to enhance adhesion between the transparent support and a layer disposed on the transparent support (the adhesive layer, the vertical alignment layer, or a phase difference film), the transparent support may be subjected to a surface treatment (for example, a glow discharge treatment, a corona discharge treatment, an ultraviolet ray (UV) treatment, and a flame treatment). The adhesive layer (the undercoat layer) may be disposed on the transparent support. It is preferable that a transparent support to which slidability is applied in a transporting step or a transparent support which is formed by applying a polymer layer in which inorganic particles having an average particle diameter of approximately 10 to 100 nm are mixed at a mass ratio of solid contents of 5% to 40% onto one surface of the support or by co-casting with the support in order to prevent a back surface from being bonded to the surface after being wound is used in the transparent support or a long transparent support.

In the optical film of the present invention, it is preferable that the λ/4 plate satisfies Expressions (1) to (4).

$$450\text{ nm}/4-25\text{ nm}<Re(450)<450\text{ nm}/4+25\text{ nm} \quad \text{Expression (1)}$$

$$550\text{ nm}/4-25\text{ nm}<Re(550)<550\text{ nm}/4+25\text{ nm} \quad \text{Expression (2)}$$

$$630\text{ nm}/4-25\text{ nm}<Re(630)<630\text{ nm}/4+25\text{ nm} \quad \text{Expression (3)}$$

$$Re(450)<Re(550)<Re(630) \quad \text{Expression (4)}$$

(In Expressions (1) to (4), Re (λ) represents retardation (Unit: nm) in an in-plane direction at a wavelength of λ nm.)

The λ/4 plate more preferably satisfies Expressions (1A) to (4A).

$$450\text{ nm}/4-15\text{ nm}<Re(450)<450\text{ nm}/4+15\text{ nm} \quad \text{Expression (1A)}$$

$$550\text{ nm}/4-15\text{ nm}<Re(550)<550\text{ nm}/4+15\text{ nm} \quad \text{Expression (2A)}$$

$$630\text{ nm}/4-15\text{ nm}<Re(630)<630\text{ nm}/4+15\text{ nm} \quad \text{Expression (3A)}$$

$$Re(450)<Re(550)<Re(630) \quad \text{Expression (4A)}$$

The λ/4 plate more preferably satisfies Expressions (1B) to (4B).

$$450\text{ nm}/4-5\text{ nm}<Re(450)<450\text{ nm}/4+5\text{ nm} \quad \text{Expression (1B)}$$

$$550\text{ nm}/4-5\text{ nm}<Re(550)<550\text{ nm}/4+5\text{ nm} \quad \text{Expression (2B)}$$

$$630\text{ nm}/4-5\text{ nm}<Re(630)<630\text{ nm}/4+5\text{ nm} \quad \text{Expression (3B)}$$

$$Re(450)<Re(550)<Re(630) \quad \text{Expression (4B)}$$

The method of manufacturing the λ/4 plate that satisfies Expressions (1) to (4) is not particularly limited. For example, the method disclosed in JP1996-271731A (JP-H08-271731A) can be used, and the contents of the publication are incorporated to the present invention.

Hereinafter, the method disclosed in JP1996-271731A (JP-H08-271731A) is described.

Examples of the λ/4 plate formed of the superposed body of the phase difference film include λ/4 plate obtained by laminating the plurality of phase difference films in a combination of one providing phase difference of a ½ wavelength to monochromatic light and one providing phase difference of a ¼ wavelength such that optical axes thereof are crossed.

In the case of a λ/4 plate including a superposed body of the phase difference film, a plurality of phase difference films providing a phase difference of ½ wavelength or ¼ wavelength to monochromatic light are laminated such that optical axes thereof are crossed, the wavelength dispersion of the retardation defined by the product (Δnd) of the refractive index difference (Δn) and the thickness (d) of the birefringence light can be superimposed or adjusted so as to be arbitrarily controlled, the wavelength dispersion is suppressed while the phase difference as a whole is controlled to ¼ wavelength, and it is possible to obtain a wave plate exhibiting a phase difference of ¼ wavelength over a wide wavelength range.

In the λ/4 plate formed of a superposed body of a phase difference film, the number of times of lamination of the phase difference films is arbitrary. In view of light transmittance and the like, lamination of two to five layers are generally used. The arrangement positions of the phase difference film providing the phase difference of the ½ wavelength and the phase difference film providing the phase difference of the ¼ wavelength are arbitrary.

In a case where the retardation in the light having a wavelength of 450 nm is $R_{450}$, and the retardation in the light having a wavelength of 550 nm is $R_{550}$, the λ/4 plate including the superposed body of the phase difference film can be obtained by laminating a phase difference film having great retardation in which $R_{450}/R_{550}$ is 1.00 to 1.05 and a phase difference film having small retardation in which a ratio of $R_{450}/R_{550}$ is 1.05 to 1.20 such that optical axes thereof are crossed.

Even in a case of the λ/4 plate formed of a superposed body of a phase difference film, phase difference films having different retardation are laminated such that optical axes thereof are crossed (preferably at right angles), the wavelength dispersion of the retardation in the respective phase difference films can be superimposed or adjusted so as to be arbitrarily controlled, and particularly the retardation can be reduced toward the short wavelength side.

Specific examples of the λ/4 plate using the λ/4 plate formed of a superposed body of a phase difference film include one obtained by laminating a phase difference film (retardation in light having a wavelength of 550 nm: 700 nm) obtained by stretching a polyvinyl alcohol film and a phase difference film (retardation in light having a wavelength of 550 nm: 560 nm) obtained by stretching a polycarbonate film such that optical axes thereof are crossed. Such a laminate functions substantially as a λ/4 plate over a wavelength of 450 to 750 nm.

As described above, the phase difference film can be obtained, for example, by a method of stretching a polymer film uniaxially or biaxially. The type of polymer is not particularly limited, but a polymer having excellent transparency is preferably used. Examples thereof include a polycarbonate-based polymer, a polyester-based polymer, a polysulfone-based polymer, a polyether sulfone-based polymer, a polystyrene-based polymer, a polyolefin-based polymer, a polyvinyl alcohol-based polymer, a cellulose acetate-based polymer, a polyvinyl chloride-based polymer, and a polymethyl methacrylate-based polymer.

Particularly, the phase difference film in which $R_{450}/R_{550}$ is 1.00 to 1.05 can be formed by using a polymer in which an absorption edge is near the wavelength of 200 nm such as a polyolefin-based polymer, a polyvinyl alcohol-based polymer, a cellulose acetate-based polymer, a polyvinyl chloride-based polymer, and a polymethyl methacrylate-based polymer.

A phase difference film in which $R_{450}/R_{550}$ is 1.05 to 1.20 can be formed by using a polymer in which an absorption edge is on a wavelength side longer than 200 nm, such as a polycarbonate-based polymer, a polyester-based polymer, a polysulfone-based polymer, a polyether sulfone-based polymer, and a polystyrene-based polymer.

On the other hand, as the λ/4 plate that satisfies Expressions (1) to (4), one that is prepared as a laminate of the following 212 plate (abbreviated as a half wavelength plate) and a λ/4 plate can also be used.

An optically anisotropic layer used as the λ/2 plate and the λ/4 plate is described. The λ/4 plate or the λ/2 plate may include an optically anisotropic layer, the optically anisotropic layer can be formed from one or more kinds of curable compositions including a liquid crystal compound as a main component, a liquid crystal compound having a polymerizable group is preferable among the liquid crystal compounds, and the λ/4 plate or the λ/2 plate is preferably formed from one type of curable composition.

A λ/4 plate used in the λ/4 plate satisfying Expressions (1) to (4) may be an optical anisotropy support having a desired λ/4 function in the support itself, or may have an optically anisotropic layer or the like on the support formed of a polymer film. That is, in the latter case, a desired λ/4 function is provided by laminating other layers on the support. The configuration material of the optically anisotropic layer is not particularly limited, but the optically anisotropic layer may be a layer which is formed of a composition containing a liquid crystal compound and exhibits optical anisotropy expressed by aligning molecules of the liquid crystal compound or a layer which has optical anisotropy expressed by stretching a polymer film and by aligning the polymer in the film, or may be both of the layers. That is, the optically anisotropic layer is able to be configured of one or more biaxial films, and is also able to be configured of a combination of two or more monoaxial films such as a combination of a C-plate plate and an A-plate. Naturally, the optically anisotropic layer is able to be configured of a combination of one or more biaxial films and one or more monoaxial films.

Here, the "λ/4 plate" used in the λ/4 plate satisfying Expressions (1) to (4) refers to an optically anisotropic layer in which the retardation Re(2) in the in-plane direction at a specific wavelength λ nm satisfies $$Re(\lambda)\approx\lambda/4.$$

The above expression may be achieved at any wavelength (for example, 550 nm) in the visible light range. The retardation Re(550) in the in-plane direction at the wavelength of 550 nm is preferably $$115\ \text{nm}\leq Re(550)\leq 155\ \text{nm}$$

and more preferably 120 nm to 145 nm. It is preferable that the retardation is in the above range, since, in a case where the λ/4 plate is combined with a λ/2 plate described below, the light leak of the reflected light can be reduced to a degree of not being recognized.

A λ/2 plate used in the λ/4 plate satisfying Expressions (1) to (4) may be an optical anisotropy support having a desired λ/2 function in the support itself, or may have an optically anisotropic layer or the like on the support formed of a polymer film. That is, in the latter case, a desired λ/2 function is provided by laminating other layers on the support. The constituent material of the optically anisotropic layer is not particularly limited, and can be formed of the same constituent material as the λ/4 plate.

Here, the "λ/2 plate" used in the λ/4 plate satisfying Expressions (1) to (4) refers to an optically anisotropic layer in which the retardation Re(λ) in the in-plane direction at a specific wavelength λ nm satisfies $$Re(\lambda)\approx\lambda/2.$$

The above expression may be achieved at any wavelength (for example, 550 nm) in the visible light range. In the present invention, a retardation Re1 in the in-plane direction of the λ/2 plate is set to be substantially twice a in-plane retardation Re2 of the λ/4 plate.

Here, the expression "a retardation is substantially twice" means that $$Re1=2\times Re2\pm 50\text{ nm}.$$

Here, $$Re1=2\times Re2\pm 20\text{ nm}$$

is more preferable, and $$Re1=2\times Re2\pm 10\text{ nm}$$

is even more preferable. The above expression may be achieved at any wavelength in the visible light range. It is preferably achieved at a wavelength of 550 nm. It is preferable that the retardation is this range, in a case where the λ2 plate is laminated and is combined with the λ/4 plate for forming the λ/4 plate used for the brightness enhancement film, the light leak of the reflected light can be reduced to a degree of not being visually recognized.

In the liquid crystal display device of the present invention described below, it is preferable that the direction of the linearly polarized light transmitted through the λ/4 plate used for the light reflection film is laminated so as to be parallel to the transmission axis direction of the backlight side polarizing plate.

In a case where the λ/4 plate used for the light reflection film is a single layer, an angle formed by the slow axis direction of the λ/4 plate and the absorption axis direction of the polarizing plate is preferably 30° to 60°, more preferably 35° to 55°, particularly preferably 40° to 50°, and more particularly preferably 45° In the case where the λ/4 plate (λ/4 plate satisfying Expressions (1) to (4)) used for the light reflection film is a laminate of a λ/4 plate and a λ/2 plate, an angle formed by the slow axis direction of the entire λ/4 plate as a laminate and the absorption axis direction of the polarizing plate is 30° to 60°, preferably 35° to 55°, more preferably 40° to 50°, particularly preferably 42° to 48°, and more particularly preferably 45°. Here, an angle formed by the slow axis direction of each of the λ/4 plate and the λ/2 plate used for the laminate and the absorption axis direction of the polarizing plate has the following positional relationship.

In the case where Rth at the wavelength of 550 nm of the λ/2 plate is negative, an angle formed by the slow axis direction of the λ/2 plate and the absorption axis direction of the polarizer is preferably in the range of 75°±8°, more preferably in the range of 75°±6°, and even more preferably in the range of 75°±3°. At this point, an angle formed by the slow axis direction of the λ/4 plate which is laminated with the λ/2 plate and which is for forming the λ/4 plate used for the brightness enhancement film and the absorption axis direction of the polarizer layer is preferably in the range of 15°±8°, more preferably in the range of 15°±6°, and even more preferably in the range of 15°±3°. It is preferable that Re of the support is set to be in the range described above since a light leak of reflected light is able to be reduced to a degree of being invisible.

In the case where Rth at the wavelength of 550 nm of the λ/2 plate is positive, an angle formed by the slow axis direction of the λ/2 plate and the absorption axis direction of the polarizer is preferably in the range of 15°±8°, more preferably in the range of 15°±6°, and even more preferably in the range of 15°±3°. At this point, an angle formed by the slow axis direction of the λ/4 plate which is laminated with the λ/2 plate and which is for forming the λ/4 plate used for the brightness enhancement film and the absorption axis direction of the polarizer layer described above is preferably in the range of 75°±8°, more preferably in the range of 75°±6°, and even more preferably in the range of 75°±3°. It is preferable that Re of the support is set to be in the range described above since a light leak of reflected light is able to be reduced to a degree of being invisible.

In the above, the λ/2 plate or the λ/4 plate, which has a laminate structure in which the optically anisotropic layer is provided on the support, has been described, but the present invention is not limited to this aspect, the λ/2 plate and the λ/4 plate may be laminated on one side of a transparent support, or the λ/2 plate is laminated on one side of one transparent support, and λ/4 plate may be laminated on the other side. The λ/2 plate or the λ/4 plate may be formed of a stretched polymer film (optical anisotropy support) alone or may be formed only of a liquid crystal film formed from a composition containing a liquid crystal compound. A preferable example of the liquid crystal film also the same as the preferable example of the optically anisotropic layer.

(Adhesive Layer (Pressure Sensitive Adhesive Material))

In this specification, "adhesive" is used as the concept which also includes "pressure sensitive adhesive".

It is preferable that, in the optical film according to the present invention, the λ/4 plate and the cholesteric layer (first light reflecting layer) are directly in contact with each other or are laminated via an adhesive layer. In a case where a brightness enhancement film of the present invention described above has a second light reflecting layer or further has a third light reflecting layer, any one of direct contact or lamination via an adhesive layer may be selected for each of the cholesteric layer (first light reflecting layer), the second light reflecting layer, and the third light reflecting layer.

It is preferable that the polarizing plate and the reflection polarizer are directly in contact with each other or are laminated via an adhesive layer in the brightness enhancement film of the present invention described below and the optical sheet member of the present invention described below.

In the optical sheet member of the present invention described below, it is preferable that the polarizing plate, the λ/4 plate, and the reflection polarizer are directly in contact with each other or are laminated via an adhesive layer in this order.

Examples of a method of laminating these members to be directly in contact with each other are able to include a method of laminating the other member onto each of the members by coating.

An adhesive layer may be arranged between these members. The pressure sensitive adhesive material used for laminating the optically anisotropic layer and the polarizing plate indicates a substance in which a ratio (tan δ=G"/G') of a modulus of storage elasticity G' and a modulus of loss elasticity G" to be measured by a dynamic viscoelasticity measurement device is 0.001 to 1.5, and includes a so-called pressure sensitive adhesive material, a substance which is easy to creep, or the like. Examples of the pressure sensitive adhesive material which is able to be used in the present invention include an acrylic pressure sensitive adhesive material and a polyvinyl alcohol-based adhesive, but are not limited thereto.

Examples of the adhesive include an aqueous solution of boron compound, a curable adhesive of an epoxy compound as disclosed in JP2004-245925A which does not have an aromatic ring in the molecules, an actinic energy ray curable type adhesive disclosed in JP2008-174667A which includes a photopolymerization initiator having a molar light absorption coefficient at a wavelength of 360 to 450 nm of greater than or equal to 400 and an ultraviolet ray curable compound as an essential component, an actinic energy ray curable type adhesive disclosed in JP2008-174667A which contains (a) a (meth)acrylic compound having two or more (meth)acryloyl groups in the molecules, (b) a (meth)acrylic compound having a hydroxyl group and only one polymerizable double bond in the molecules, and (c) phenol ethylene oxide-modified acrylate or nonyl phenol ethylene oxide-modified acrylate in the total amount of 100 parts by mass of a (meth)acrylic compound, and the like.

In the optical sheet member described below, a difference in refractive indices between the reflection polarizer (laminate including first light reflecting layer, second light reflecting layer, and third light reflecting layer) and a layer adjacent to the reflection polarizer on the polarizing plate side is preferably less than or equal to 0.15, is more preferably less than or equal to 0.10, and is particularly preferably less than or equal to 0.05. Examples of the layer adjacent to the reflection polarizer on the polarizing plate side are able to include the adhesive layer described above.

An adjustment method of the refractive index of the adhesive layer is not particularly limited, and for example, a method disclosed in JP1999-223712A (JP-H11-223712A) is able to be used. In the method disclosed in JP1999-223712A (JP-H11-223712A), the following aspect is particularly preferable.

Examples of the pressure sensitive adhesive material which is used in the adhesive layer are able to include resins such as a polyester resin, an epoxy-based resin, a polyurethane-based resin, a silicone-based resin, and an acrylic resin. The resin may be independently used singly or two or more kinds thereof may be used in a mixture. In particular, the acrylic resin is preferable from the viewpoint of excellent reliability with respect to water resistance, heat resistance, light resistance, and the like, an excellent adhesion force and excellent transparency, and ease of adjusting the refractive index to be suitable for a liquid crystal display. Examples of the acrylic pressure sensitive adhesive material are able to include a homopolymer or a copolymer of an acrylic monomer such as an acrylic acid and ester thereof, a methacrylic acid and ester thereof, acrylamide, and acrylonitrile, and a copolymer of at least one type of acrylic monomer described above and an aromatic vinyl monomer of vinyl acetate, maleic anhydride, styrene, and the like. In particular, a copolymer formed of main monomers such as ethylene acrylate, butyl acrylate, and 2-ethyl hexyl acrylate which exhibits pressure sensitive adhesiveness, a monomer such as vinyl acetate, acrylonitrile, acrylamide, styrene, methacrylate, and methyl acrylate which become an aggregation force component, and functional group-containing monomers such as a methacrylic acid, an acrylic acid, an itaconic acid, hydroxy ethyl methacrylate, hydroxy propyl methacrylate, dimethyl amino ethyl methacrylate, dimethyl amino ethyl methacrylate, acrylamide, methylol acrylamide, glycidyl methacrylate, and maleic anhydride which improve an adhesion force or provide a cross-linking starting point, in which a glass transition temperature (Tg) is in a range of −60° C. to −15° C., and a weight-average molecular weight is in a range of 200,000 to 1,000,000 is preferable.

In the present invention, a sheet-like light curing type tacky adhesive material (disclosed in Toagosei Group research annual report, 11 TREND 2011 No. 14) can also be used for the adhesive layer. In the same manner as the pressure sensitive adhesive material, optical films are easily bonded to each other, crosslinking/curing is performed with ultraviolet rays (UV), a modulus of storage elasticity, adhesion force, and heat resistance are improved, and thus the tacky adhesive is a suitable bonding method for the present invention.

<Properties of Optical Film>

(Reflection Bandwidth)

With respect to the optical film of the present invention, the reflection bandwidth is preferably 70 nm or greater, more preferably 90 nm or greater, particularly preferably 110 nm or greater, more particularly preferably 120 nm or greater, and even more particularly preferably 130 nm or greater.

In the present specification, the reflection bandwidth of the optical film means a value calculated by the following method. In a case where the transmission spectrum of the optical film in the range of 400 nm to 800 nm is measured by using AxoScan manufactured by Axometrics Inc., the average value of the transmittance in the wavelength range not exhibiting the selective reflection due to the cholesteric layer and the average value of the transmittance in the wavelength range exhibiting the selective reflection due to the cholesteric layer are obtained. The average value Ix of the average value of the transmittance of the wavelength range not exhibiting the selective reflection due to the cholesteric layer and the average value of the transmittance of the wavelength range exhibiting the selective reflection due to the cholesteric layer is further calculated. Wavelengths at two points in which transmittance is the average value Ix are read, and the difference thereof is calculated as the reflection bandwidth.

In the present specification, the wavelength not exhibiting selective reflection due to the cholesteric layer means that the transmittance in the transmission spectrum of the optical film is a wavelength in which the largest peak height among the decrease peaks of the transmittance is 1% or less. The wavelength exhibiting selective reflection due to the cholesteric layer means that the transmittance in the transmission spectrum of the optical film is a wavelength in which the largest peak height among the decrease peaks of the transmittance is 99% or greater.

(Oblique Retardation of Film Thickness Direction)

With respect to the optical film of the present invention, the oblique retardation of the cholesteric layer in the film thickness direction is preferably shorter than 0 nm, more preferably −300 nm or greater and shorter than 0 nm, and particularly preferably −200 nm or greater and shorter than 0 nm in view of optical compensation. The oblique retardation in the film thickness direction is measured by the following method by using AxoScan manufactured by Axometrics Inc. The optical film is set to AxoScan at an angle of 50°, and retardation and a reflection spectrum are measured in the range of 400 nm to 800 nm. Among the obtained retardation, the average value of the retardation values in the range excluding the region in which the reflection spectrum exhibits the reflection wavelength is obtained, so as to be an oblique retardation value in the film thickness direction.

[Method of Manufacturing Optical Film]

The method of manufacturing the optical film of the present invention is not particularly limited, and a method of manufacturing the optical film of the present invention described below is preferably used.

The method of manufacturing a cholesteric layer (particularly, light reflecting layer obtained by fixing cholesteric liquid crystalline phase) in the optical film of the present invention is not particularly limited, and, for example, methods disclosed in JP1989-133003A (JP-H01-133003A), JP3416302B, JP3363565B, and JP1996-271731A (JP-H08-271731A) can be used, and the contents thereof are incorporated to the present invention.

The method of manufacturing an optical film of the present invention includes: a step of coating an underlayer with a disk-like liquid crystal composition, a step of aligning the disk-like liquid crystal composition in a cholesteric liquid crystalline phase, and a step of forming different helical pitches in a cholesteric layer such that fluctuation in a helical pitch in a film thickness direction of the cholesteric layer is 2% or greater.

Hereinafter, a preferable aspect of the method of manufacturing the optical film of the present invention is described.

<Step of Coating Underlayer with Disk-Like Liquid Crystal Composition>

The method of manufacturing an optical film of the present invention includes a step of coating an underlayer with a disk-like liquid crystal composition. The method of forming the cholesteric layer of the disk-like liquid crystal composition including the disk-like liquid crystal compound is preferably coating with the disk-like liquid crystal composition.

The coating of the disk-like liquid crystal composition is able to be performed by a method in which the disk-like liquid crystal composition is set to be in a solution state by using a solvent or the polymerizable liquid crystal composition is set to be a liquid material such as a melting liquid by using heating, and the polymerizable liquid crystal composition is applied by a suitable method such as a roll coating method or a gravure printing method, and a spin coating method. The coating of the polymerizable liquid crystal composition is able to be performed by various methods such as a wire bar coating method, an extrusion coating method, a direct gravure coating method, a reverse gravure coating method, and a die-coating method. The disk-like liquid crystal composition is ejected from a nozzle by using an ink jet device, and thus, a coating film can be formed.

The film thickness of the coating film of the disk-like liquid crystal composition preferably 0.5 to 20.0 μm and more preferably 1.0 to 10.0 μm. Though it depends on Δn of the disk-like liquid crystal composition, in a case where the film thickness is 0.5 μm or greater, sufficient reflectance is exhibited. In a case where the film thickness is 20.0 μm or less, it is easy to form a cholesteric liquid crystalline phase without defects.

<Step of Aligning Disk-Like Liquid Crystal Composition to Cholesteric Liquid Crystalline Phase>

The method of manufacturing an optical film of the present invention includes a step of aligning the disk-like liquid crystal composition to a cholesteric liquid crystalline phase.

After the coating of the disk-like liquid crystal composition, before the polymerization reaction for curing, the coating film may be dried by a well-known method. For example, the coating film may be dried by standing or may be dried by heating or blowing.

In the coating and drying step of the disk-like liquid crystal composition, the disk-like liquid crystal compound molecules in the disk-like liquid crystal composition may be aligned.

For example, in an aspect in which the disk-like liquid crystal composition is prepared as a coating liquid containing a solvent, a state of the cholesteric liquid crystalline phase can be obtained by drying the coating film and removing the solvent. Otherwise, heating at a liquid crystalline phase transition temperature to a cholesteric liquid crystalline phase may be performed. For example, first, the coating film is heated to a temperature of an isotropic phase, and then, is cooled to the cholesteric liquid crystalline phase transition temperature, and thus, it is possible to stably obtain the state of the cholesteric liquid crystalline phase. In view of manufacturing suitability or the like, the liquid crystalline phase transition temperature of the disk-like liquid crystal composition is preferably in a range of 10° C. to 250° C. and is more preferably in a range of 10° C. to 150° C. It is preferable that the liquid crystalline phase transition temperature is the lower limit value or higher, a cooling step is not necessary in order to decrease the temperature to a temperature range at which a liquid crystalline phase is exhibited. It is preferable that the liquid crystalline phase transition temperature is the upper limit value or lower, since a high temperature is not required in order to obtain an isotropic liquid state of which the temperature is higher than the temperature range at which the crystalline phase is exhibited, and waste of thermal energy, and deformation or modification of an underlayer such as a support are suppressed.

<Step of Forming Different Helical Pitches in Cholesteric Layer>

The method of manufacturing the optical film according to the present invention includes a step of forming different helical pitches in a cholesteric layer such that fluctuation in a helical pitch in a film thickness direction of the cholesteric layer is 2% or greater.

It is possible to form a cholesteric layer having a wide reflection bandwidth by causing fluctuation in a helical pitch in a film thickness direction of the cholesteric layer to be 2% or greater and by forming different helical pitches in a film thickness direction of the cholesteric layer in this step. In a case where the disk-like liquid crystal composition is cholesterically aligned by an ordinary known method, a helical pitch having a constant thickness is formed in the entire film thickness depending on the components and temperature included in the disk-like liquid crystal composition. In this step, it is preferable to form a plurality of regions in a different degree of curing in the film thickness direction by partially curing the cholesteric layer in the film thickness direction. It is assumed that in a region in which the degree of curing is different, the length of the helical pitch depending on the component and the temperature included in the disk-like liquid crystal composition changes, and thus different helical pitches are formed in the film thickness direction.

The method of partially curing the cholesteric layer of the disk-like liquid crystal composition in the present invention is not particularly limited, examples thereof include thermal polymerization or photopolymerization, and photopolymerization is preferable.

It is preferable that the photopolymerization is performed by using ultraviolet rays irradiation. The light source of the ultraviolet rays is not particularly limited, and may be a light source having light emission at the absorption maximum wavelength of the polymerization initiator. Ultraviolet irradiation may be performed on the coated surface of the disk-like liquid crystal composition and may be performed on the support side.

In view of fluctuating the helical pitch in the film thickness direction, the ultraviolet illuminance is preferably 1 to 300 mW/cm$^2$, more preferably 1 to 200 mW/cm$^2$, and particularly preferably 5 to 150 mW/cm$^2$.

In view of productivity, the ultraviolet irradiation time is preferably 0.1 to 300 seconds, more preferably 0.3 to 120 seconds, and particularly preferably 0.5 to 60 seconds.

The ultraviolet irradiation may be performed in an air atmosphere or a nitrogen atmosphere.

It is possible to control the curing degree in the film thickness direction by adjusting the oxygen concentration.

In this step, ultraviolet rays may be irradiated via a filter (for example, a band pass filter) that transmits only a specific wavelength in a case of ultraviolet irradiation. In a case where such a filter is used, even in a case where a large amount of a photopolymerization initiator is used, the reflection bandwidth can be widened. The filter to be used is suitably selected according to the absorption maximum wavelength and the light absorption coefficient of the disk-like liquid crystal compound included in the disk-like liquid crystal composition, the chiral agent, the polymerization initiator, and the additive, the addition amount thereof, and the light emission wavelength and the intensity of the light source.

In this step, irradiation with ultraviolet rays may be performed under heating. In the method of manufacturing the optical film of the present invention, the step of forming different helical pitches in a cholesteric layer is preferably a step of irradiation with ultraviolet rays under heating. The heating temperature can be adjusted according to the liquid phase transition temperature of the disk-like liquid crystal composition. With respect to the temperature in a case of ultraviolet irradiating, in view of fluctuating a helical pitch in the film thickness direction, the surface temperature of the coating film is preferably 25° C. to 110° C., more preferably 45° C. to 65° C., and particularly preferably 50° C. to 60° C.

In this step, the cholesteric layer may be post-heated after ultraviolet irradiation. In the method of manufacturing the optical film of the present invention, the step of forming different helical pitches in a cholesteric layer is preferably a step of heating after irradiation with ultraviolet rays. In the method of manufacturing the optical film of the present invention, the step of forming different helical pitches in a cholesteric layer is more preferably a combination of a step of irradiation with ultraviolet rays under heating and a step of heating after irradiation with ultraviolet rays. With respect to the heating temperature after ultraviolet irradiation, in view of fluctuating a helical pitch in the film thickness direction, the surface temperature of the coating film is preferably 40° C. to 140° C., more preferably 50° C. to 120° C., and particularly preferably 60° C. to 100° C. In view of fluctuating a helical pitch in the film thickness direction, the heating temperature after ultraviolet irradiation is preferably 1 to 180 seconds, more preferably 3 to 60 seconds, and particularly preferably 25 to 35 seconds.

<Step of Fixing Cholesteric Liquid Crystalline Phase of Cholesteric Layer>

The method of manufacturing the optical film of the present invention preferably includes a step of fixing a cholesteric liquid crystalline phase of the cholesteric layer after the step of forming different helical pitches in a cholesteric layer. As the method of fixing a cholesteric liquid crystalline phase, various methods can be used, examples thereof include thermal polymerization or photopolymerization, and photopolymerization is preferable. In a case where photopolymerization is used, it is preferable that, after the step of forming different helical pitches in a cholesteric layer of the disk-like liquid crystal composition, the cholesteric liquid crystalline phase is fixed by light irradiation.

Light used in fixing is preferably ultraviolet rays. A light source may be a light source the same as the ultraviolet light used in the step of forming different helical pitches in the cholesteric layer or may be a different light source. Ultraviolet rays may be irradiated while heating, or ultraviolet rays may be irradiated via a filter that transmits only specific wavelengths.

In view of durability and productivity, the ultraviolet illuminance in this step is preferably 5 to 1,000 mW/cm$^2$, more preferably 10 to 400 mW/cm$^2$, and particularly preferably 15 to 250 mW/cm$^2$.

In view of durability and productivity, the ultraviolet irradiation time in this step is preferably 0.1 to 60 seconds, more preferably 0.5 to 30 seconds, and particularly preferably 1 to 20 seconds.

The ultraviolet irradiation in this step may be performed under an air atmosphere or a nitrogen atmosphere, and a nitrogen atmosphere is preferable in view of durability.

With respect to the surface temperature in a case of ultraviolet irradiation in this step, in view of reflection bandwidth and durability, the surface temperature of the coating film is preferably 25° C. to 100° C., more preferably 40° C. to 90° C., and particularly preferably 45° C. to 80° C.

[Brightness Enhancement Film]

The brightness enhancement film of the present invention is a brightness enhancement film obtained by laminating the optical film of the present invention and the second light reflecting layer obtained by fixing the cholesteric liquid crystalline phase of the liquid crystal compound.

According to this configuration, in a case where the brightness enhancement film of the present invention is incorporated to a liquid crystal display device, durability is high, and an oblique tint change can be suppressed.

<Configuration>

The configuration of the brightness enhancement film of the present invention is described with reference to the drawings.

Figure 2:
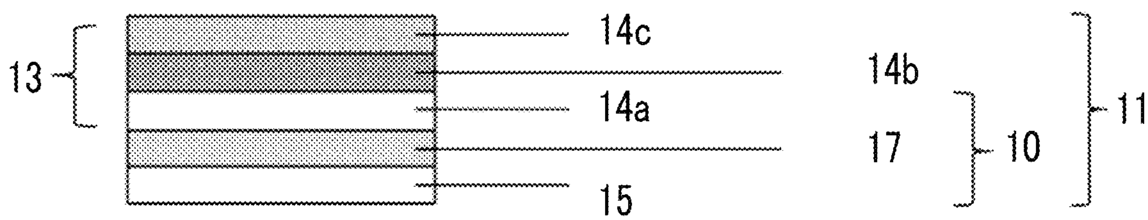
FIG. 2 is a schematic view illustrating a cross section in an example of a brightness enhancement film of the present invention and illustrates an aspect of laminating a λ/4 plate and underlayer (alignment film) formed on a support, a first light reflecting layer, a second light reflecting layer, and a third light reflecting layer in direct contact.

As an example of a brightness enhancement film 11 of the present invention, FIG. 2 illustrates an aspect in which the support 15, a λ/4 plate and underlayer (alignment film) 17 formed on the support, and a reflection polarizer 13 including three layers of the cholesteric layer **14*a* (first light reflecting layer), a second light reflecting layer 14*b*, and a third light reflecting layer 14*c* are laminated in direct contact. The reflection polarizer 13 may have a layer other than the cholesteric layer 14*a* (first light reflecting layer), the second light reflecting layer 14*b*, and the third light reflecting layer 14*c*. For example, an aspect (not illustrated) in which the second light reflecting layer 14*b* is laminated on the cholesteric layer 14*a* (first light reflecting layer) via the adhesive layer 20** is also preferable.

The film thickness of the brightness enhancement film of the present invention is preferably 3 to 120 μm, more preferably 5 to 100 μm, and particularly preferably 6 to 90 μm.

The second light reflecting layer is a second light reflecting layer obtained by fixing a cholesteric liquid crystalline phase of a liquid crystal compound (for example, a rod-like liquid crystal compound or a disk-like liquid crystal compound).

The brightness enhancement film of the present invention preferably has a third light reflecting layer obtained by fixing a cholesteric liquid crystalline phase of the liquid crystal compound (for example, a rod-like liquid crystal compound or a disk-like liquid crystal compound).

Here, for convenience of description, the laminate of the light reflecting layers including the first light reflecting layer, the second light reflecting layer, and the third light reflecting layer is referred to as a reflection polarizer.

The brightness enhancement film of the present invention is a brightness enhancement film having a λ/4 plate and a reflection polarizer, and the reflection polarizer preferably includes a first light reflecting layer, a second light reflecting layer, and a third light reflecting layer, in this order, from the λ/4 plate side.

The brightness enhancement film of the present invention, it is preferable that the sign of Rth (550) of the first light reflecting layer or the oblique retardation in the film thickness direction and the Rth (550) of the second light reflecting layer are reversed (here, Rth (550) represents the retardation (unit: nm) in the film thickness direction of each layer at a wavelength of 550 nm).

In a case where the brightness enhancement film of the present invention is incorporated to the liquid crystal display device, the oblique tint change can be suppressed. Here, in the LCD, a configuration of employing a set of linear polarizers arranged in crossed nicols above and below the liquid crystal cell is common. Therefore, in order to convert the light extracted from the reflection polarizer into linearly polarized light, it is preferable that the λ/4 plate and a reflection polarizing plate having a configuration in which a light reflecting layer obtained by fixing a cholesteric liquid crystalline phase is laminated is incorporated to a liquid crystal display device. However, in a case where a reflection polarizing plate is incorporated to a liquid crystal display device, the tint change in a case of viewing from an oblique direction due to the optical properties of the cholesteric liquid crystalline phase and the λ/4 plate easily occur.

A mechanism capable of suppressing the oblique tint change in a case where the brightness enhancement film of the present invention is incorporated to a liquid crystal display device is described below. Hereinafter, the aspect in which the brightness enhancement film of the present invention includes the third light reflecting layer will be described as an example. However, even in a case where the brightness enhancement film of the present invention does not include the third light reflecting layer, it is possible to suppress oblique tint change in the same mechanism, in a case of being incorporated to the liquid crystal display device.

Here, in the brightness enhancement film of the present invention, the arrangement of a blue light reflecting layer, a green light reflecting layer, and a red light reflecting layer on which layer of the first light reflecting layer, the second light reflecting layer, and the third light reflecting layer, that is, the lamination order in which the blue light reflecting layer, the green light reflecting layer, and the red light reflecting layer, does not matter. The arrangement of a blue light reflecting layer, a green light reflecting layer, and a red light reflecting layer on which layer of the first light reflecting layer, the second light reflecting layer, and the third light reflecting layer, that is, the lamination order in which the blue light reflecting layer, the green light reflecting layer, and the red light reflecting layer enhance the brightness in any order, and the oblique tint change can be suppressed.

In a case where the brightness enhancement film in the related art is incorporated in a liquid crystal display device, in the oblique orientation, coloring (oblique tint change) occurs due to the influence of the first light reflecting layer, the second light reflecting layer, and the third light reflecting layer. The reasons for this are the following two reasons. The first reason is that, in the oblique orientation, the peak wavelength of the reflectance of the light reflecting layer obtained by fixing the cholesteric liquid crystalline phase is shifted to the short wavelength side with respect to the peak wavelength of the front surface. For example, the light reflecting layer having the reflection center wavelength in the wavelength range of 500 to 599 nm may be shifted the center wavelength to the wavelength range in the oblique orientation to 400 to 499 nm. Another reason is that the light reflecting layer formed by fixing the cholesteric liquid crystal layer using rod-like liquid crystal acts as a negative C-plate (positive retardation plate in Rth) in a wavelength range in which reflection does not performed, and thus in the oblique orientation, coloring occurs due to the influence of retardation.

In the present invention, the first light reflecting layer is a light reflecting layer obtained by vertically aligning the disk-like liquid crystal compound and fixing the cholesteric liquid crystalline phase, and Rth (550) and oblique retardation in the film thickness direction become negative values. On the other hand, Rth (550) and the oblique retardation of the light reflecting layer obtained by fixing the cholesteric liquid crystalline phase using the rod-like liquid crystal compound in the film thickness direction are positive values. Therefore, in a case where the light reflecting layer obtained by fixing a cholesteric liquid crystalline phase using a rod-like liquid crystal compound is laminated on the first light reflecting layer, Rth (550) of the both is canceled and thus the oblique tint change in a case of being incorporated in a liquid crystal display device can be improved. In a case where the first light reflecting layer, the fact that the second light reflecting layer, and the third light reflecting layer are laminated from the λ/4 plate side, the influence on the oblique tint change is greater is the influence of the first and second light reflecting layers. In a case where the first light reflecting layer, the fact that the second light reflecting layer, and the third light reflecting layer are laminated from the λ/4 plate side, the influence on the oblique tint change is greater is the influence of the first and second light reflecting layers. In a case where the signs of the Rth (550) of the first light reflecting layer or the oblique retardation in the film thickness direction and Rth (550) of the second light reflecting layer are reversed, the oblique tint change can be further improved.

In a preferred embodiment of the present invention, it is more preferable that the brightness is increased in a case where the brightness enhancement film of the present invention is incorporated in a liquid crystal display device. The mechanism of increasing the brightness in a case where the brightness enhancement film of the present invention is incorporated in a liquid crystal display device is described below.

The light reflecting layer obtained by fixing a cholesteric liquid crystalline phase included in the brightness enhancement film of the present invention can reflect at least one of right circularly polarized light or left circularly polarized light in a wavelength range near the reflection center wavelength thereof. In the preferable aspect of the brightness enhancement film of the present invention, one of the first light reflecting layer, the second light reflecting layer, and the third light reflecting layer is a blue light reflecting layer, another is a green light reflecting layer, and the other is a red light reflecting layer. The reflection polarizer can reflect at least one of the right circularly polarized light or the left circularly polarized light with respect to the blue light, the green light, and the red light. The λ/4 plate can convert light of wavelength λ nm from circularly polarized light to linearly polarized light. According to this configuration, the circular polarization (for example, right circularly polarized light) in the first polarization state is substantially reflected by the reflection polarizer, the circular polarization (for example, left circularly polarized light) in the second polarization state is substantially transmitted by the reflection polarizer, and the light that is transmitted by the reflection polarizer in the second polarization state (for example, left circularly polarized light) is converted to the linearly polarized light by the λ/4 plate. Thereafter, it is preferable to substantially transmit the polarizer (linearly polarizer) of the polarizing plate. The light in the first polarization state which is substantially reflected on the reflection polarizer by a reflection member described below (also referred to as a light guide device and an optical resonator) randomizes the direction and the polarization state thereof and is recirculated, and a part of the light is reflected again by the reflection polarizer as the circularly polarized light in the first polarization state and a part of the remaining light is transmitted as the circularly polarized light in the second polarization state, and thus, a light utilization efficiency on a backlight-side increases and the brightness of the liquid crystal display device is able to be enhanced.

The polarization state of the light exiting from the reflection polarizer, that is, the polarization state of transmitted light and reflected light of the reflection polarizer, for example, is able to be measured by performing polarization measurement using Axoscan manufactured by Axometrics Inc.

Not only the properties of the liquid crystal material of the first and second light reflecting layers but also the change of Re and Rth of the λ/4 plate and the support can change the balance of transmittance of blue light, green light, and red light.

(Reflection Polarizer)

It is preferable that the reflection polarizer includes the first light reflecting layer, the second light reflecting layer, and the third light reflecting layer, in this order, from the λ/4 plate side.

In view of reducing the film thickness of the brightness enhancement film described above, the reflection polarizer preferably has only the first light reflecting layer, the second light reflecting layer, and the third light reflecting layer as a light reflecting layer formed by fixing a cholesteric liquid crystalline phase. That is, it is preferable not to have the light reflecting layer obtained by fixing other cholesteric liquid crystalline phases.

It is preferable that, among the first light reflecting layer, the second light reflecting layer, and the third light reflecting layer, any one is a blue light reflecting layer having a peak of reflectance in which a reflection center wavelength is 380 to 499 nm, another is a green light reflecting layer having a peak of a reflectance in which a reflection center wavelength is 500 to 599 nm, and another is a red light reflecting layer having a peak of a reflectance in which a reflection center wavelength is 600 to 750 nm.

It is preferable that the blue light reflecting layer has a peak of reflectance in which a reflection center wavelength is in a wavelength range of 380 to 499 nm.

The reflection center wavelength of the blue light reflecting layer is preferably in a wavelength range of 430 to 480 nm and more preferably in a wavelength range of 430 to 470 nm.

It is preferable that the blue light reflecting layer does not have a peak of reflectance in a wavelength range of 500 to 750 nm. It is preferable that, in the blue light reflecting layer, an average reflectance in a range of 500 to 750 nm is 5% or less.

An absolute value of Rth (550) of the blue light reflecting layer is preferably 50 to 300 nm and more preferably 80 to 270 nm.

The film thickness d of the blue light reflecting layer is preferably 0.5 to 3.0 μm and more preferably 1.0 to 2.6 μm.

It is preferable that the green light reflecting layer has a peak of reflectance in which a reflection center wavelength is in a wavelength range of 500 to 599 nm.

The reflection center wavelength of the green light reflecting layer is preferably in a wavelength range of 520 to 590 nm and more preferably in a wavelength range of 520 to 580 nm.

It is preferable that the green light reflecting layer does not have a peak of reflectance in a wavelength range of 380 to 499 nm and 600 to 750 nm. It is preferable that, in the green light reflecting layer, an average reflectance in ranges of 380 to 499 nm and 600 to 750 nm is 5% or less.

An absolute value of Rth (550) of the green light reflecting layer is preferably 70 to 350 nm and more preferably 100 to 330 nm.

The film thickness d of the green light reflecting layer is preferably 0.8 to 3.6 μm and more preferably 1.5 μm or greater and less than 3.3 μm.

It is preferable that the red light reflecting layer has a peak of reflectance in which a reflection center wavelength is in a wavelength range of 600 to 750 nm.

The reflection center wavelength of the red light reflecting layer is preferably in a wavelength range of 610 to 690 nm and more preferably in a wavelength range of 610 to 660 nm.

It is preferable that the red light reflecting layer does not have a peak of reflectance in a wavelength range of 380 to 499 nm and 500 to 599 nm. It is preferable that, in the red light reflecting layer, an average reflectance in ranges of 380 to 499 nm and 500 to 599 nm is 5% or less.

In the red light reflecting layer, the absolute value of Rth (550) is preferably 80 to 400 nm and more preferably 120 to 350 nm.

The film thickness d of the red light reflecting layer is preferably 1.0 to 4.0 μm and more preferably 1.5 to 3.5 μm.

In the first light reflecting layer, the second light reflecting layer, and the third light reflecting layer, a helical direction of a helical structure of each cholesteric liquid crystalline phase is not particularly limited, but it is preferable that the helical directions of the helical structures of the respective cholesteric liquid crystalline phases of the first light reflecting layer, the second light reflecting layer, and the third light reflecting layer are identical to each other. For example, it is preferable that, in the first light reflecting layer, the second light reflecting layer, and the third light reflecting layer, all of the cholesteric liquid crystalline phases have right helical structure, and all of the first light reflecting layer, the second light reflecting layer, and the third light reflecting layer reflect the right circularly polarized light in the reflection center wavelength. Naturally, it is preferable that, in the first light reflecting layer, the second light reflecting layer, and the third light reflecting layer, all of the cholesteric liquid crystalline phases have left helical structures, and all of the first light reflecting layer, the second light reflecting layer, and the third light reflecting layer reflect the left circularly polarized light in the reflection center wavelength.

The retardation Rth of a certain layer in the film thickness direction is defined as $$Rth=\{(nx+ny)/2-nz\}\times d$$

(in the above expression, nx represents a refractive index in a slow axis direction in the plane, ny represents a refractive index in a direction orthogonal to nx in the plane, and nz represents a refractive index in a direction orthogonal to nx and ny).

In a light reflecting layer formed by fixing a cholesteric liquid crystalline phase, in a case where an ordinary light refractive index no and an extraordinary light refractive index ne of the original liquid crystal are used, the average value of in-plane refractive indices is denoted by $$(nx+ny)/2=(no+ne)/2.$$

The refractive index in the film thickness direction is no, and thus, Rth of the light reflecting layer formed by fixing the cholesteric liquid crystalline phase is denoted by the following expression. In the brightness enhancement film of the present invention, the values calculated by using the following expression are adopted as the Rth of the first light reflecting layer, the second light reflecting layer, and the third light reflecting layer, and Rth of the first light reflecting layer, the second light reflecting layer, and the third light reflecting layer at the wavelength κ nm is referred to as Rth (λ).

$$Rth=\{(no+ne)/2-no\}\times d=\{(ne-no)/2\}\times d$$

ne and no are able to be measured by an Abbe's refractometer.

As the method of obtaining Rth of the cholesteric layer, a method of using polarized ellipso can be applied.

For example, as described in M. Kimura et al. Jpn. J. Appl. Phys. 48 (2009) 03B021, in a case where an ellipsometry measurement method is used, the thickness, the pitch, the twisted angle, and the like of the cholesteric layer can be obtained, and the value of Rth is able to be obtained therefrom.

With respect to a light having a wavelength other than the selective reflection wavelength (synonymous with the reflection center wavelength), the light reflecting layer obtained by fixing the cholesteric liquid crystalline phase using the rod-like cholesteric liquid crystal material as the cholesteric liquid crystal material substantially functions as a negative C-plate (among the three main refractive indices of the refractive index ellipsoid, in a case where the two main refractive indices in the plane are defined as Nx and Ny and one main refractive index in the normal direction is defined as Nz, Nx=Ny>Nz is satisfied) and thus is required to have a function of a positive C-plate (condition of Nz>Nx=Ny is satisfied), in order to compensate for this. Up to now, a method of providing a positive C-plate using a material other than cholesteric liquid crystal in order to compensate the light reflecting layer obtained by fixing a cholesteric liquid crystalline phase using the rod-like cholesteric liquid crystal material as a cholesteric liquid crystal material or a method of providing the function of the positive C-plate to the λ/4 plate by causing the λ/4 plate to be negative Rth has been proposed, but it has not been proposed to provide a positive C-plate as a portion of a layer obtained by fixing the cholesteric liquid crystalline phase used in the reflection polarizer. A method of causing a portion of a layer obtained by fixing the cholesteric liquid crystalline phase used for a reflection polarizer contributing to circularly polarized light reflection to be a light reflecting layer using the disk-like liquid crystal compound as a cholesteric liquid crystal material has not been proposed.

The cholesteric liquid crystal material of the third light reflecting layer may be a rod-like liquid crystal compound or may be a disk-like liquid crystal compound.

In superimposing the light reflecting layer obtained by fixing the cholesteric liquid crystalline phase, it is preferable to use a combination that reflects circularly polarized light in the same direction. As a result, the phase states of the circularly polarized light reflected by each layer can be aligned to prevent each wavelength range from having different polarization states, and thus light utilization efficiency can be improved.

The brightness enhancement film of the present invention preferably includes the first, second and third light reflecting layers which are liquid crystal films formed by polymerizing a mixture of a liquid crystal compound or the like which is a cholesteric liquid crystal material and obtained by fixing a cholesteric liquid crystalline phase.

The brightness enhancement film of the present invention preferably includes a support and may have a liquid crystal film obtained by fixing a cholesteric liquid crystalline phase, which is formed by polymerizing a mixture of a liquid crystal compound or the like which is a liquid crystal material on this support. However, in the present invention, a liquid crystal film obtained by fixing the cholesteric liquid crystalline phase may be formed by using the λ/4 plate itself included in the brightness enhancement film of the present invention as a support, and a liquid crystal film obtained by fixing the cholesteric liquid crystalline phase may be formed by using the entire λ/4 plate formed on the support as a support.

On the other hand, the brightness enhancement film of the present invention may not include a support for forming the first, second and third light reflecting layers, for example, the first, second, and third light reflecting layers are formed by using glass or a transparent film as the support in a case of forming the first, second, and third light reflecting layers, and only the first, second, and third light reflecting layers are peeled off from the support in a case of forming the layers, to be used in the brightness enhancement film of the present invention. In the case where the first, second, and third light reflecting layers are formed and only the first, second, and third light reflecting layers are peeled off from the support in a case of forming the layers, it is preferable to obtain the brightness enhancement film of the present invention by using a film in which the λ/4 plate and the adhesive layer (and/or the adhesive) are laminated and bonding the peeled first, second, and third light reflecting layers to the adhesive layer.

A film in which a λ/4 plate and a first light reflecting layer are formed in this order on a support and a film in which a third light reflecting layer and a second light reflecting layer are formed in this order on a support are bonded by providing an adhesive layer (and/or an adhesive) between the first light reflecting layer and the second light reflecting layer, so as to obtain the brightness enhancement film of the present invention. At this time, the support may or may not be peeled off after bonding.

The first, second, and third light reflecting layers used for the brightness enhancement film can be formed by forming a layer with a mixture of the liquid crystal compound and the like by a method such as coating. A liquid crystal layer is formed by coating the alignment layer with a mixture of a liquid crystal compound and the like so as to manufacture an optical anisotropy element.

The forming of the light reflecting layer obtained by fixing the cholesteric liquid crystalline phase can be performed by a suitable method such as a method of directly coating the polarizing plate, via a suitable alignment layer such as an oblique vapor deposition layer of polyimide, polyvinyl alcohol, or SiO2, if necessary, and a method of coating the support which does not change at the liquid crystal alignment temperature and which is formed of a transparent film and the like via an alignment layer, if necessary. A method of superimposing cholesteric liquid crystal layers via an alignment layer may be employed.

The coating with the mixture of a liquid crystal compound and the like can be performed by a method of developing the mixture caused to be in a solution state by using a solvent or the mixture caused to be a liquid material such as a melting liquid by heating by a suitable method such as a roll coating method or a gravure printing method, and a spin coating method. The liquid crystal molecules are fixed while maintaining the alignment state. It is preferable that the fixing is performed by a polymerization reaction of a polymerizable group introduced into liquid crystal molecules.

A thermal polymerization reaction using a thermal polymerization initiator and a photopolymerization reaction using a photopolymerization initiator are included in the polymerization reaction, and a photopolymerization reaction is preferable. It is preferable that an ultraviolet ray is used in light irradiation for polymerizing the liquid crystal molecules. The irradiation energy is preferably 20 mJ/cm$^2$ to 50 J/cm$^2$ and more preferably 100 to 800 mJ/cm$^2$. Since photopolymerization reaction is promoted, light irradiation may be performed under a heating condition. In view of selective reflectivity and prevention of alignment disturbance or decrease in transmittance, the thickness of the light reflecting layer obtained by fixing the cholesteric liquid crystalline phase to be formed is preferably 0.1 to 100 μm, more preferably 0.5 to 50 μm, particularly preferably 1 to 30 μm, and more particularly preferably 2 to 20 μm.

In a case where each light reflecting layer of the brightness enhancement film of the present invention is formed by coating, it is preferable that each of the light reflecting layers is formed by applying the coating liquid and drying the coating liquid in the well-known method. As a drying method, drying using heating is preferable.

An example of the method of manufacturing each of the light reflecting layers is a manufacturing method at least including:

(1) coating a surface such as a substrate with a polymerizable liquid crystal composition so as to obtain a state of a cholesteric liquid crystalline phase, and (2) irradiating the polymerizable liquid crystal composition with ultraviolet rays, progressing curing reaction, and fixing the cholesteric liquid crystalline phase, so as to form each light reflecting layer.

It is possible to manufacture a laminate of the light reflecting layer obtained by fixing the cholesteric liquid crystalline phase in which the number of laminated layers is increased by repeating the above steps of (1) and (2) twice on one surface of the substrate.

The direction of the revolution direction in the cholesteric liquid crystalline phase can be adjusted according to the types of the used liquid crystal and the types of the added chiral agent, and the helical pitch (that is, selective reflection wavelength) can be adjusted according to the concentration of these materials. It is known that the wavelength in a specific region that is reflected by each of the light reflecting layers can be shifted by the various causes of the manufacturing method and the wavelength can be shifted in the conditions of a temperature, luminance, an irradiation time, and the like, in a case of fixing the cholesteric liquid crystalline phase, in addition to the addition concentration of the chiral agent or the like.

The underlayer is preferably formed on the surface of a support such as a transparent plastic resin film by coating. The coating method at this point is not particularly limited, and well-known methods can be performed.

The alignment layer can be provided by means such as a rubbing treatment of an organic compound (preferably, a polymer), oblique vapor deposition of an inorganic compound, and formation of a layer having microgrooves. There is also known an alignment layer in which an orientation function is generated by application of an electric field, application of a magnetic field, or light irradiation. It is preferable that the alignment layer is formed by performing a rubbing treatment on the surface of the polymer film. The alignment layer is preferably peeled off together with the support.

Depending on the types of polymers used in the support, even in a case where an alignment layer is not provided, an alignment treatment (for example, a rubbing treatment) is directly performed on the support, so as to cause the support to function as the alignment layer. Examples of the support include polyethylene terephthalate (PET).

In a case where the liquid crystal layer is directly laminated on the liquid crystal layer, an underlayer liquid crystal layer functions as an alignment layer so as to align an upper layer liquid crystal, in some cases. In such cases, even in a case where the alignment layer is not provided, or even in a case where a special alignment treatment (for example, a rubbing treatment) is not performed, an upper layer liquid crystal may be aligned. Details of an aspect in which the underlayer liquid crystal layer functions as an alignment layer is described above as an aspect in which the underlayer of the first light reflecting layer is a λ/4 plate.

—Rubbing Treatment—

It is preferable that the surfaces of the alignment layer or the support are subjected to a rubbing treatment. The surface of the optically anisotropic layer can be subjected to a rubbing treatment, if necessary. In general, the rubbing treatment is able to be performed by rubbing the surface of a film containing a polymer as a main component with paper or cloth in a constant direction. A general method of the rubbing treatment, for example, is disclosed in "Liquid Crystal Handbook" (published by Maruzen Company, Limited, Oct. 30, 2000).

A method disclosed in "Liquid Crystal Handbook" (published by Maruzen Company, Limited) is able to be used as a method of changing a rubbing density. A rubbing density (L) is able to be quantified by Expression (D) described below.

$$L=Nl(1+2\pi rn/60v) \quad \text{Expression (D)}$$

In Expression (D), N represents the number of rubbing treatments, l represents a contact length of a rubbing roller, r represents the radius of the roller, n represents the rotation speed of the roller (revolutions per minute; rpm), and v represents a stage shifting speed (per second).

In order to increase the rubbing density, the number of rubbing treatments may increase, the contact length of the rubbing roller may increase, the radius of the roller may increase, the rotation speed of the roller may increase, and the stage shifting speed may decrease, and in order to decrease the rubbing density, these factors are adjusted vice versa. Conditions at the time of performing the rubbing treatment can be referred to conditions disclosed in JP4052558B.

In the step (1), first, the support or the substrate or the surface of the underlayer light reflecting layer is coated with the polymerizable liquid crystal composition. The polymerizable liquid crystal composition is preferably prepared by the coating liquid obtained by dissolving and/or dispersing materials in the solvent. The coating of the coating liquid is able to be performed by various methods such as a wire bar coating method, an extrusion coating method, a direct gravure coating method, a reverse gravure coating method, and a die coating method. The liquid crystal composition is ejected from a nozzle by using an ink jet device, and thus, a coating film is able to be formed.

The polymerizable liquid crystal composition which is applied to the surface and which became the coating film is caused to be in the state of the cholesteric liquid crystalline phase. For example, in an aspect in which the polymerizable liquid crystal composition is prepared as a coating liquid containing a solvent, a state of the cholesteric liquid crystalline phase can be obtained by drying the coating film and removing the solvent in some cases. In order to obtain the liquid crystalline phase transition temperature to the cholesteric liquid crystalline phase, the coating film may be heated, as desired. For example, first, the coating film is heated to a temperature of an isotropic phase, and then, is cooled to the cholesteric liquid crystalline phase transition temperature, and thus, it is possible to stably obtain the state of the cholesteric liquid crystalline phase. In view of manufacturing suitability or the like, the liquid crystalline phase transition temperature of the polymerizable liquid crystal composition is preferably in a range of 10° C. to 250° C. and is more preferably in a range of 10° C. to 150° C. In a case where the liquid crystalline phase transition temperature is 10° C. or higher, a cooling step or the like is not necessary in order to decrease the temperature to a temperature range at which a liquid crystalline phase is exhibited. In a case where the liquid crystalline phase transition temperature is 250° C. or lower, an isotropic liquid state in which the temperature is higher than the temperature range at which the liquid crystalline phase is exhibited is not needed, and thus a high temperature is not required. Therefore, it is advantageous in view of waste of thermal energy and deformation or modification of an underlayer such as a substrate.

Next, in the step (2), the coating film in the state of cholesteric liquid crystalline phase is irradiated with ultraviolet rays, and the curing reaction proceeds. For ultraviolet irradiation, a light source such as an ultraviolet lamp is used. In this step, the curing reaction of the polymerizable liquid crystal composition progresses by the irradiation with ultraviolet rays, such that the cholesteric liquid crystalline phase is fixed, so as to form the light reflecting layer.

There is no particular limitation on the irradiation energy amount of ultraviolet rays, but is preferably about 100 $mJ/cm^2$ to 800 $mJ/cm^2$ generally. The time for irradiating the coating film with ultraviolet rays is not particularly limited, but is determined in view of both sufficient strength and productivity of the cured film.

In order to promote curing reaction, ultraviolet irradiation under the heating condition may be performed. The temperature during ultraviolet irradiation is preferably maintained in the temperature range that exhibits the cholesteric liquid crystalline phase so that the cholesteric liquid crystalline phase is not collapsed. An oxygen concentration in the atmosphere is involved in a degree of polymerization, and does not reach a desired degree of polymerization in the air, and in a case where film hardness is insufficient, it is preferable to decrease the oxygen concentration in the atmosphere by a method such as nitrogen substitution. A preferred oxygen concentration is preferably less than or equal to 10%, is more preferably less than or equal to 7%, and is most preferably less than or equal to 3%. The reaction rate of the curing reaction (for example, a polymerization reaction) which is performed by the ultraviolet irradiation is preferably 70% or greater, is more preferably 80% or greater, and is particularly preferably 90% or greater in view of retaining the mechanical strength of a layer or suppressing the outflow of an unreacted substance from the layer. In order to improve the reaction rate, a method of increasing the irradiation dose of the ultraviolet ray to be emitted or polymerization under a nitrogen atmosphere or under heating conditions is effective. After the polymerization is performed, a method of maintaining the temperature at a temperature state higher than the polymerization temperature and further performing the reaction through a thermal polymerization reaction or a method of further performing irradiation with ultraviolet rays (however, performing irradiation under conditions satisfying the conditions of the present invention) can also be used. The reaction rate is able to be measured by comparing absorption intensities of infrared vibration spectra of a reactive group (for example, a polymerizable group) before and after the reaction.

In the above step, the cholesteric liquid crystalline phase is fixed, so as to form each light reflecting layer. Here, with respect to a state in which the liquid crystalline phase is "fixed", an aspect in which the alignment of the liquid crystal compound which is in the cholesteric liquid crystalline phase is maintained is the most typical and preferable. The state is not limited thereto and specifically indicates a state in which the fixed alignment shape can be stably and continuously maintained without fluidity in a layer or without a change in the shape of the alignment due to an apparent field or an external force, in a temperature range of generally 0° C. to 50° C. and in a temperature range of −30° C. to 70° C. under more rigorous conditions. According to the present invention, it is preferable that the alignment state of the cholesteric liquid crystalline phase is fixed by the curing reaction performed by ultraviolet ray irradiation.

According to the present invention, it is sufficient that optical properties of the cholesteric liquid crystalline phase are maintained in the layer, and the liquid crystal composition in each light reflecting layer no longer needs to exhibit liquid crystallinity. For example, the liquid crystal composition has a high molecular weight due to the curing reaction, and thus, the liquid crystallinity may not be exhibited anymore.

<Optical Sheet Member>

The brightness enhancement film of the present invention can be used as an optical sheet member.

It is preferable that the above optical sheet member has the brightness enhancement film of the present invention and a polarizing plate including a polarizer, an angle formed by the slow axis of the λ/4 plate and the absorption axis of the polarizer is 30° to 60°, and the polarizing plate, the λ/4 plate, and the reflection polarizer are directly in contact with each other in this order or laminated via an adhesive layer.

Figure 4:
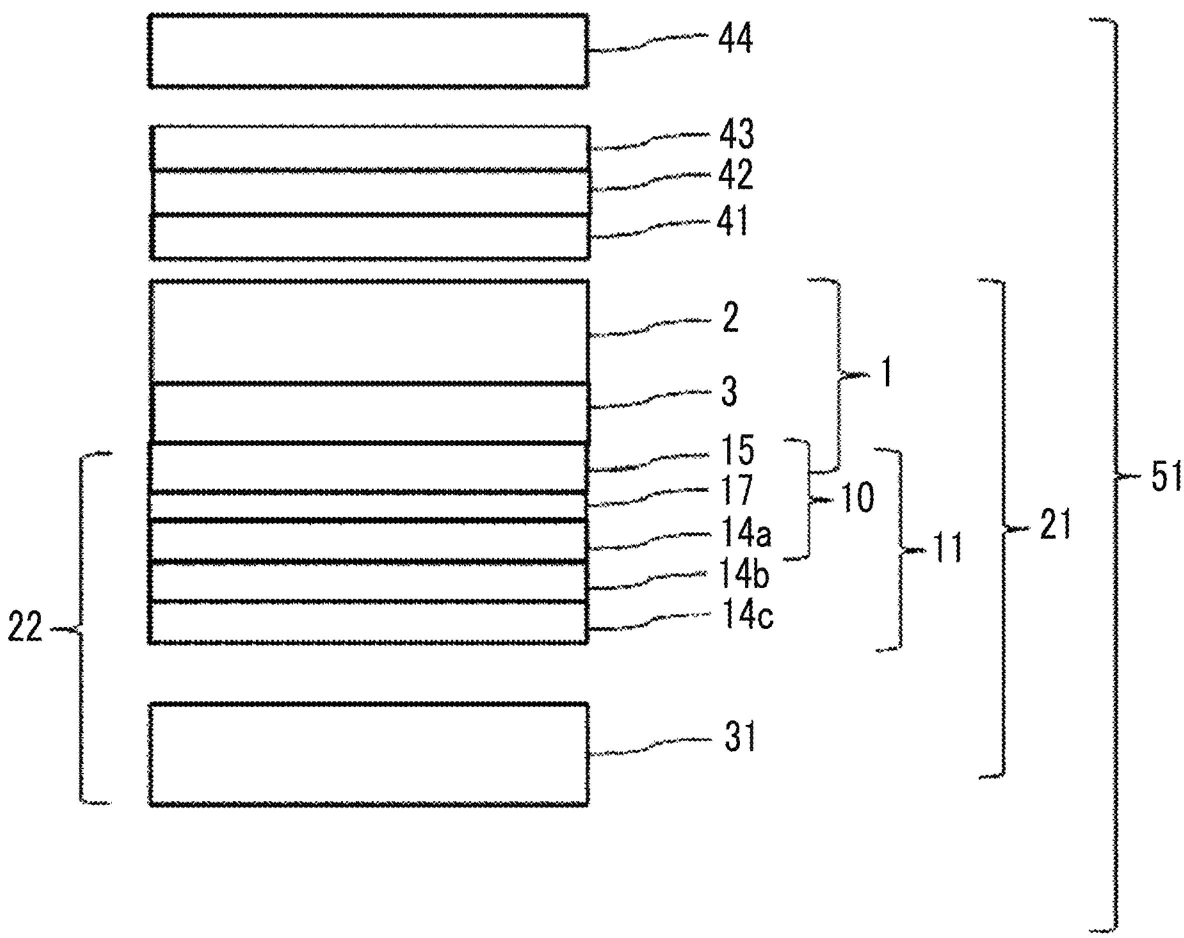
FIG. 4 is a schematic view illustrating a cross section in an example of a liquid crystal display device of the present invention.

FIG. 4 illustrates a schematic view of the optical sheet member as a portion of the liquid crystal display device of the present invention, together with a backlight unit 31. An optical sheet member 21 includes the brightness enhancement film 11 and the backlight-side polarizing plate 1 including a polarizer 3. The backlight-side polarizing plate 1 and the brightness enhancement film 11 may be laminated via an adhesive layer 20 (see FIG. 4), or may be disposed in a separated manner.

<Polarizing Plate>

Subsequently, a polarizing plate is described.

In the same manner as the polarizing plate used in the liquid crystal display device, the polarizing plate included in the optical sheet member preferably includes a polarizer and two polarizing plate protective films (hereinafter also referred to as protective films) disposed on both sides of the polarizer. In the present invention, it is preferable to use a phase difference film as a protective film disposed on the liquid crystal cell side among the two protective films.

In FIG. 4, the backlight-side polarizing plate 1 includes the polarizer 3. The backlight-side polarizing plate 1 preferably includes the polarizing plate protective film 2 that may be a phase difference film on the surface of the polarizer 3 on the viewer side. The backlight-side polarizing plate 1 may include a polarizing plate protective film (see the support 15 in FIG. 4) on the surface of the polarizer 3 on the backlight unit 31 side, but the polarizing plate protective film may not be included.

(Polarizer)

In the optical sheet member, it is preferable that an angle between the slow axis of the λ/4 plate and the absorption axis of the polarizer is 30° to 60°. A more preferable aspect and a preferable aspect in which the λ/4 plate is a laminate of the λ/2 plate and the λ/4 plate are described the explanation of the above λ/4 plate.

It is preferable that a polarizer in which iodine is adsorptively aligned on a polymer film is used as the polarizer described above. The polymer film is not particularly limited, but various kinds of polymer films are able to be used. Examples of the polymer film include a hydrophilic polymer film such as a polyvinyl alcohol-based film, a polyethylene terephthalate-based film, an ethylene-vinyl acetate copolymer-based film, a partially saponified film thereof, and a cellulose-based film, a polyene-based orientation film of a dehydration treatment product of polyvinyl alcohol or a dehydrochlorination treatment product of polyvinyl chloride, and the like. Among them, it is preferable that the polyvinyl alcohol-based film having excellent dyeability of iodine is used as the polarizer.

Polyvinyl alcohol or a derivative thereof is used as the material of the polyvinyl alcohol film. Examples of the derivative of the polyvinyl alcohol include polyvinyl formal, polyvinyl acetal, and the like, and olefin such as ethylene and propylene, an unsaturated carboxylic acid such as an acrylic acid, a methacrylic acid, and a crotonic acid, and alkyl ester thereof, and an acrylamide-modified derivative.

The degree of polymerization of the polymer which is the material of the polymer film described above is generally 500 to 10,000 is preferably in a range of 1,000 to 6,000, and is more is preferably in a range of 1,400 to 4,000. In a case of a saponification film, the degree of saponification, for example, is preferably 75 mol % or greater, is more preferably 98 mol % or greater, and is more preferably in a range of 98.3 mol % to 99.8 mol %, in view of the solubility with respect to water.

The polymer film (an un-stretched film) is preferably subjected to at least a monoaxial stretching treatment and an iodine dyeing treatment according to a normal method. A boric acid treatment and a washing treatment are able to be performed. The polymer film (a stretching film) which has been subjected to the treatment described above is subjected to a drying treatment and becomes the polarizer according to a normal method.

The thickness of the polarizer is not particularly limited, and is generally 5 μm to 80 μm, is preferably 5 μm to 50 μm, and is more preferably 5 μm to 25 μm.

As the optical properties of the polarizer, in a case where the single transmittance is measured with a single body of the polarizer, the single transmittance is preferably 43% or greater and more preferably in the range of 43.3 to 45.0%. It is preferable that orthogonal transmittance measured by preparing two polarizers described above, and by superposing the two polarizers such that an angle between the absorption axes of the two polarizers is 90° is small, and practically, the orthogonal transmittance is preferably greater than or equal to 0.00% and less than or equal to 0.050%, and is more preferably less than or equal to 0.030%. Practically, the degree of polarization is preferably 99.90% to 100%, and is more preferably 99.93% to 100%. Even in a case where the optical properties of the polarizing plate are measured, it is preferable that approximately the same optical properties as those described above are able to be obtained.

(Polarizing Plate Protective Film)

The optical sheet member may or may not have a polarizing plate protective film on an opposite side of the liquid crystal cell of the polarizer. In a case where the polarizing plate protective film is not disposed on an opposite side of the liquid crystal cell of the polarizer, the reflection polarizer may be directly disposed on the polarizer or may be disposed on the polarizer through the adhesive.

Among the protective films, a thermoplastic resin having excellent transparency, excellent mechanical strength, excellent heat stability, excellent moisture blocking properties, excellent isotropy, and the like is used as a protective film which is arranged on a side opposite to the liquid crystal cell. Specific examples of such a thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (a norbornene-based resin), a polyarylate resin, a polystyrene resin, a polyvinyl alcohol resin, and a mixture thereof.

The cellulose resin is preferably a cellulose ester-based resin which is an ester of cellulose and a fatty acid. Specific example of such a cellulose ester-based resin include triacetyl cellulose, diacetyl cellulose, tripropyl cellulose, dipropyl cellulose, and the like. Among them, the triacetyl cellulose is particularly preferable. Various products are commercially available as the triacetyl cellulose, and are advantageous from the viewpoint of easy obtainability and cost. Examples of a commercially available product of the triacetyl cellulose include "UV-50", "UV-80", "SH-80", "TD-80U", "TD-TAC", and "UZ-TAC" (Product Name), manufactured by Fujifilm Corporation, "KC Series" manufactured by Konica Minolta, Inc., and the like.

Examples of the cyclic polyolefin resin preferably include a norbornene-based resin. The cyclic olefin-based resin is a general term of a resin which is polymerized by using cyclic olefin as polymerization unit, and examples of the cyclic olefin-based resin include resins disclosed in JP1989-240517A (JP-H01-240517A), JP1991-14882A (JP-H03-14882A), JP1991-122137A (JP-H03-122137A), and the like. Specific examples of the cyclic olefin-based resin include a ring opening (co)polymer of cyclic olefin, an addition polymer of cyclic olefin, a copolymer of cyclic olefin and α-olefin such as ethylene and propylene (representatively, a random copolymer), and a graft polymer in which the polymers are modified by an unsaturated carboxylic acid or a derivative thereof, a hydride thereof, and the like. Specific examples of the cyclic olefin include a norbornene-based monomer.

Various products are commercially available as the cyclic polyolefin resin. Specific example of the cyclic polyolefin resin include "ZEONEX" and "ZEONOR" (Product Name) manufactured by Zeon Corporation, "ARTON" (Product Name) manufactured by JSR Corporation, "TOPAS" (Product Name) manufactured by TICONA GmbH, and "APEL" (Product Name) manufactured by Mitsui Chemicals, Inc.

As the (meth)acrylic resin, any appropriate (meth)acrylic resin can be employed as long as the effect of the present invention is not deteriorated. Examples of the (meth)acrylic resin include poly(meth)acrylic acid ester such as polymethyl methacrylate, a methyl methacrylate-(meth)acrylic acid copolymer, a methyl methacrylate-(meth)acrylic acid ester copolymer, a methyl methacrylate-acrylic acid ester-(meth)acrylic acid copolymer, a methyl (meth)acrylate-styrene copolymer, and a polymer having an alicyclic hydrocarbon group (for example, a methyl methacrylate-cyclohexyl methacrylate copolymer, a methyl methacrylate-norbornyl (meth)acrylate copolymer, and the like). Preferably, examples of the (meth)acrylic resin include poly(meth)acrylic acid alkyl having 1 to 6 carbon atoms such as polymethyl (meth)acrylate. More preferably, examples of the (meth)acrylic resin include a methyl methacrylate-based resin having methyl methacrylate as a main component (50 mass % to 100 mass %, and preferably 70 mass % to 100 mass %).

Specific examples of the (meth)acrylic resin include ACRYPET VH or ACRYPET VRL20A manufactured by Mitsubishi Rayon Co., Ltd, a (meth)acrylic resin disclosed in JP2004-70296A which has a ring structure in the molecules, and a (meth)acrylic resin having high Tg which is obtained by cross-linking in the molecules or a cyclization reaction in the molecules.

A (meth)acrylic resin having a lactone ring structure is able to be used as the (meth)acrylic resin. This is because the (meth)acrylic resin having a lactone ring structure has high heat resistance, high transparency, and high mechanical strength which is obtained by biaxially stretching.

The thickness of the protective film is able to be suitably set, and is generally approximately 1 to 80 μm from the viewpoint of workability such as strength or handling, thin layer properties, and the like. Particularly, 1 to 60 μm is preferable, and 5 to 40 μm is more preferable. The protective film is particularly suitable in case of 5 to 25 μm.

Re (λ) and Rth (λ) each represent retardation in the in-plane direction and retardation in a film thickness direction at a wavelength of λ. Re (λ) is measured by allowing light having a wavelength of λ nm to be incident in a film normal direction using KOBRA 21ADH or WR (manufactured by Oji Scientific Instruments). The measurement is able to be performed by manually replacing a wavelength selective filter or by converting a measured value with a program or the like in a case of selecting a measurement wavelength of λ nm. In a case where a film to be measured is denoted by a uniaxial index ellipsoid or a biaxial index ellipsoid, Rth (λ) is calculated by the following method. A portion of the measurement method is used in measurement of an average tilt angle of disk-like liquid crystal molecules on an alignment layer side in an optical anisotropic layer described below and an average tilt angle on a side opposite to the alignment layer side.

In Rth (λ), Re (λ) described above is measured at total 6 points by allowing the light having a wavelength of λ nm to be incident from directions respectively inclined in 10° step from a normal direction to 50° on one side with respect to the film normal direction in which an in-plane slow axis (determined by KOBRA 21ADH or WR) is used as a tilt axis (a rotational axis) (in a case where there is no slow axis, an arbitrary direction of a film plane is used as the rotational axis), and Rth (λ) is calculated by KOBRA 21ADH or WR on the basis of an assumed value of the measured retardation value and the average refractive index, and the input film thickness value. In the above description, in a case of a film having a direction in which a retardation value at a certain tilt angle is zero by using the in-plane slow axis as the rotational axis from the normal direction, a retardation value at an tilt angle greater than the tilt angle described above is changed to have a negative sign, and then, Rth (λ) is calculated by KOBRA 21ADH or WR. A retardation value is measured from two arbitrarily tilted directions by using the slow axis as the tilt axis (the rotational axis) (in a case where there is no slow axis, an arbitrary direction of the film plane is used as the rotational axis), and Rth is able to be calculated by Expressions (21) and (22) on the basis of an assumed value of the retardation value and the average refractive index, and the input film thickness value.

$$Re(\theta) = \left[ nx - \frac{ny \times nz}{\sqrt{\left\{ny \sin\left(\sin^{-1}\left(\frac{\sin(-\theta)}{nx}\right)\right)\right\}^2 + \left\{nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad \text{Expression (21)}$$

Re (θ) described above indicates a retardation value in a direction tilted by an angle of θ from the normal direction. In Expression (21), nx represents a refractive index in a slow axis direction in the plane, ny represents a refractive index in a direction orthogonal to nx in the plane, and nz represents a refractive index in a direction orthogonal to nx and ny. d represents a film thickness.

$$Rth = ((nx+ny)/2 - nz) \times d \quad \text{Expression (22)}$$

In a case where the film to be measured is a so-called film not having an optic axis which is not able to be denoted by a uniaxial index ellipsoid or a biaxial index ellipsoid, Rth (λ) is calculated by the following method. In Rth (λ), Re (λ) described above is measured at 11 points by allowing the light having a wavelength of λ nm to be incident from directions respectively tilted in 10° step from −50° to +50° with respect to the film normal direction in which the in-plane slow axis (determined by KOBRA 21ADH or WR) is used as the tilt axis (the rotational axis), and Rth (λ) is calculated by KOBRA 21ADH or WR on the basis of an assumed value of the measured retardation value and the average refractive index, and the input film thickness value. In the measurement described above, a catalog value of various kinds of optical films in a polymer handbook (JOHN WILEY&SONS, INC) is able to be used as the assumed value of the average refractive index. In a case where the value of the average refractive index is not known in advance, the value of the average refractive index is able to be measured by using an Abbe's refractometer. The value of the average refractive index of a main optical film will be exemplified as follows: cellulose acylate (1.48), a cycloolefin polymer (1.52), polycarbonate (1.59), polymethyl methacrylate (1.49), and polystyrene (1.59). The assumed values of the average refractive index and the film thickness are input, and thus, nx, ny, and nz are calculated by KOBRA 21ADH or WR. Nz=(nx−nz)/(nx−ny) is further calculated by the calculated nx, ny, and nz.

In this specification, "visible light" indicates light at a wavelength of 380 nm to 780 nm. In this specification, in a case where a measurement wavelength is not particularly described, the measurement wavelength is 550 nm.

In this specification, an angle (for example, an angle of "90°" or the like), and a relationship thereof (for example "orthogonal", "parallel", "to cross at 45°", and the like) include an error range which is allowable in the technical field belonging to the present invention. For example, the angle indicates a range of less than an exact angle ±10°, and an error with respect to the exact angle is preferably less than or equal to 5°, and is more preferably less than or equal to 3°.

In this specification, a "slow axis" of a phase difference film or the like means a direction in which a refractive index is maximized.

In this specification, numerical values, numerical ranges, and qualitative expressions (for example, "equivalent", "equal", and the like) indicating optical properties of each member such as phase difference region, a phase difference film, and a liquid crystal layer are interpreted as indicating numerical values, numerical ranges, and properties including error which is generally allowable in a liquid crystal display device and the members used therein.

In this specification, the expression "front" means the normal direction to the display surface, and the expression "front contrast" refers to contrast calculated from white brightness and black brightness measured in the normal direction of the display surface.

In the present invention, it is preferable that a layer (for example, a film with high retardation such as a stretched PET film) that disturbs the polarization state of the light reflected from the light reflecting layer is provided between the third light reflecting layer of the brightness enhancement film and the backlight unit, in view of improving the brightness. It is more preferable that a relationship between the average refractive index of the layer disturbing the polarization state of the light which is reflected from the light reflecting layer and the average refractive index of the third light reflecting layer satisfies the following expression.

0<Average refractive index of layer disturbing polarization state of light which is reflected from light reflecting layer−average refractive index of third light reflecting layer<0.2

It is preferable that the backlight unit further includes well-known diffusion plates, diffusion sheets, prism sheets (for example, Brightness Enhancement Film; BEF), and light guide devices. The other members are disclosed in JP3416302B, JP3363565B, JP4091978B, and JP3448626B, and the contents of the publications are incorporated to the present invention.

[Backlight Unit with Brightness Enhancement Film]

The backlight unit with a brightness enhancement film of the present invention includes the brightness enhancement film of the present invention and a backlight unit.

FIG. 4 illustrates the configuration of the backlight unit with a brightness enhancement film of the present invention, in the cross section in an example of the liquid crystal display device of the present invention. A backlight unit 22 with a brightness enhancement film of the present invention includes the brightness enhancement film 11 of the present invention and the backlight unit 31. The brightness enhancement film 11 and the backlight unit 31 of the present invention may be come into direct contact with each other, may be come into contact with each other via an adhesive layer, or may be in contact with each other with a space therebetween.

<Display Panel>

An example of a preferable display panel of the liquid crystal display device is a liquid crystal panel in a transmissive mode, and has a liquid crystal cell between a pair of polarizers. A phase difference film for view angle compensation is usually disposed between each of the polarizers and the liquid crystal cell. The configuration of the liquid crystal cell is not particularly limited, and a liquid crystal cell having a general configuration is able to be adopted. The liquid crystal cell, for example, includes a pair of substrates which are arranged to face each other, and a liquid crystal layer interposed between the pair of substrates, and as necessary, may include a color filter layer and the like. The driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensatory bend (OCB) cell mode are able to be used.

It is preferable that an embodiment of the liquid crystal display device has a configuration which has a liquid crystal cell in which a driving liquid crystal layer is interposed between facing substrates of which at least one includes an electrode, and the liquid crystal cell has a configuration of being arranged between two polarizing plates. The liquid crystal display device includes the liquid crystal cell in which a liquid crystal is sealed between upper and lower substrates, changes the alignment state of the liquid crystal by applying a voltage, and thus, displays an image. If necessary, the liquid crystal display device has an associated functional layer such as a polarizing plate protective film, an optical compensation member for performing optical compensation, and an adhesive layer. The liquid crystal display device of the present invention may include other members. A surface layer such as a forward scattering layer, a primer layer, an antistatic layer, and an undercoat layer along with (or instead of) a color filter substrate, a thin layer transistor substrate, a lens film, a diffusion sheet, a hard coat layer, an anti-reflection layer, a low reflection layer, and an antiglare layer may be disposed.

In FIG. 4, an example of the configuration of the liquid crystal display device of the present invention is illustrated. In FIG. 4, in a liquid crystal display device 51, the backlight unit 31, the optical sheet member 21 (a laminate of a reflection polarizer 13 and the backlight-side polarizing plate 1) of the present invention, a thin layer transistor substrate 41, a liquid crystal cell 42, a color filter substrate 43, and a display side polarizing plate 44 are laminated in this order.

The configuration of the optical sheet member 21 of the present invention is illustrated in FIG. 4 as a representative example, but the liquid crystal display device of the present invention may not be limited to this example.

<Method of Bonding Optical Sheet Member to Liquid Crystal Display Device>

A known method can be used as a method of bonding the brightness enhancement film of the present invention or the optical sheet member of the present invention to the liquid crystal display device. A roll to panel method can be used, and the roll to panel method is preferable from improving productivity and a yield. The roll to panel method is disclosed in JP2011-48381A, JP2009-175653A, JP4628488B, JP4729647B, WO2012/014602A, WO2012/014571A, and the like, but is not limited thereto.

EXAMPLES

Hereinafter, the present invention is specifically described with reference to examples and comparative examples. A material, an amount used, a treatment detail, a treatment order, and the like provided in the following examples can be suitably changed without departing from the gist of the present invention. The scope of the present invention should not be construed in a limited manner by the specific examples.

Example 1

TD40UL manufactured by Fujifilm Corporation was used as a support, a saponification treatment and the formation of an alignment film were performed, and a rubbing treatment was performed. Details of preparation of the support and formation of the alignment film are described below.

<Preparation of Support>

(Alkali Saponification Treatment)

A cellulose acylate film T1 ("TD40UL" (manufactured by Fujifilm Corporation)) was passed through a dielectric type heating roll at a temperature of 60° C., the film surface temperature was raised to 40° C., and then one surface of the film was coated with an alkaline solution having the following composition at a coating amount of 14 ml/m$^2$ by using a bar coater and heated to 110° C. Transportation was performed for 10 seconds under a steam type far infrared heater manufactured by Noritake Co., Limited. Subsequently, pure water was applied at 3 ml/m$^2$ by using a bar coater. Then, washing with water using a fountain coater and dewatering using an air knife were repeated three times, and then transportation was performed to a drying zone at 70° C. for 10 seconds for drying, so as to obtain an alkali saponification treated cellulose acylate film.

(Alkaline Solution Composition)

| | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

<Forming of Alignment Film>

A long saponification treated cellulose acetate film as described above was continuously coated with an alignment film coating liquid having the following composition by a #14 wire bar. The solution was dried with hot air at 60° C. for 60 seconds and was further dried with hot air at 100° C. for 120 seconds, so as to obtain a coating film having a film thickness of 0.5 μm. The obtained coating film was continuously subjected to a rubbing treatment.

(Composition of Alignment Film Coating Liquid)

| | |
|---|---|
| Modified polyvinyl alcohol described below | 2.00 parts by mass |
| Water | 74.08 parts by mass |
| Methanol | 23.76 parts by mass |
| Glutaraldehyde | 0.10 parts by mass |
| Photopolymerization initiator (IRGACURE 2959, manufactured by BASF SE) | 0.06 parts by mass |

(In the structural formula below, the ratio is a molecular ratio)

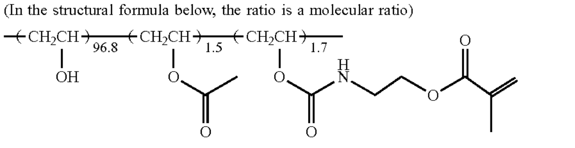

Modified Polyvinyl Alcohol

<Forming of λ/4 Plate>

Subsequently, a coating liquid of a liquid crystal composition 1 including a disk-like liquid crystal compound having the following composition was continuously coated on the rubbed alignment film with a wire bar of #2.8 to prepare λ/4 plate. In order to dry the solvent of the coating liquid and to perform alignment ripening on the disk-like liquid crystal compound, heating was performed for 90 seconds with warm air at 130° C. Subsequently, UV irradiation was performed at 80° C., the alignment of the liquid crystal compound was fixed, and an optically anisotropic layer which was a portion of the λ/4 plate was formed. Thereafter, irradiation was performed with UV illuminance at 50 mW for 6 seconds under a nitrogen atmosphere (UV irradiation dose was 300 mJ).

(Coating Liquid of Liquid Crystal Composition 1 Including Disk-Like Liquid Crystal Compound)

| | |
|---|---|
| Disk-like liquid crystal compound D1 (Structure described below) | 26.3 parts by mass |
| Disk-like liquid crystal compound D2 (Structure described below) | 6.6 parts by mass |
| Alignment aid 1 (Structure described below) | 0.3 parts by mass |
| Alignment aid 2 (Structure described below) | 0.03 parts by mass |
| MEGAFACE F444 manufactured by DIC Corporation | 0.05 parts by mass |
| Photopolymerization initiator (IRGACURE 907; manufactured by BASF SE) | 1.0 parts by mass |
| Methyl ethyl ketone | 48.5 parts by mass |
| t-Butanol | 8.6 parts by mass |
| Cyclohexanone | 8.6 parts by mass |

Disk-like liquid crystal compound D1

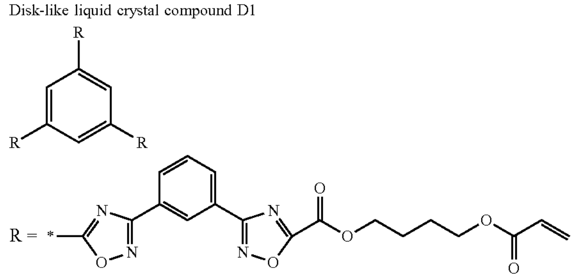

Disk-like liquid crystal compound D2

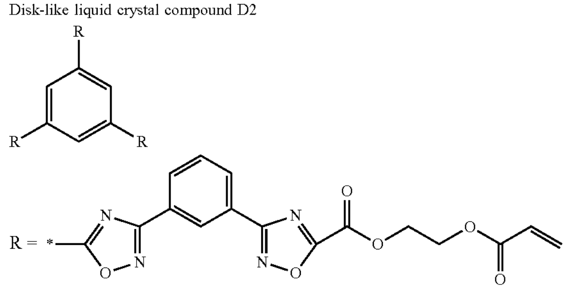

Alignment aid 1

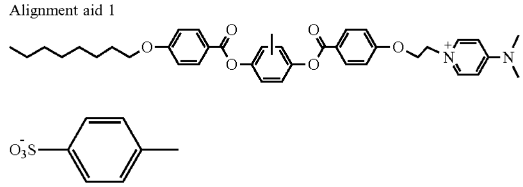

Alignment aid 2

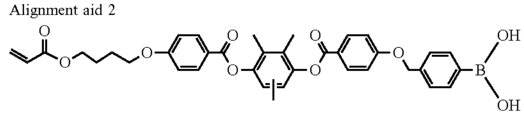

<Forming of Cholesteric Layer>

A disk-like liquid crystal composition 2 provided below was prepared as a liquid crystal composition exhibiting a cholesteric liquid crystalline phase of a disk-like liquid crystal compound.

(Disk-Like Liquid Crystal Composition 2)

| | |
|---|---|
| Disk-like liquid crystal compound D1 (Structure described above) | 24.3 parts by mass |
| Disk-like liquid crystal compound D2 (Structure described above) | 5.8 parts by mass |
| Chiral agent C1 (Structure described below) | 1.1 parts by mass |
| Polymerizable compound P1 (Structure described below) | 2.9 parts by mass |

-continued

| | |
|---|---|
| Photopolymerization initiator (IRGACURE 907; manufacture by BASF SE) | 0.6 parts by mass |
| Photopolymerization initiator (KAYACURE DETX-S; manufactured by Nippon Kayaku Co.; Ltd.) | 0.2 parts by mass |
| Surfactant S1 (Structure described below) | 0.01 parts by mass |
| Methyl ethyl ketone | 56.1 parts by mass |
| Cyclohexane | 9.9 parts by mass |

Chiral agent C1

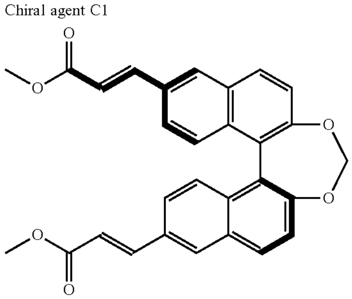

Polymerizable compound P1

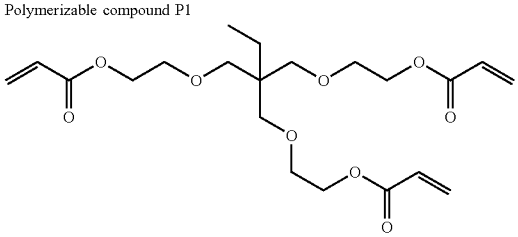

Surfactant S1

59/41 (Mass ratio), Weight-average molecular weight 2,200

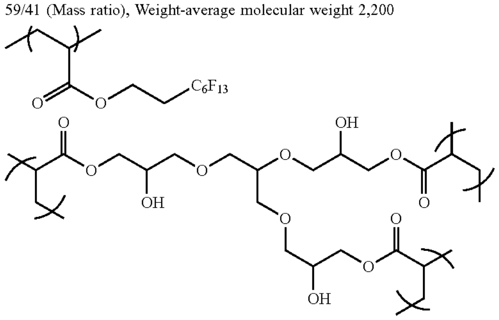

(Coating Step)

The disk-like liquid crystal composition 2 was continuously coated on a λ/4 plate used as an underlayer with a #14 wire bar to form a coating film of a disk-like liquid crystal composition having a dry film thickness of 5.5 μm.

(Alignment Step)

Subsequently, the coating film was heated at a film surface temperature of 97° C. for 90 seconds to subject to a treatment of aligning the disk-like liquid crystal composition to a cholesteric liquid crystalline phase.

(Step of Forming Different Helical Pitches in Layer)

Thereafter, the coating film cooled to 50° C. was irradiated with ultraviolet light at 20 $mW/cm^2$ for 20 seconds via a 405 nm band pass filter while the coating film was heated at 50° C. in an air atmosphere using an ultraviolet irradiation device of a high pressure mercury lamp light source.

The coating film irradiated with ultraviolet rays was heated at a film surface temperature of 60° C. for 30 seconds.

(Step of Fixing Cholesteric Liquid Crystalline Phase)

Thereafter, the coating film was cured by being irradiated with ultraviolet light at 20 $mW/cm^2$ for 15 seconds while the coating film was heated at 50° C. in a nitrogen atmosphere, and the cholesteric liquid crystalline phase was fixed, so as to obtain the cholesteric layer of the disk-like liquid crystal composition including the disk-like liquid crystal compound.

The laminate having the support, the alignment film, the λ/4 plate, and the cholesteric layer in this order, which is obtained in this manner was obtained as an optical film of Example 1. The fact that the optical film of Example 1 has a cholesteric layer having a film thickness of 5.52 jam was checked by cross-sectional analysis described below.

<Evaluation of Optical Film>

(Measuring of Reflection Bandwidth)

The transmission spectrum of the optical film of Example 1 was measured in the range of 400 nm to 800 nm using AxoScan manufactured by Axometrics Inc. The average value of the transmittance was 0.9 in the wavelength range not exhibiting the selective reflection due to the cholesteric layer, and the average value of the transmittance was 0.5 in the wavelength range exhibiting the selective reflection due to the cholesteric layer. An average value Ix of the average value of the transmittance in the wavelength not exhibiting the selective reflection due to the cholesteric layer and the average value of the transmittance in a region exhibiting the selective reflection due to the cholesteric layer was calculated as the transmittance of 0.7. Wavelengths of two points having transmittance in which the average value Ix=0.7 were read and the difference was calculated as the reflection bandwidth.

The obtained results are presented in Table 1 below.

(Measuring of Cross Section Analysis and Fluctuation of Helical Pitch)

Figure 6:
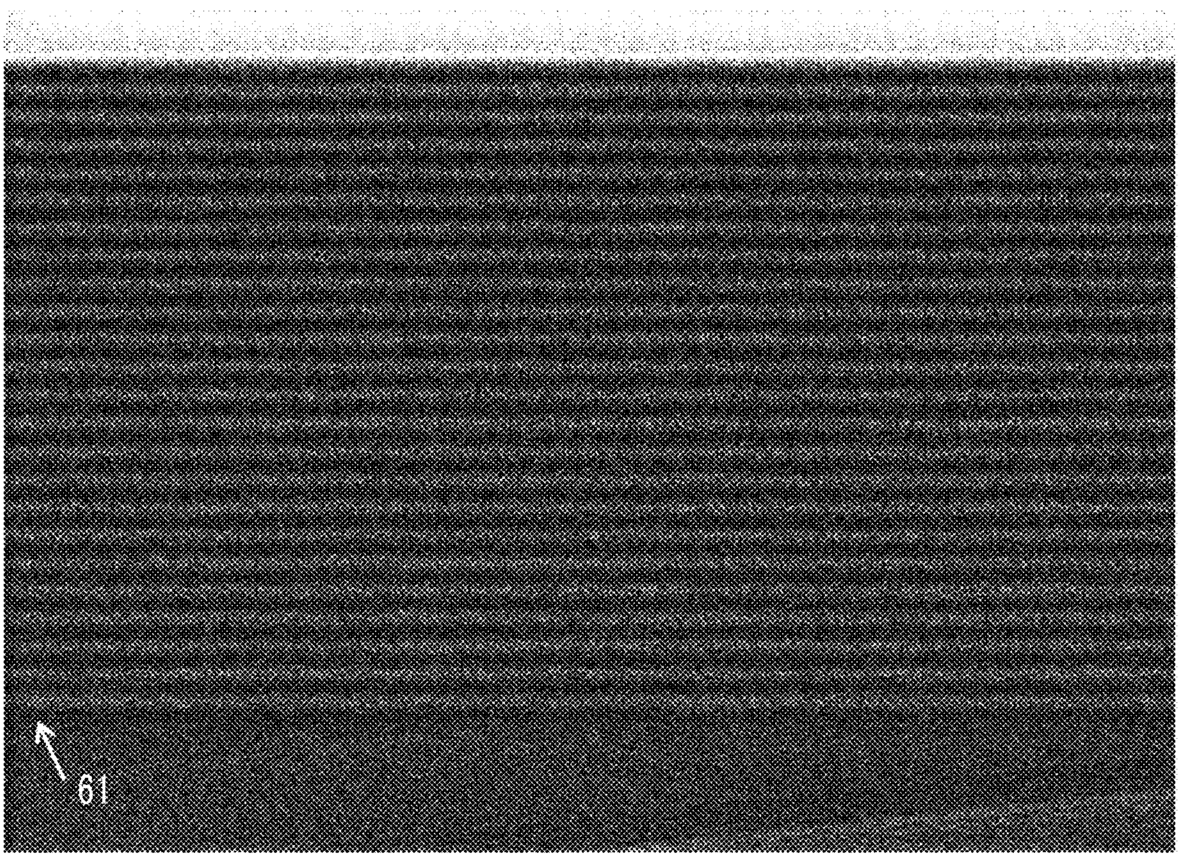
FIG. 6 is a cross section image using a TEM of a cholesteric layer of an optical film of Comparative Example 1.

A cross-sectional analysis of the cholesteric layer of the optical film of Example 1 was conducted using a transmission electron microscope (TEM). Specifically, the helical pitch of the cholesteric layer was dyed with osmic acid in the state of the optical film of Example 1, so as to obtain a cross section image by TEM (position in which the helical structure rotates 360°, strictly speaking, since one helical pitch is black-white-black-white in the cross-sectional image using TEM, the difference in dyeing can be seen every 180°). FIG. 5 illustrates a cross section image using the TEM of the cholesteric layer of the optical film of Example 1. FIG. 5 and FIG. 6 described below illustrate a surface 61 of cholesteric layer on support side.

Light and dark information of the cross section image using the obtained TEM was numerically converted into the length of the helical structure (white-black) by image analysis with image analysis software (imageJ 1.50a), so as to calculate the length of the half pitch of the helical pitch in the film thickness direction of the cholesteric layer. The minimum value Pmin of the half pitch of the helical pitch in the film thickness direction of the cholesteric layer and the maximum value Pmax of the half pitch of the helical pitch were used, and the maximum value of the fluctuation of the helical pitch in the film thickness direction of the cholesteric layer was calculated by the following expression. The obtained results are presented in Table 1 below.

$$\text{Maximum value (\%) of fluctuation of helical pitch in film thickness direction of cholesteric layer} = 100\% \times (P\text{max} - P\text{min})/P\text{min}$$

Figure 7:
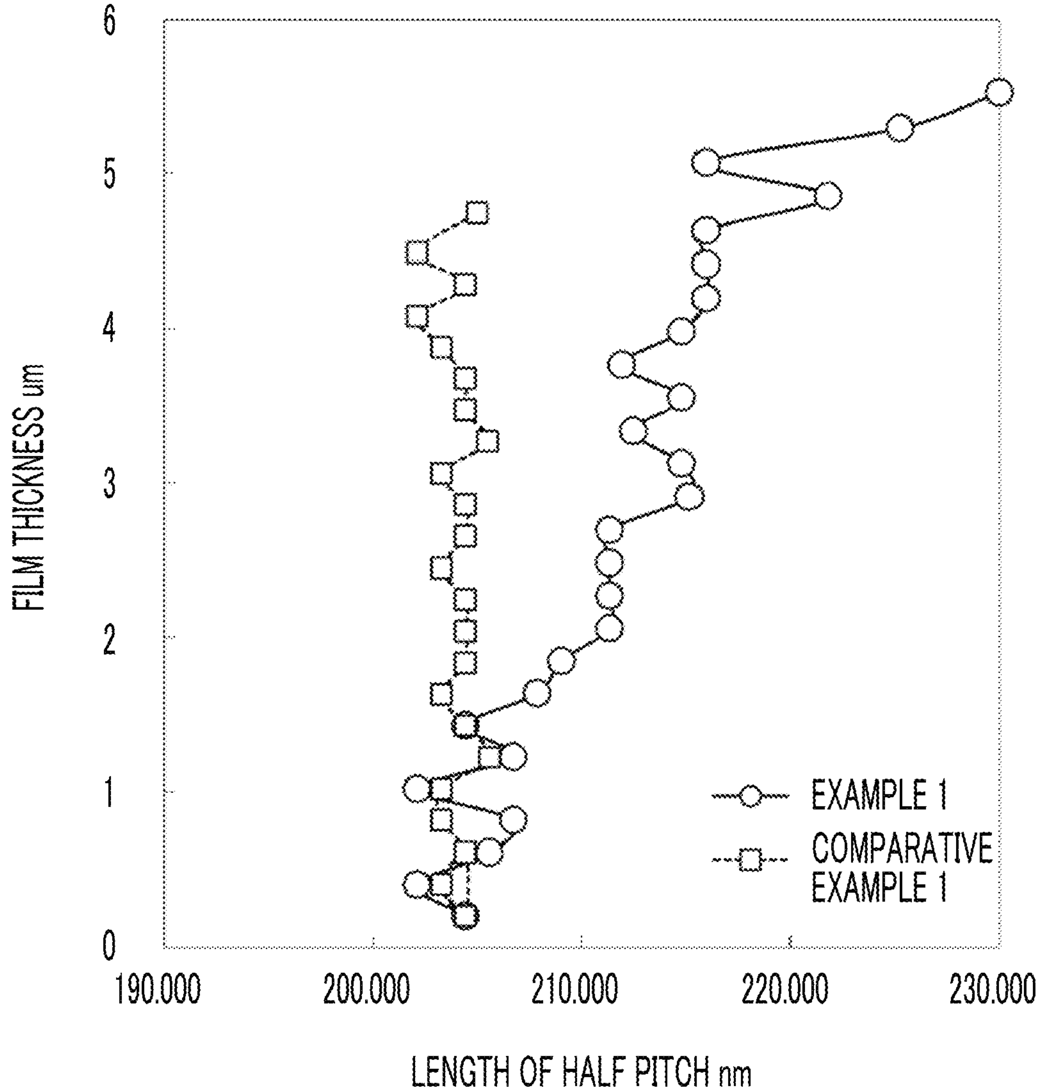
FIG. 7 is a graph presenting relationships of lengths of half pitches and film thicknesses of cholesteric layers of optical films of Example 1 and Comparative Example 1 prepared by performing image analysis on light and dark information of cross section images of the optical films of Example 1 and Comparative Example 1 using a TEM by using image analysis software.

A graph prepared by performing image analysis on the light and dark information of the cross section image using the TEM of the optical film of Example 1 using image analysis software was illustrated in FIG. 7 together with the result of the optical film of Comparative Example 1 described below.

It was checked that the cholesteric layer was a uniform film having an interface only on the surface of the layer from the sectional image using TEM.

(Measuring of Oblique Retardation in Film Thickness Direction)

The oblique retardation in the film thickness direction was measured by the following method by using AxoScan manufactured by Axometrics Inc. The obtained optical film of Example 1 was set to AxoScan at an angle of 50°, and retardation and a reflection spectrum were measured in the range of 400 nm to 800 nm. The average value R1 of the retardation values in the range excluding the region where the reflection spectrum exhibits the reflection wavelength from the obtained retardation was obtained. Subsequently, the λ/4 plate used in Example 1 was set to AxoScan at an angle of 50°, and the retardation was measured in the same manner. The average value R2 of the retardation in the range excluding the region exhibiting the reflection wavelength of R1 was obtained, and the value of R1-R2 was taken as the value of the oblique retardation in the film thickness direction.

The obtained results are presented in Table 1 below.

Examples 2 to 5

Optical films of Examples 2 to 5 were prepared in the same manner as in Example 1 except for changing the conditions of the step of forming different helical pitches in the layer as presented in Table 1 below. The reflection bandwidth of the cholesteric layer of the manufactured optical films of Examples 2 to 5, the maximum value of the fluctuation of the helical pitch, and the oblique retardation in the film thickness direction were evaluated in the same manner as in Example 1. The obtained results are presented in Table 1.

Comparative Example 1

In the same manner as in Example 1, the disk-like liquid crystal composition 2 was continuously coated on the λ/4 plate used as an underlayer with a #14 wire bar so as to form a coating film.

Subsequently, a treatment of heating the coating film at 97° C. for 90 seconds to align the disk-like liquid crystal composition to a cholesteric liquid crystalline phase was performed.

Thereafter, the coating film cooled to 50° C. was irradiated with ultraviolet light for 15 seconds at 20 mW/cm$^2$ in a nitrogen atmosphere without forming the step of forming different helical pitches in the layer such that the coating film was cured, and the cholesteric liquid crystalline phase was fixed so as to obtain a cholesteric layer of the disk-like liquid crystal composition of the disk-like liquid crystal compound.

The laminate having the support, the alignment film, the λ/4 plate, and the cholesteric layer in this order, which is obtained in this manner was used as the optical film of Comparative Example 1.

The reflection bandwidth of the cholesteric layer of the manufactured optical film of Comparative Example 1, the maximum value of the fluctuation of the helical pitch, and the oblique retardation in the film thickness direction were evaluated in the same manner as in Example 1. The obtained results are presented in Table 1.

FIG. 6 illustrates a cross section image using the TEM of the cholesteric layer of the optical film of Comparative Example 1.

Comparative Example 2

A rod-like liquid crystal composition 3 provided below was prepared as a liquid crystal composition exhibiting a cholesteric liquid crystalline phase of a rod-like liquid crystal compound.

| | |
|---|---|
| Rod-like liquid crystal compound L1 (Structure described below) | 27.43 parts by mass |
| Chiral agent LC-756 (manufactured by BASF SE) | 1.14 parts by mass |
| IRGACURE 184 (manufactured by BASF SE) | 1.43 parts by mass |
| Cyclopentanone | 70.0 parts by mass |

Rod-like liquid crystal compound L1

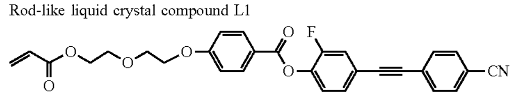

The stretched polyethylene terephthalate substrate was continuously coated with the rod-like liquid crystal composition 3 by using a #13 wire bar to form a coating film. The coating film was then heated at 100° C. for two minutes.

Thereafter, while heating at 120° C., the coating film was irradiated with ultraviolet rays for 300 seconds at 3 mW/cm$^2$ under a nitrogen atmosphere by using an ultraviolet irradiation device to obtain a cholesteric layer of a rod-like liquid crystal compound. The obtained laminate was used as the optical film of Comparative Example 2.

The reflection bandwidth of the cholesteric layer of the manufactured optical film of Comparative Example 2, the maximum value of the fluctuation of the helical pitch, and the oblique retardation in the film thickness direction were evaluated in the same manner as in Example 1. The obtained results are presented in Table 1.

TABLE 1

| | | Example 1 | Example 2 | Example 3 | Example 4 | Example 5 | Comparative Example 1 | Comparative Example 2 |
|---|---|---|---|---|---|---|---|---|
| Kinds of liquid crystal compound | | Disk-like | Disk-like | Disk-like | Disk-like | Disk-like | Disk-like | Rod-like |
| Reflection bandwidth (nm) | | 134 | 96 | 129 | 108 | 100 | 65 | 220 |
| Maximum value of fluctuation of helical pitch (%) | | 13.8 | 6.3 | 12.8 | 8.7 | 7.1 | 1.7 | 12.9 |
| Oblique retardation in film thickness direction (nm) | | −38 | −43 | −45 | −40 | −39 | −37 | 160 |
| Step of forming different helical pitches in layer | Ultraviolet illuminance (mW/cm$^2$) | 20 | 20 | 20 | 20 | 20 | — | 3 |
| | Temperature during ultraviolet irradiation (° C.) | 50 | 50 | 60 | 55 | 50 | — | 120 |
| | Ultraviolet irradiation time (second) | 20 | 180 | 300 | 150 | 150 | — | 300 |

TABLE 1-continued

| | | Example 1 | Example 2 | Example 3 | Example 4 | Example 5 | Comparative Example 1 | Comparative Example 2 |
|---|---|---|---|---|---|---|---|---|
| | Filter (nm)* | 405 | 405 | 405 | 405 | 405 | — | — |
| | Ultraviolet irradiation atmosphere | Atmosphere | Atmosphere | Atmosphere | Atmosphere | Atmosphere | — | Nitrogen |
| | Heating temperature after ultraviolet irradiation (° C.) | 60 | 80 | — | 80 | 80 | — | — |
| | Heating time after ultraviolet irradiation (second) | 30 | 30 | — | 30 | 30 | — | — |
| Step of fixing cholesteric liquid crystalline phase | Ultraviolet illuminance (mW/cm$^2$) | 20 | 20 | 20 | 20 | 20 | 20 | — |
| | Ultraviolet irradiation temperature (° C.) | 50 | 50 | 50 | 50 | 50 | 50 | — |
| | Ultraviolet irradiation time (second) | 15 | 15 | 15 | 15 | 15 | 15 | — |
| | Ultraviolet irradiation atmosphere | Nitrogen | Nitrogen | Nitrogen | Nitrogen | Nitrogen | Nitrogen | — |

*Ultraviolet irradiation via bandpass filter

From Table 1, it was found that, in a case where the optical film of the present invention had a cholesteric liquid crystalline phase of the disk-like liquid crystal compound and had a region in which the helical pitch in the film thickness direction of the cholesteric layer differs by 2% or more, a wide reflection bandwidth was able to be realized.

In Comparative Example 2, a cholesteric layer of a rod-like liquid crystal composition including a rod-like liquid crystal compound was reviewed.

In Table 2, the results of analyzing the length of the half pitch in the helical pitch in the film thickness direction of the cholesteric layers of the optical films of Comparative Example 1 and Example 1 are presented. In Examples 2 to 5, as in Example 1, there was a region in which the helical pitch differs by 2% or more.

With respect to the numerical value of the film thickness, the smaller value side is the support side.

TABLE 2

| Comparative Example 1 | | Example 1 | |
|---|---|---|---|
| Film thickness [μm] | Half-pitch [μm] | Film thickness [μm] | Half-pitch [μm] |
| 4.740 | 205.000 | 5.520 | 230.000 |
| 4.487 | 202.125 | 5.290 | 225.225 |
| 4.285 | 204.435 | 5.064 | 215.985 |
| 4.081 | 202.125 | 4.848 | 221.760 |
| 3.878 | 203.280 | 4.627 | 215.985 |
| 3.675 | 204.435 | 4.411 | 215.985 |
| 3.471 | 204.435 | 4.195 | 215.985 |
| 3.266 | 205.490 | 3.979 | 214.830 |
| 3.061 | 203.280 | 3.764 | 211.965 |
| 2.857 | 204.435 | 3.552 | 214.830 |
| 2.653 | 204.435 | 3.337 | 212.520 |
| 2.449 | 203.280 | 3.125 | 214.830 |
| 2.245 | 204.435 | 2.910 | 215.185 |
| 2.041 | 204.435 | 2.695 | 211.365 |
| 1.836 | 204.435 | 2.483 | 211.365 |
| 1.632 | 203.280 | 2.272 | 211.365 |
| 1.429 | 204.435 | 2.061 | 211.365 |
| 1.224 | 205.590 | 1.849 | 209.055 |
| 1.019 | 203.280 | 1.640 | 207.900 |
| 0.815 | 203.280 | 1.432 | 204.435 |
| 0.612 | 204.435 | 1.228 | 206.745 |
| 0.408 | 203.280 | 1.021 | 202.125 |
| 0.204 | 204.435 | 0.819 | 206.745 |
| 0.612 | 204.435 | 0.612 | 205.590 |

TABLE 2-continued

| Comparative Example 1 | | Example 1 | |
|---|---|---|---|
| Film thickness [μm] | Half-pitch [μm] | Film thickness [μm] | Half-pitch [μm] |
| 0.408 | 203.280 | 0.407 | 202.125 |
| 0.204 | 204.435 | 0.204 | 204.435 |

Example 101

<Manufacturing of Brightness Enhancement Film>

With respect to the cholesteric liquid crystalline mixture (R1) using the rod-like liquid crystal compound used in Comparative Example 2, a cholesteric liquid crystalline mixture (R2) obtained by adjusting the amounts of the chiral agent and the rod-like liquid crystal compound so that the reflection center wavelength was 530 nm was prepared. Thereafter, a light reflecting layer obtained by fixing a cholesteric liquid crystalline phase using the rod-like liquid crystal compound was prepared. The PET film (thickness 75 μm) manufactured by Fujifilm Corporation was rubbed, the following cholesteric liquid crystalline mixture (R2) was coated on the rubbing surface of the PET film, was heated at 85° C. for 1 minute, and was exposed at 45° C., so as to obtain a third light reflecting layer. The direction of the rubbing treatment was parallel to the longitudinal direction of the film.

With respect to the cholesteric liquid crystalline mixture (R1) using the rod-like liquid crystal compound used in Comparative Example 2, a cholesteric liquid crystalline mixture (R3) obtained by adjusting the amounts of the chiral agent and the rod-like liquid crystal compound so that the reflection center wavelength was 450 nm was prepared. On the third light reflecting layer, a cholesteric liquid crystalline mixture (R3) obtained by adjusting a reflection center wavelength to be 460 nm was coated, was heated at 85° C. for 1 minute, and was exposed at 45° C., to form a second light reflecting layer, so as to obtain a laminate of a PET film, a third light reflecting layer, and a second light reflecting layer.

The reflection center wavelength of the peak of the maximum reflectance of the obtained third light reflecting layer was 550 nm, the full width at half maximum was 40 nm, and the film thickness was 2.2 μm.

The reflection center wavelength of the peak of the maximum reflectance of the obtained second light reflecting layer was 460 nm, the full width at half maximum was 40 nm, and the film thickness was 1.8 μm.

The second light reflecting layer side of the obtained laminate of the PET film, the third light reflecting layer, and the second light reflecting layer and the interface on the cholesteric layer side of the optical film of Example 1 were bonded to each other by using a pressure sensitive adhesive material such that the second light reflecting layer side and the interface were adhered. Thereafter, the PET film used for forming the third light reflecting layer was peeled off.

The thickness of the portion of the brightness enhancement film 1 having the support including the obtained cellulose acylate film T1, the alignment film, the λ/4 plate (and underlayer), the cholesteric layer (first light reflecting layer), the pressure sensitive adhesive material, the second light reflecting layer, and the third light reflecting layer in this order, excluding the support including the cellulose acylate film T1 was 7.4 μm. The brightness enhancement film 1 obtained in this manner was used as the brightness enhancement film of Example 101.

<Manufacturing of Backlight Unit with a Brightness Enhancement Film and Liquid Crystal Display Device>

A commercially available liquid crystal display device (manufactured by SONY Corporation, trade name KDL46W900A) was decomposed, and a commercially available brightness enhancement film used as a brightness enhancement film was changed to the brightness enhancement film 1 of Example 101 (including the support formed of the cellulose acylate 1), so as to manufacture the backlight unit with the brightness enhancement film of Example 101 and the liquid crystal display device.

Examples 102 to 105

In Example 101, brightness enhancement films of Examples 102 to 105 were prepared in the same manner as in Example 101 except for changing the optical film of Example 1 to the optical films of Examples 2 to 5, respectively.

Similarly, in Example 101, the backlight units with brightness enhancement films and liquid crystal display devices of Examples 102 to 105 were manufactured in the same manner as in Example 101 except for using the brightness enhancement films of Examples 102 to 105 instead of the brightness enhancement film 1.

Comparative Examples 111 to 112

In Example 101, brightness enhancement films of Comparative Examples 111 to 112 were prepared in the same manner as in Example 101 except for changing the optical film of Example 1 to the optical films of Comparative Examples 1 and 2, respectively.

[Evaluation]

<Evaluation of Oblique Tint Change>

An oblique tint change Δu'v' of the liquid crystal display device was evaluated by the following method. A shade color difference Δu'v' obtained by a difference between the values of shade coordinates u' and v' in a front surface (a polar angle of 0 degrees) and a direction at a polar angle of 60 degrees was measured in a direction of an azimuthal angle of 0 degrees to 360 degrees, and the average value thereof was set to an evaluation index of the oblique tint change Δu'v'. The shade coordinates u'v' were measured by using a measurement machine (EZ-Contrast 160D, manufactured by ELDIM Corporation).

In Examples 101 to 105, Δu'v'<0.09 was satisfied in all cases, and in Comparative Examples 111 and 112, this value exceeded 1.10, clear difference between examples and comparative examples was seen, and all of the examples exhibited satisfactory results.

<Evaluation of Durability>

The durability of the liquid crystal display device was evaluated. With respect to the durability, the liquid crystal display device using each brightness enhancement film was continuously used in a state of being irradiated with light for 1,000 hours, and the front brightness of the liquid crystal display device before and after light irradiation was measured, so as to calculate the rate of decrease of the front brightness before and after the light irradiation.

In Examples 101 to 105, in a case where the comparison was performed based on Comparative Example 111 or 112, the rate of decrease of brightness was 70% or less in all cases, and all were satisfactory.

From the above evaluation, it was understood that, in the liquid crystal display device of the present invention, oblique tint change was suppressed, durability was high, high brightness was high, and front contrast was high.

EXPLANATION OF REFERENCES

- 1: backlight-side polarizing plate
- 2: phase difference film
- 3: polarizer
- 10: optical film
- 11: brightness enhancement film
- 12: λ/4 plate
- 13: reflection polarizer
- **14*a***: cholesteric layer (first light reflecting layer)
- **14*b***: second light reflecting layer
- **14*c***: third light reflecting layer
- 15: support
- 17: λ/4 plate and underlayer (alignment film)
- 18: underlayer (alignment film)
- 20: adhesive layer (adhesive or pressure sensitive adhesive material)
- 21: optical sheet member
- 22: backlight unit with a brightness enhancement film
- 31: backlight unit
- 41: thin layer transistor substrate
- 42: liquid crystal cell
- 43: color filter substrate
- 44: display-side polarizing plate
- 51: liquid crystal display device
- 61: surface of cholesteric layer on support side

What is claimed is:

1. An optical film comprising:

a cholesteric layer of a disk-like liquid crystal composition including a disk-like liquid crystal compound, wherein the cholesteric layer exhibits a cholesteric liquid crystalline phase, and wherein fluctuation of a helical pitch in a film thickness direction of the cholesteric layer is 2% or greater.

2. The optical film according to claim 1, wherein the cholesteric layer has an interface only on a surface of the layer.

3. The optical film according to claim 1, wherein the disk-like liquid crystal compound is a compound represented by Formula (1), Formula (1)

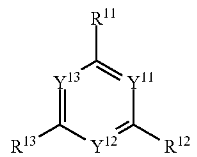

in Formula (1), $Y^{11}$, $Y^{12}$, and $Y^{13}$ each independently represent methine or a nitrogen atom, $R^{11}$, $R^{12}$, and $R^{13}$ each independently represent Formula (A), Formula (C), or a hydrogen atom, here, at least two of $R^{11}$, $R^{12}$, and $R^{13}$ are Formula (A) or (C);

Formula (A)

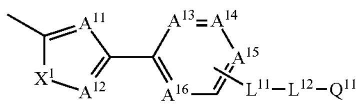

in Formula (A), $A^{11}$ and $A^{12}$ each independently represent a nitrogen atom or methine;

$A^{13}$, $A^{14}$, $A^{15}$, and $A^{16}$ each independently represent a nitrogen atom or methine (here, a hydrogen atom of methine may be substituted with a substituent $-L^{11}-L^{12}-Q^{11}$);

$X^1$ represents an oxygen atom, a sulfur atom, methylene, or imino;

$L^{11}$ represents a hetero 5-membered ring group;

$L^{12}$ represents an alkylene group or an alkenylene group, one $CH_2$ group or each of non-adjacent two or more $CH_2$ groups existing in a group of these alkylene groups or alkenylene groups may be substituted with —O—, —COO—, —OCO—, —OCOO—, —CO—, —S—, —$SO_2$—, —NR—, —$NRSO_2$—, or —$SO_2NR$— (R represents a hydrogen atom or an alkyl group having 1 to 4 carbon atoms), and one or more hydrogen atoms existing in these groups may be substituted with a halogen atom;

$Q^{11}$ each independently represent a polymerizable group, a hydrogen atom, —OH, —COOH, or a halogen atom;

Formula (C)

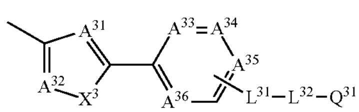

in Formula (C), $A^{31}$ and $A^{32}$ each independently represent a nitrogen atom or methine, $A^{33}$, $A^{34}$, $A^{35}$, and $A^{36}$ each independently represent a nitrogen atom or methine (here, a hydrogen atom of methine may be substituted with a substituent $-L^{31}-L^{32}-Q^{31}$);

$X^3$ represents an oxygen atom, a sulfur atom, methylene, or imino;

$L^{31}$ represents a hetero 5-membered ring group;

$L^{32}$ represents an alkylene group or an alkenylene group, one $CH_2$ group or each of non-adjacent two or more $CH_2$ groups existing in a group of these alkylene groups or alkenylene groups may be substituted with —O—, —COO—, —OCO—, —OCOO—, —CO—, —S—, —$SO_2$—, —NR—, —$NRSO_2$—, or —$SO_2NR$— (R represents a hydrogen atom or an alkyl group having 1 to 4 carbon atoms), and one or more hydrogen atoms existing in these groups may be substituted with a halogen atom; and $Q^{31}$ each independently represent a polymerizable group, a hydrogen atom, —OH, —COOH, or a halogen atom.

4. The optical film according to claim 1, wherein the disk-like liquid crystal composition further includes a chiral agent, a polymerizable compound, and a photopolymerization initiator, and wherein the cholesteric layer is obtained by aligning the disk-like liquid crystal composition.

5. A method of manufacturing the optical film according to claim 1, comprising:

coating an underlayer with the disk-like liquid crystal composition;

aligning the disk-like liquid crystal composition in a cholesteric liquid crystalline phase; and forming different helical pitches in a cholesteric layer such that fluctuation in a helical pitch in a film thickness direction of the cholesteric layer is 2% or greater.

6. The method of manufacturing the optical film according to claim 5, wherein the forming different helical pitches in a cholesteric layer is irradiation with ultraviolet rays under heating.

7. The method of manufacturing the optical film according to claim 5, wherein the forming different helical pitches in a cholesteric layer is performing heating after irradiation with ultraviolet rays.

8. The method of manufacturing the optical film according to claim 5, further comprising:

fixing a cholesteric liquid crystalline phase of the cholesteric layer after the forming different helical pitches in a cholesteric layer.

9. A brightness enhancement film comprising:

the optical film according to claim 1 as a first light reflecting layer; and a second light reflecting layer obtained by fixing a cholesteric liquid crystalline phase of a liquid crystal compound.

10. The brightness enhancement film according to claim 9, wherein the optical film includes a λ/4 plate, and wherein the λ/4 plate, the first light reflecting layer, and the second light reflecting layer are provided in this order.

11. The brightness enhancement film according to claim 9, further comprising:

a third light reflecting layer obtained by fixing a cholesteric liquid crystalline phase of a liquid crystal compound.

12. A backlight unit with a brightness enhancement film comprising:

the brightness enhancement film according to claim 9; and a backlight unit.

13. A liquid crystal display device obtained by using the brightness enhancement film according to claim 9.

14. The optical film according to claim 1, wherein, among the thickness of the cholesteric layer, the number of helical pitch in the region in which the fluctuation of the helical pitch in the film thickness direction of the cholesteric layer is 2% or greater is 1 to 32.

15. The optical film according to claim 1, wherein, among the thickness of the cholesteric layer, the number of helical pitch in the region in which the fluctuation of the helical pitch in the film thickness direction of the cholesteric layer is less than 2% is 1 to 15.

16. The optical film according to claim 1, wherein, among the thickness of the cholesteric layer, a region in which the fluctuation of the helical pitch in the film thickness direction of the cholesteric layer is 2% or greater is a thickness of 0.5 μm or greater.

17. The optical film according to claim 1, wherein, among the thickness of the cholesteric layer, a region in which the fluctuation of the helical pitch in the film thickness direction of the cholesteric layer is less than 2% is a thickness of 0.5 μm or greater.

* * * * *